(12) United States Patent
Kusashima

(10) Patent No.: US 12,256,428 B2
(45) Date of Patent: Mar. 18, 2025

(54) COMMUNICATION DEVICE, COMMUNICATION METHOD, AND COMMUNICATION PROGRAM

(71) Applicant: Sony Group Corporation, Tokyo (JP)

(72) Inventor: Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 353 days.

(21) Appl. No.: 17/629,789

(22) PCT Filed: Jul. 20, 2020

(86) PCT No.: PCT/JP2020/028179
§ 371 (c)(1),
(2) Date: Jan. 25, 2022

(87) PCT Pub. No.: WO2021/029192
PCT Pub. Date: Feb. 18, 2021

(65) Prior Publication Data
US 2022/0256598 A1    Aug. 11, 2022

(30) Foreign Application Priority Data

Aug. 15, 2019   (JP) ................. 2019-149220

(51) Int. Cl.
*H04W 74/0808* (2024.01)
*H04W 16/14* (2009.01)

(52) U.S. Cl.
CPC ....... *H04W 74/0808* (2013.01); *H04W 16/14* (2013.01)

(58) Field of Classification Search
CPC ............. H04W 74/0808; H04W 16/14; H04W 56/0015; H04W 56/001; H04W 74/006;
(Continued)

(56) References Cited

U.S. PATENT DOCUMENTS

2016/0286579 A1    9/2016  Park et al.
2018/0332618 A1 * 11/2018  Kakishima ........ H04W 72/1215
(Continued)

FOREIGN PATENT DOCUMENTS

| CN | 104822160 A | 8/2015 |
|---|---|---|
| CN | 108702795 A | 10/2018 |
| JP | 2019-33375 A | 2/2019 |
| WO | 20110631 A1 | 12/2016 |

OTHER PUBLICATIONS

Huawei et al: "Coexistence and channnel access for NR unlicensed band operations", 3GPP Draft; R1-1812194, 3rd Generation Partnership Project (3GPP), Mobile Compentence Centre ; Nov. 11, 2018 (Nov. 11, 2018), p. 7, 650, Route Des Lucioles ; F-06921 Shopia-Antipolis Cedex ; Fance, vol. RAN WG1, No. Spokane, US; Nov. 12, 2018-Nov. 16, 2018, XP051554066, Retrieved on Nov. 11, 2018 * 2.4 LBT in TX/RX beamforming scenarios.
(Continued)

*Primary Examiner* — Olumide Ajibade Akonai
(74) *Attorney, Agent, or Firm* — XSENSUS LLP

(57) ABSTRACT

A communication device (20) includes a sensing unit (231) that performs channel sensing in an unlicensed band, and a notification unit (232) that notifies another communication device of space domain information, as channel occupancy information indicating that channel occupancy is performed when the sensing succeeds.

16 Claims, 24 Drawing Sheets

(58) Field of Classification Search
CPC ............. H04W 74/0816; H04W 72/04; H04W 72/0453; H04W 72/23; H04W 74/002; H04W 48/16; H04W 74/0833; H04W 72/0446; H04W 72/56; H04L 5/0055; H04L 7/0626; H04B 7/0665
See application file for complete search history.

(56) References Cited

U.S. PATENT DOCUMENTS

| | | | |
|---|---|---|---|
| 2019/0230706 A1 | 7/2019 | Li | |
| 2021/0007072 A1* | 1/2021 | Wu | H04L 5/0053 |
| 2021/0050976 A1* | 2/2021 | Noh | H04L 5/0051 |
| 2021/0298045 A1* | 9/2021 | Kim | H04W 72/0453 |
| 2021/0385037 A1* | 12/2021 | Yoon | H04L 5/0048 |
| 2022/0272681 A1* | 8/2022 | Harada | H04W 48/12 |

OTHER PUBLICATIONS

Samsung: "Channel access procedures for NR-U", 3GPP Draft; R1-1906920-Channel Access Procedures for NR-U, 3rd Genration Partnership Project (3GPP), Mobile Competence Centre ; May 13, 2019 (May 13, 2019), 650, Route Des Lucioles ; F-06921 Sophia-Antipolis Cedex; France, vil. RAN WG1, No. Reno, USA; May 13, 2019-May 17, 2019, XP051728370, retrieved on May 13, 2019. * 6 Directional LBT for NR-U 7LVT with Hnadshake Machanism for NR-U; p. 6-p. 8.

International Search Report and Written Opinion mailed on Sep. 24, 2020, received for PCT Application PCT/JP2020/028179, Filed on Jul. 20, 2020, 10 pages including English Translation.

Qualcomm Incorporated, "Revised SID on NR-based Access to Unlicensed Spectrum", 3GPP TSG RAN Meeting #77, RP-172021, Sep. 11-14, 2017, 5 pages.

\* cited by examiner

FIG.9

| | SUBCARRIER SPACING | MAXIMUM BANDWIDTH | CP LENGTH TYPE | NUMBER OF SYMBOLS | SUBFRAME LENGTH | RADIO FRAME LENGTH | NUMBER OF SUBCARRIERS |
|---|---|---|---|---|---|---|---|
| PARAMETER SET 0 | 15kHz | 20MHz | TYPE 1 | 14 | 1ms | 10ms | 12 |
| PARAMETER SET 1 | 7.5kHz | 1.4MHz | TYPE 1 | 70 | 10ms | 10ms | 24 |
| PARAMETER SET 2 | 30kHz | 80MHz | TYPE 1 | 7 | 0.25ms | 10ms | 6 |
| PARAMETER SET 3 | 15kHz | 20MHz | TYPE 2 | 12 | 1ms | 10ms | 12 |
| ... | ... | ... | ... | ... | ... | ... | ... |

FIG.22

| CHANNEL ACCESS PRIORITY CLASS (p) | $m_p$ | MINIMUM CONTENTION WINDOW $CW_{minp}$ | MAXIMUM CONTENTION WINDOW $CW_{maxp}$ | MAXIMUM CHANNEL OCCUPANCY TIME $T_{mcot,p}$ | POSSIBLE VALUE OF CONTENTION WINDOW $CW_p$ |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127, 255,511,1023} |

FIG.23

| CHANNEL ACCESS PRIORITY CLASS (p) | QCI |
|---|---|
| 1 | 1, 3, 5, 65, 66, 69, 70 |
| 2 | 2, 7 |
| 3 | 4, 6, 8, 9 |
| 4 | OTHERS |

# COMMUNICATION DEVICE, COMMUNICATION METHOD, AND COMMUNICATION PROGRAM

CROSS-REFERENCE TO RELATED APPLICATIONS

The present application is based on PCT/JP2020/028179 filed on Jul. 20, 2020, and claims priority to Japanese Application No. 2019-149220 filed on Aug. 15, 2019, the entire contents of each are incorporated herein by reference.

FIELD

The present disclosure relates to a communication device, a communication method, and a communication program.

BACKGROUND

Next-generation cellular communication technology using an unlicensed band has been studied. For example, in one aspect of achieving coexistence with other nodes and other radio systems in the unlicensed band, a communication device performs channel sensing, such as listen before talk (LBT) or the like, before transmission. In this configuration, when the LBT succeeds, a communication device of the other party is notified of time domain information, as an example of channel occupancy information, by the communication device.

CITATION LIST

Non Patent Literature

Non Patent Literature 1: RP-172021, "Study on NR-based Access to Unlicensed Spectrum," 3GPP TSG RAN Meeting #77, Sapporo, Japan, Sep. 11-14, 2017.

SUMMARY

Technical Problem

However, there is a possibility that high communication performance is not achieved only by notifying of the time domain information described above as the channel occupancy information.

Therefore, the present disclosure proposes a communication device, a communication method, and a communication program that are configured to achieve high communication performance.

Solution to Problem

According to the present disclosure, a communication device includes a sensing unit that performs channel sensing in an unlicensed band and a notification unit that notifies another communication device of space domain information, as channel occupancy information indicating that channel occupancy is performed when the sensing succeeds.

BRIEF DESCRIPTION OF DRAWINGS

FIG. 9 is a diagram illustrating an example of parameter sets related to transmission signals in an NR cell.

FIG. 22 is a diagram illustrating an example of a correspondence table between priority classes and parameters.

FIG. 23 is a table illustrating an example of mapping between the priority classes and QCIs.

DESCRIPTION OF EMBODIMENTS

Figure 1:
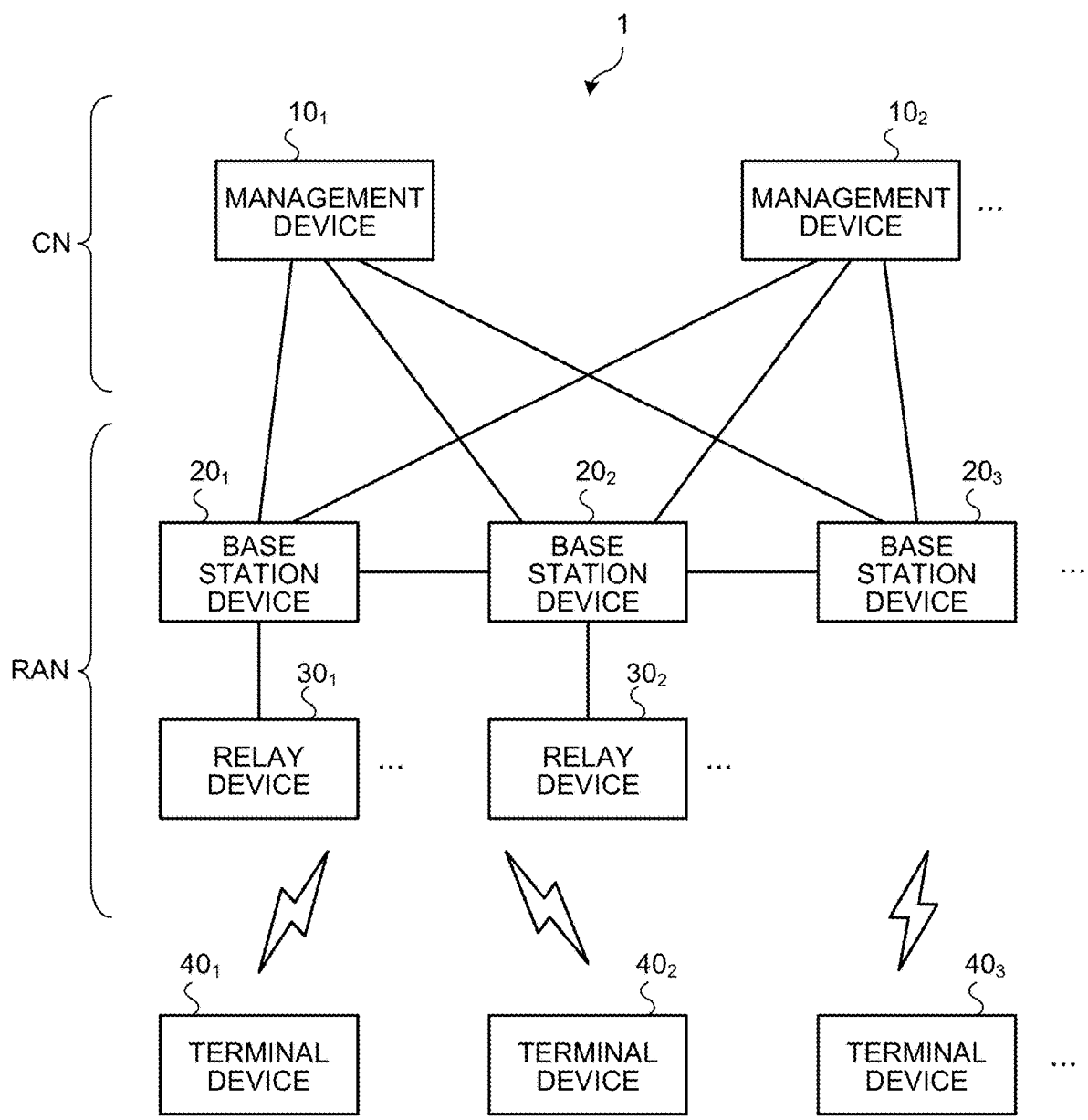
FIG. 1 is a diagram illustrating a configuration example of a communication system according to an embodiment of the present disclosure.

Embodiments of the present disclosure will be described below in detail with reference to the drawings. Note that in the following embodiments, the same portions are denoted by the same reference numerals and symbols, and redundant description thereof will be omitted.

Furthermore, in the present description and the drawings, a plurality of components having substantially the same functional configurations will be distinguished by giving the same reference numerals followed by different numerals in some cases. For example, a plurality of configurations having substantially the same functional configuration is distinguished from each other, for example, base station devices $20_1$, $20_2$, and $20_3$ as necessary, or distinguished from each other, for example, terminal devices $40_1$, $40_2$, and $40_3$ as necessary. However, in a case where there is no need to particularly distinguish the plurality of components having substantially the same functional configuration, the components are denoted by the same reference numeral alone. For example, in a case where the base station devices $20_1$, $20_2$, and $20_3$ do not need to be distinguished from each other, the base station devices $20_1$, $20_2$, and $20_3$ are simply referred to as base station devices 20, and in a case where the terminal devices $40_1$, $40_2$, and $40_3$ do not need to be distinguished from each other, the terminal devices $40_1$, $40_2$, and $40_3$ are simply referred to as terminal devices 40.

Furthermore, the present disclosure will be described in the order of the items shown below.

1. Introduction
2. Configuration of communication system
2-1. Overall configuration of communication system
2-2. Configuration of management device
2-3. Configuration of base station device
2-4. Configuration of relay device
2-5. Configuration of terminal device
2-6. Radio frame configuration
3. About NOMA
3-1. Transmitting and receiving data by using NOMA
3-2. Efficient use of MA resource
3-3. Specific examples of NOMA application range
4. Channel access procedure on unlicensed channel
4-1. Details of first channel access procedure
4-2. Details of second channel access procedure
4-3. Contention window adaptation procedure
4-4. Details of channel access procedure in downlink
4-5. Details of channel access procedure in uplink
4-6. Channel access procedure for NR in present embodiment
4-7. Channel Access for frame based equipment (FBE)
4-8. Directional LBT
4-9. Receiver assisted LBT
4-10. Channel occupancy in present embodiment
5. Channel occupancy information
5-1. Time domain information
5-2. Frequency domain information
5-3. Space domain information
5-4. Code domain information
6. Information indicating link in channel occupancy
6-1. Downlink information
6-2. Uplink information
6-3. Other information
7. Notification means for channel occupancy information
7-1. Shared PDCCH or group common PDCCH
7-2. DMRS associated with PDCCH
7-3. CSI-RS
7-4. SS/PBCH block
7-5. PDCCH specific to terminal device
7-6. Initial signal and initial channel
8. Operations of communication system
8-1. Channel occupancy information notification procedure performed by base station device
8-2. Channel occupancy information notification procedure performed by terminal device
8-3. Exceptional processing in acquisition of channel occupancy information
8-4. Notification of channel occupancy information in frame based equipment (FBE)
9. Modifications
9-1. Notification means for channel occupancy information
9-2. Other modifications
10. Conclusion 1. Introduction Radio access technologies (RATs) such as long term evolution (LTE) and new radio (NR) have been studied in the 3rd generation partnership project (3GPP). Each of LTE and NR is a type of cellular communication technology and enables mobile communication of a terminal device by arranging areas covered by base stations in the form of cells.

Note that in the following description, "LTE" includes LTE-Advanced (LTE-A), LTE-Advanced Pro (LTE-A Pro), and evolved universal terrestrial radio access (EUTRA). In addition, NR includes new radio access technology (NRAT) and Further EUTRA (FEUTRA). Note that a single base station may manage a plurality of cells.

NR is a radio access technology (RAT) different from LTE and is employed as a next generation (fifth generation) radio access method next to LTE. NR is an access technology that is configured to support various use cases including enhanced mobile broadband (eMBB), massive machine type communications (mMTC), and ultra reliable and low latency communications (URLLC). NR has been studied for a technical framework that addresses usage scenarios, requirement conditions, and deployment scenarios in these use cases.

In an unlicensed band and a license shared band, operation of the radio access method based on cellular communication has been studied. Coexistence with another node and radio system is regarded as important in such an unlicensed band, and functions such as listen before talk (LBT) that perform channel sensing before transmission, and discontinuous transmission are required for the radio access method such as LTE and NR. Details of the radio access method based on the NR in the unlicensed band are disclosed in Non Patent Literature 1 described above. Note that, for example, a 2.4 GHz band, 5 GHz band, and 6 GHz band are available as the unlicensed band. For example, a 3.5 GHz band and 37 GHz band are available as the license shared band.

In the fifth generation mobile communication system (5G) as well, implementation of radio communication by NR using the unlicensed band has been studied. Such radio communication based on NR using the unlicensed band is also referred to as "NR-unlicensed (NR-U)". In the NR-U, it is assumed that the NR-U supports various use cases, such as dual connectivity, stand-alone NR-U operated only with the unlicensed band, and a DL carrier and a UL carrier one of which is a licensed band and the other of which is the unlicensed band (e.g., licensed DL+unlicensed UL), in addition to licensed assisted access (LAA) using a carrier aggregation mechanism.

In one aspect of supporting these use cases, a mechanism for transmitting a physical channel and a physical signal transmitted using a primary cell (PCell) such as a synchronization signal (SS), PRACH, and PUCCH in the unlicensed band has been studied, in the NR-U.

Generally, in the unlicensed band, before transmitting the physical channel and/or the physical signal, a communication device performs channel sensing to determine whether the channel is clear or busy. When the channel is clear (LBT success), it is possible for the communication device to transmit the physical channel and/or the physical signal. Meanwhile, when the channel is busy (LBT failure), it is difficult for the communication device to transmit the physical channel and/or the physical signal.

After the LBT success, a base station device notifies the terminal device of information indicating whether the channels can be occupied and information indicating how long the channels can be occupied, as channel occupancy information, and therefore, the terminal device can utilize the information for various processes in reception. For example, the channel occupancy information can be used for skipping a reception process such as PDCCH monitoring or downlink signal/channel buffering, improving accuracy by measurement that does not depend on blind signal detection, simplifying or skipping part of a transmission process such as LBT by setting a transmission period, and the like. As a result of such use, it is expected that a load on the terminal device is reduced.

Furthermore, in the unlicensed band as well, multiplexing in a space domain has been studied. As an example of multiplexing in the space domain, directional LBT has been studied. For example, in a communication system on the premise of beamforming, such as communication in a 60 GHz band, it has been studied to perform LBT with limited directivity. When LBT is performed in a transmission direction and no LBT is performed in a non-transmission direction, it is expected to limit a direction in which the physical signal and/or the physical channel is transmitted. In addition, as another example of multiplexing in the space domain, coordinated multiple point (CoMP) or multi-TRP transmission has been studied.

However, currently, in a case where the license band is used for communication in the primary cell, only a time domain is notified of as the channel occupancy information. As described above, there is a possibility that high communication performance is not achieved only by notifying of time domain information as the channel occupancy information. Note that problems in notification of the channel occupancy information from the base station device to the terminal device will be described, merely as an example here.

For example, in a conventional notification method, the terminal device can recognize only transmission in a predetermined serving cell, but a use state of a space-divided channel in the serving cell is not notified of. In such a situation, even when the base station device should not perform transmission in a direction other than a predetermined direction, the terminal device attempts reception assuming that transmission is performed in all directions. At this time, as the number of direction candidates increases, the load on the terminal device also increases.

In addition, in a conventional frequency domain, the terminal device recognizes that a channel is occupied in a sub-band for which the channel occupancy information is transmitted. In this case, the channel occupancy information needs to be transmitted separately for all sub-bands, and therefore, system overhead is increased, and a load due to blind decoding by the terminal device is also increased.

As in these cases, information about a domain other than the time domain is not fully used by a communication device of the other party, and therefore, there is a problem that high communication performance may not be achieved.

In one aspect of solving such a problem, in the present embodiment, the communication device notifies the communication device of the other party of the information about a domain other than the time domain, as the channel occupancy information, upon successful channel sensing. Therefore, as a result of use of the information about a domain other than the time domain for the communication device of the other party, a load due to a reception processing, transmission processing, or the like in the communication device of the other party can be fully reduced, as compared with a case where only the time domain information is notified of as the channel occupancy information. Thus, high communication performance will be achieved.

Here, in the present embodiment, the communication device is configured to notify of at least one of (a) space domain information, (b) frequency domain information, and (c) code domain information, or a combination thereof, as the channel occupancy information about a domain other than the time domain. Note that, merely as an example, notification of the channel occupancy information from the base station device to the terminal device will be described here.

(a) Space Domain Information

The following effects can be obtained by notifying of the space domain information as the channel occupancy information. For example, in the terminal device, a load in downlink monitoring with a plurality of beams (in a plurality of directions) can be reduced.

(b) Frequency Domain Information

The following effects can be obtained by notifying of the frequency domain information as the channel occupancy information. For example, in the terminal device, the frequency domain information can be used to set a band-pass filter. In addition, in the terminal device, a bandwidth to which a reference signal is transmitted from the base station device can be known in advance, and accurate channel measurement can be performed.

(c) Code Domain Information

The following effects can be obtained by notifying of the code domain information as the channel occupancy information. For example, an available code domain can be recognized, and a reception success probability can be improved even if transmission of a plurality of links collides with each other.

2. Configuration of Communication System

Hereinafter, a communication system 1 according to an embodiment of the present disclosure will be described. The communication system 1 is configured to include a base station device, for wireless connection to a terminal device. A non-terrestrial network of the communication system 1 is, for example, a radio network that uses the radio access method defined in NR. As a matter of course, the communication system 1 may include the radio network using the radio access method other than the NR.

<2-1. Overall Configuration of Communication System>

FIG. 1 is a diagram illustrating a configuration example of the communication system 1 according to an embodiment of the present disclosure. The communication system 1 illustrated in FIG. 1 is a wireless communication system that provides a radio access network to the terminal device. For example, the communication system 1 is a cellular communication system using a radio access technology such as LTE or NR.

As illustrated in FIG. 1, the communication system 1 includes a management device 10, a base station device 20, a relay device 30, and a terminal device 40. The communication system 1 provides, for users, the radio network through which mobile communication can be performed, by operating radio communication devices constituting the communication system 1 in cooperation with each other. The radio network according to the present embodiment includes the radio access network RAN and a core network CN. Note that the radio communication devices are devices having a radio communication function and correspond to the base station device 20, the relay device 30, and the terminal device 40 in the example of FIG. 1.

The communication system 1 may include a plurality of management devices 10, base station devices 20, relay devices 30, and terminal devices 40. In the example of FIG. 1, the communication system 1 includes management devices $10_1$ and $10_2$, and the like as the management devices 10. Furthermore, the communication system 1 includes base station devices $20_1$, $20_2$, $20_3$, and the like as the base station devices 20, and relay devices $30_1$, $30_2$, and the like as the relay devices 30. Still furthermore, the communication system 1 includes terminal devices $40_1$, $40_2$, $40_3$, and the like as the terminal devices 40.

Note that the devices of the figure may be considered as logical devices. In other words, part of each device in the figure may be implemented by a virtual machine (VM), a container, a docker, or the like and may be implemented on physically identical hardware.

Note that a base station for LTE may be referred to as an evolved node B (eNodeB or eNB). Furthermore, a base station for NR may be referred to as a gNodeB or gNB. Still furthermore, in LTE and NR, each of the terminal device (also referred to as a mobile station, a mobile station device, or a terminal) may be referred to as user equipment (UE). Note that the terminal device is a type of communication device and is also referred to as the mobile station, mobile station device, or terminal.

In the embodiments of the present disclosure, the concept of communication device includes not only a portable mobile device (terminal device) such as a mobile terminal but also, for example, a device installed in a structure or mobile body. The structure or the mobile body itself may be regarded as the communication device. Furthermore, the concept of the communication device includes not only a terminal device but also the base station device and the relay device. The communication device is a type of processing device and information processing device. Furthermore, the communication device can be also referred to as a transmission device or a reception device.

[Management Device]

Each of the management devices 10 is a device that manages the radio network. For example, the management device 10 is a device that manages the communication of each base station device 20. For example, the management device 10 is a device that functions as a mobility management entity (MME), an access and mobility management function (AMF), or a session management function (SMF).

The management device 10 constitutes the core network CN together with a gateway device and the like. The core network CN is, for example, a network of a predetermined entity such as a mobile network operator. For example, the core network CN includes an evolved packet core (EPC) or a 5G core network (5GC). Note that the predetermined entity may be the same as or different from an entity that uses, operates, and/or manages each of the base station devices 20.

Note that the management device 10 may have a gateway function. For example, when the core network is EPC, the management device 10 may have a function as S-GW or P-GW. Furthermore, when the core network is 5GC, the management device 10 may have a function as a user plane function (UPF). Note that the management device 10 may not necessarily be a device that constitutes the core network CN. For example, it is assumed that the core network CN employs wideband code division multiple access (W-CDMA) or code division multiple access 2000 (cdma2000). At this time, the management device 10 may be a device that functions as a radio network controller (RNC).

The management device 10 is connected to each of the plurality of base station devices 20 and manages communication of the base station device 20. For example, the management device 10 grasps, for management of each of the terminal devices 40, whether the terminal device 40 is connected to which base station device (or which cell), whether the terminal device is located in a communication area of which base station device (or which cell), and the like. The cell may be PCell or a secondary cell (SCell). In the cells, radio resource (e.g., a frequency channel, a component carrier, or the like) that can be used by the terminal devices 40 may be different. Furthermore, one base station device may provide a plurality of cells.

[Base Station Device]

Each base station device 20 is a radio communication device that establishes radio communication with each terminal device 40. The base station device 20 is a type of the communication device. The base station device 20 is, for example, a device corresponding to a radio base station (Node B, eNB, gNB, etc.) or a radio access point. The base station device 20 may be a wireless relay station. The base station device 20 may be a optical extension device called remote radio head (RRH). Furthermore, the base station device 20 may be a receiving station device such as a field pickup unit (FPU). Furthermore, the base station device 20 may be an integrated access and backhaul (IAB) donor node or an IAB relay node that provides a radio access network and a wireless backhaul network by using time division multiplexing, frequency division multiplexing, or space division multiplexing.

Note that the radio access technology used by the base station device 20 may be cellular communication technology or wireless LAN technology. As a matter of course, the radio access technology used by the base station device 20 is not limited thereto, and may be another radio access technology. The radio access technology used by the base station device 20 may be low power wide area (LPWA) communication technology. Here, the LPWA communication is communication compliant with an LPWA standard. Examples of the LPWA standard include ELTRES, ZETA, SIGFOX, LoRaWAN, NB-Iot, and the like. As a matter of course, the LPWA standard is not limited thereto, and may be another LPWA standard. In addition, wireless communication used by the base station device 20 may be millimeter wave wireless communication. Furthermore, wireless communication used by the base station device 20 may be radio wave wireless communication or infrared or visible light wireless communication (optical wireless communication).

The base station device 20 may be configured to perform NOMA communication with the terminal device 40. Here, the NOMA communication is communication (transmission, reception, or both) using a non-orthogonal resource. The non-orthogonal resource will be described later. Note that the base station device 20 may be configured to perform the NOMA communication with another base station device 20 and relay device 30.

Note that the base station devices 20 may be communicable with each other via a base station device-core network interface (e.g., S1 Interface or the like). This interface may be a wired interface or a wireless interface. Furthermore, the base station devices may be communicable with each other via an interface between the base station devices (e.g., X2 Interface, S1 Interface, or the like). This interface may be a wired interface or a wireless interface.

The base station devices 20 can be used, operated, and/or managed by various entities. For example, a mobile network operator (MNO), a mobile virtual network operator (MVNO), a mobile virtual network enabler (MVNE), a neutral host network (NHN) operator, an enterprise, an educational institution (educational corporation, education board of each local government, etc.), a real estate (building, apartment house, etc.) administrator, an individual, and the like can be assumed as the entities.

As a matter of course, the entities of use, operation, and/or management of the base station devices 20 are not limited thereto. Each of the base station devices 20 may be installed and/or operated by one business operator, or may be installed and/or operated by one individual. As a matter of course, the entity of installation/operation of the base station device 20 is not limited thereto. For example, the base station device 20 may be installed/operated by a plurality of business operators or a plurality of individuals in cooperation. Furthermore, the base station device 20 may be a shared facility used by a plurality of business operators or a plurality of individuals. In this case, installation and/or operation of the facility may be performed by a third party different from the users.

Note that the concept of the base station device (also referred to as base station) includes not only a donor base station but also a relay base station (also referred to as relay station or relay station device). Furthermore, the concept of the base station includes not only a structure with a function of the base station but also a device installed in the structure.

The structure includes, for example, a building such as a high-rise building, house, steel tower, station facility, airport facility, harbor facility, or a stadium. Note that the concept of the structure includes not only the building but also a non-building structure such as a tunnel, bridge, dam, fence, steel column, or a facility such as a crane, gate, or windmill. In addition, the concept of the structure includes not only a structure on land (on the ground) or under the ground but also a structure on water such as a pier or megafloat, or a structure under water such as an ocean observation facility. The base station device can be also referred to as the processing device or the information processing device.

The base station device 20 may be a donor station or a relay station (intermediate station). Furthermore, the base station device 20 may be a fixed station or a mobile station. The mobile station is a radio communication device (e.g., the base station device) configured to be movable. For example, the base station device 20 may be a device installed in the mobile body or the mobile body itself. For example, a relay station device having mobility can be regarded as the base station device 20 as the mobile station. In addition, a device such as a vehicle, drone, or smartphone that originally has mobility and has a function of the base station device (at least part of the function of the base station device) also corresponds to the base station device 20 as the mobile station.

Here, the mobile body may be a mobile terminal such as a smartphone or a mobile phone. Furthermore, the mobile body may be a mobile body (e.g., a vehicle such as an automobile, bicycle, bus, truck, motorcycle, train, or linear motor car) that moves on land (on the ground) or a mobile body (e.g., subway) that moves under the ground (e.g., in a tunnel).

Furthermore, the mobile body may be a mobile body (e.g., a ship such as a passenger ship, cargo ship, or hovercraft) that moves on water or a mobile body (e.g., a submersible ship such as a submersible vessel, submarine boat, or unmanned submersible) that moves under water.

Still furthermore, the mobile body may be a mobile body (e.g., an aircraft such as an airplane, airship, or drone) that moves in the atmosphere or a mobile body (e.g., an artificial celestial body such as an artificial satellite, spacecraft, space station, or probe vehicle) that moves outside the atmosphere. The mobile body that moves above the atmosphere can be also referred to as a space vehicle.

Furthermore, the base station device 20 may be a terrestrial base station device (terrestrial station device) installed on the ground. For example, the base station device 20 may include a base station device arranged in a structure on the ground or a base station device installed in the mobile body moving on the ground. More specifically, the base station device 20 may include an antenna installed in a structure such as a building and a signal processing device connected to the antenna. As a matter of course, the base station device 20 may include the structure or the mobile body itself. "On the ground" represents not only on land (on the ground) but also under the ground, on water, and under water in a broad sense. Note that the base station device 20 is not limited to the terrestrial base station device. The base station device 20 may be a non-terrestrial base station device (non-terrestrial station device) that is configured to float in the air or in space. For example, the base station device 20 may include an aircraft station device or a satellite station device.

The aircraft station device is a radio communication device that is configured to float in the atmosphere, such as an aircraft. The aircraft station device may include a device mounted on an aircraft or the like or may be the aircraft itself. Note that the concept of the aircraft includes not only a heavier-than-air aircraft such as an airplane or glider, but also a lighter-than-air aircraft such as a balloon or airship. Furthermore, the concept of the aircraft includes not only the heavier-than-air aircraft or lighter-than-air aircraft, but also a rotorcraft such as a helicopter or autogyro. Note that the aircraft station device (or an aircraft on which the aircraft station device is mounted) may include an unmanned aircraft such as a drone.

Note that the concept of unmanned aircraft includes unmanned aircraft systems (UAS) or tethered UAS. Furthermore, the concept of the unmanned aircraft includes a lighter than air UAS (LTA) or a heavier than air UAS (HTA). In addition, the concept of the unmanned aircraft also includes high altitude UAS Platforms (HAPs).

The satellite station device is a radio communication device that is configured to float above the atmosphere. The satellite station device may be a device mounted in the space vehicle such as the artificial satellite or may be the space vehicle itself. A satellite serving as the satellite station device may be any of a low earth orbiting (LEO) satellite, medium earth orbiting (MEO) satellite, geostationary earth orbiting (GEO) satellite, and highly elliptical orbiting (HEO) satellite. As a matter of course, the satellite station device may be a device mounted on the low earth orbiting satellite, medium earth orbiting satellite, geostationary earth orbiting satellite, or highly elliptical orbiting satellite.

The base station device 20 may provide large coverage, such as a macrocell, or small coverage, such as a picocell. As a matter of course, the base station device 20 may provide minimum coverage, such as femtocell. Furthermore, the base station device 20 may have a beam forming capability. In this case, the base station device 20 may form a cell or service area for each beam.

Note that, in the example of FIG. 1, the base station device $20_1$ is connected to the relay device $30_1$, and the base station device $20_2$ is connected to the relay device $30_2$. The base station device $20_1$ is configured to indirectly establish radio communication with each terminal device 40 via the relay device $30_1$. Similarly, the base station device $20_2$ is configured to indirectly establish radio communication with each terminal device 40 via the relay device $30_2$.

[Relay Device]

Each of the relay devices 30 is a device that serves as a relay station for each base station. The relay device 30 is a type of base station device. The relay device can be also referred to as a relay base station device (or relay base station). The relay device 30 is configured to perform NOMA communication with each terminal device 40. The relay device 30 relays communication between the base station device 20 and the terminal device 40. Note that the relay device 30 may be configured to perform NOMA communication with another relay device 30 and base station device 20. The relay device 30 may be a terrestrial station device or a non-terrestrial station device. The relay devices 30 constitute the radio access network RAN together with the base station devices 20.

[Terminal Device]

Each terminal device 40 is a radio communication device that wirelessly communicates with each base station device 20 or relay device 30. The terminal device 40 is, for example, a mobile phone, a smart device (smartphone or tablet), a personal digital assistant (PDA), or a personal computer. Furthermore, the terminal device 40 may be a device such as a business camera having a communication function, or may be a motor cycle or vehicle on which a communication device such as field pickup unit (FPU) is mounted. Furthermore, the terminal device 40 may include a machine to machine (M2M) device or an Internet of Things (IoT) device.

Furthermore, the terminal device 40 may be configured to perform sidelink communication with another terminal device 40. The terminal device 40 may be configured to use an automatic retransmission technology such as HARQ when performing sidelink communication. The terminal device 40 may be configured to perform NOMA communication with the base station device 20 and the relay device 30. Note that the terminal device 40 may be configured to perform NOMA communication even in the communication (sidelink) with another terminal device 40. Furthermore, the terminal device 40 may be configured to perform LPWA communication with another communication device (e.g., the base station device 20, the relay device 30, and another terminal device 40). In addition, wireless communication used by the terminal device 40 may be wireless communication using millimeter waves. Note that wireless communication (including sidelink communication) used by the terminal device 40 may be radio wave wireless communication or infrared or visible light wireless communication (optical wireless communication).

Furthermore, the terminal device 40 may be a mobile device. Here, the mobile device is a movable radio communication device. Furthermore, the terminal device 40 may be a radio communication device installed in the mobile body or the mobile body itself. For example, the terminal device 40 may be a vehicle that moves on a road, such as an automobile, bus, truck, or a motorcycle, or a radio communication device mounted on the vehicle. Note that the mobile body may be a mobile terminal, or may be a mobile body that moves on land (on the ground), under the ground, on water, or under water. Furthermore, the mobile body may be a mobile body that moves inside the atmosphere, such as a drone or a helicopter, or may be a mobile body that moves outside the atmosphere, such as an artificial satellite.

The terminal device 40 may be simultaneously connected to a plurality of base station devices or a plurality of cells to perform communication. For example, in a case where one base station device supports a communication area via a plurality of cells (e.g., pCell and sCell), it is possible to combine the plurality of cells by a carrier aggregation (CA) technology, a dual connectivity (DC) technology, or a multi-connectivity (MC) technology, enabling communication between the base station device 20 and the terminal device 40. Alternatively, the terminal device 40 and a plurality of different base station devices 20 are communicable with each other via cells of the different base station devices 20 by using a coordinated transmission and reception (CoMP: Coordinated Multi-Point Transmission and Reception) technology.

Note that the terminal device 40 is not necessarily a device directly used by a person. The terminal device 40 may be a sensor installed in a machine or the like in a factory, as in so-called machine type communication (MTC). Furthermore, the terminal device 40 may include a machine to machine (M2M) device or an Internet of Things (IoT) device. Furthermore, the terminal device 40 may be a device having a relay communication function, as represented by device to device (D2D) or vehicle to everything (V2X). Furthermore, the terminal device 40 may be a device called client premises equipment (CPE) used for wireless backhaul or the like.

Hereinafter, the configurations of the respective devices constituting the communication system 1 according to the embodiment will be specifically described. Note that the configuration of each device described below is merely an example. The configuration of each device may be different from the following configuration.

<2-2. Configuration of Management Device>

Figure 2:
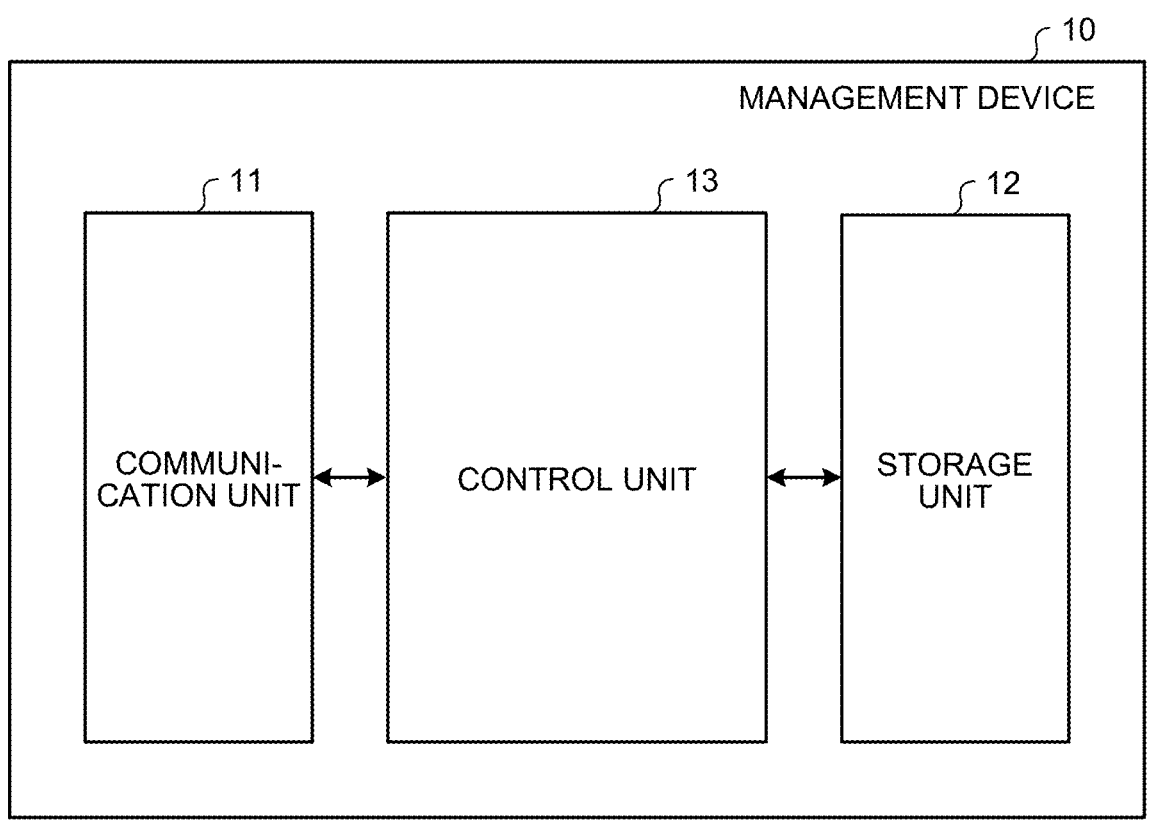
FIG. 2 is a diagram illustrating a configuration example of a management device according to an embodiment of the present disclosure.

FIG. 2 is a diagram illustrating a configuration example of the management device 10 according to an embodiment of the present disclosure. The management device 10 includes a communication unit 11, a storage unit 12, and a control unit 13. Note that the configuration illustrated in FIG. 2 represents a functional configuration, and the management device 10 may have a hardware configuration different from this functional configuration. Furthermore, the functions of the management device 10 may be implemented so as to be distributed in a plurality of physically separated configurations. For example, the management device 10 may be constituted by a plurality of server devices.

The communication unit 11 is a communication interface for communicating with another device. The communication unit 11 may be a network interface or a device connection interface. For example, the communication unit 11 may include a local area network (LAN) interface such as a network interface card (NIC) or may be a universal serial bus (USB) interface including a USB host controller, a USB port, and the like. Furthermore, the communication unit 11 may be a wired interface or a wireless interface. The communication unit 11 functions as communication means for the management device 10. The communication unit 11 communicates with each base station device 20 according to the control of the control unit 13.

The storage unit 12 is a data readable/writable storage device such as a dynamic random access memory (DRAM), static random access memory (SRAM), flash memory, or hard disk. The storage unit 12 functions as storage means for the management device 10. The storage unit 12 stores, for example, a connection state of each terminal device 40. For example, the storage unit 12 stores states of radio resource control (RRC) and EPS connection management (ECM) of the terminal device 40. The storage unit 12 may function as a home memory that stores position information indicating the position of each terminal device 40.

The control unit 13 is a controller that controls each unit of the management device 10. The control unit 13 is implemented by a processor such as a central processing unit (CPU) or a micro processing unit (MPU). For example, the control unit 13 is implemented in such a manner that the processor executes various programs stored in the storage device inside the management device 10 by using a random access memory (RAM) or the like as a work area. Note that the control unit 13 may be implemented by an integrated circuit such as an application specific integrated circuit (ASIC) or a field programmable gate array (FPGA). The CPU, MPU, ASIC, and FPGA can all be regarded as controllers.

<2-3. Configuration of Base Station Device>

Figure 3:
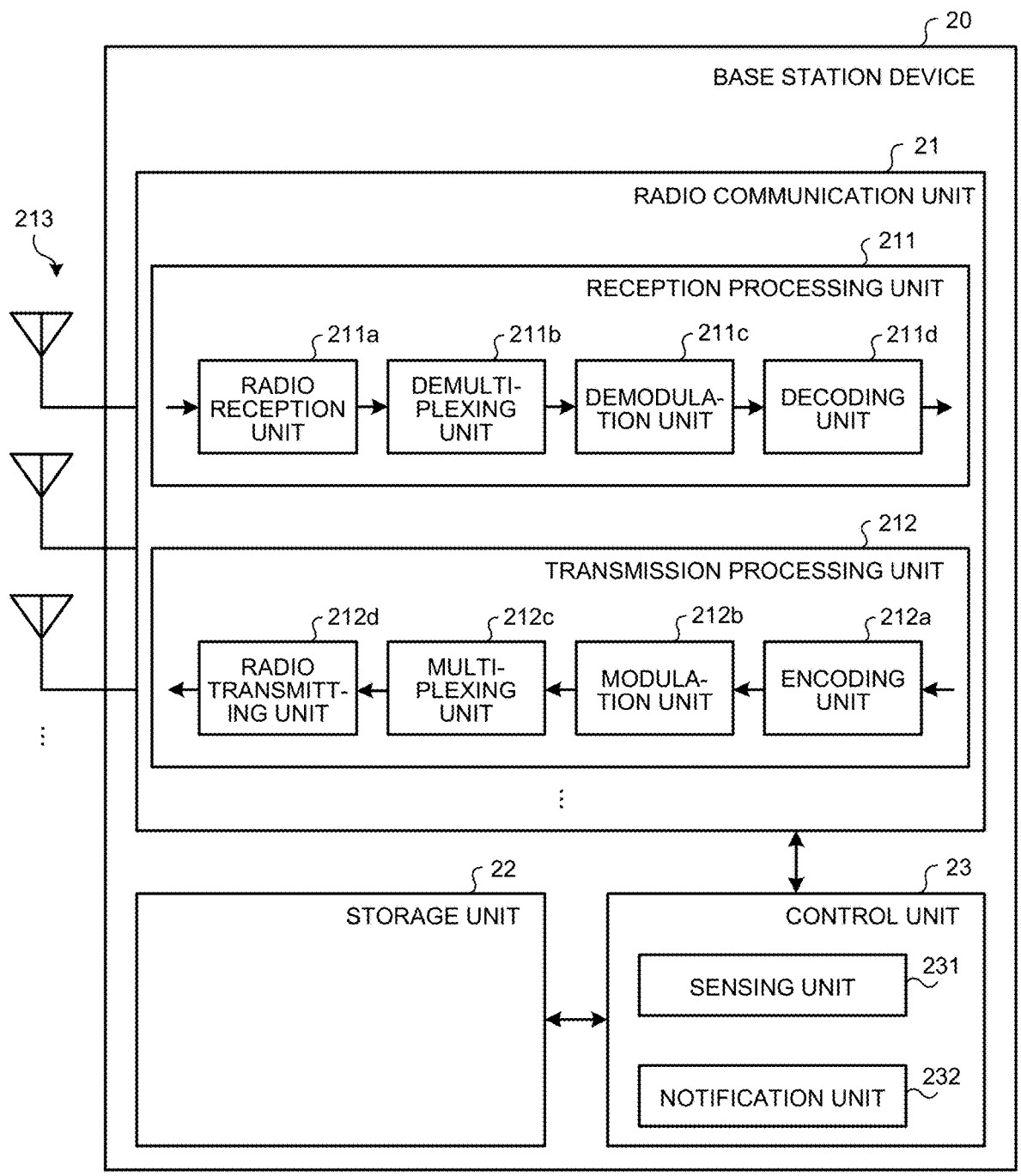
FIG. 3 is a diagram illustrating a configuration example of a base station device according to an embodiment of the present disclosure.

FIG. 3 is a diagram illustrating a configuration example of the base station device 20 according to an embodiment of the present disclosure. The base station device 20 is configured to perform NOMA communication with each terminal device 40. The base station device 20 includes a radio communication unit 21, a storage unit 22, and a control unit 23. Note that the configuration illustrated in FIG. 3 represents a functional configuration, and the base station device 20 may have a hardware configuration different from this functional configuration. Furthermore, the functions of the base station device 20 may be implemented so as to be distributed in a plurality of physically separated configurations.

The radio communication unit 21 is a radio communication interface that establishes radio communication with other radio communication devices (e.g., the terminal device 40 and the relay device 30). The radio communication unit 21 operates according to the control of the control unit 23. The radio communication unit 21 supports one or more radio access methods. For example, the radio communication unit 21 supports both of NR and LTE. The radio communication unit 21 may support W-CDMA or cdma2000 in addition to NR and LTE. Furthermore, the radio communication unit 21 supports communication using NOMA. The NOMA will be described in detail later.

The radio communication unit 21 includes a reception processing unit 211, a transmission processing unit 212, and an antenna 213. The radio communication unit 21 may include a plurality of reception processing units 211, transmission processing units 212, and antennas 213. Note that when the radio communication unit 21 supports a plurality of radio access methods, each unit of the radio communication unit 21 can be individually configured for each of the radio access methods. For example, the reception processing unit 211 and the transmission processing unit 212 may be configured individually for LTE and NR.

The reception processing unit 211 performs processing for an uplink signal received via the antenna 213. The reception processing unit 211 includes a radio reception unit 211a, a demultiplexing unit 211b, a demodulation unit 211c, and a decoding unit 211d.

The radio reception unit 211a performs, on the uplink signal, down-convert, removal of an unnecessary frequency component, control of an amplification level, quadrature demodulation, conversion to a digital signal, removal of a guard interval, and extraction of a frequency domain signal by fast Fourier transform, or the like. The demultiplexing unit 211b demultiplexes an uplink channel and an uplink reference signal, such as physical uplink shared channel (PUSCH) and physical uplink control channel (PUCCH), from a signal output from the radio reception unit 211a. The demodulation unit 211c performs demodulation of a received signal by using a modulation method such as binary phase shift keying (BPSK) or quadrature phase shift keying (QPSK), on a modulated symbol in the uplink channel. The modulation method used by the demodulation unit 211c may include 16 quadrature amplitude modulation (QAM), 64 QAM, or 256 QAM. In this configuration, signal points in a constellation do not necessarily need to be equidistant. The constellation may be a non-uniform constellation (NUC). The decoding unit 211d performs decoding processing on a demodulated, encoded bits on the uplink channel. Decoded uplink data and uplink control information are output to the control unit 23.

The transmission processing unit 212 performs transmission processing for downlink control information and downlink data. The transmission processing unit 212 includes an encoding unit 212a, a modulation unit 212b, a multiplexing unit 212c, and a radio transmitting unit 212d.

The encoding unit 212a performs encoding of the downlink control information and downlink data that are input from the control unit 23, by using an encoding method such as block encoding, convolutional encoding, or turbo encoding. The modulation unit 212b modulates encoded bits output from the encoding unit 212a by using a predetermined modulation method such as BPSK, QPSK, 16 QAM, 64 QAM, or 256 QAM. In this configuration, signal points in a constellation do not necessarily need to be equidistant. The constellation may be a non-uniform constellation. The multiplexing unit 212c multiplexes the modulated symbol and a downlink reference signal in each channel so as to be arranged in a predetermined resource element. The radio transmitting unit 212d performs various signal processing on a signal from the multiplexing unit 212c. For example, the radio transmitting unit 212d performs processing such as conversion to the time domain by using fast Fourier transform, addition of the guard interval, generation of a baseband digital signal, conversion to an analog signal, quadrature modulation, up-conversion, removal of an unnecessary frequency component, or amplification of power. A signal generated by the transmission processing unit 212 is transmitted from the antenna 213.

The storage unit 22 is a data readable/writable storage device such as a DRAM, SRAM, flash memory, or hard disk. The storage unit 22 functions as storage means for the base station device 20. For example, the storage unit 22 stores data to be referred to or to be registered by each block (a sensing unit 231 to a notification unit 232) constituting the control unit 23.

The control unit 23 is a controller that controls each unit of the base station device 20. The control unit 23 is implemented by a processor such as a CPU or MPU. For example, the control unit 23 is implemented in such a manner that the processor executes various programs stored in the storage device inside the base station device 20 by using RAM or the like as a work area. Note that the control unit 23 may be implemented by an integrated circuit such as ASIC or FPGA. The CPU, MPU, ASIC, and FPGA can all be regarded as controllers.

As illustrated in FIG. 3, the control unit 23 includes the sensing unit 231 and the notification unit 232. In one aspect, the sensing unit 231 of these units performs channel sensing, for example, LBT, in the unlicensed band. In addition, in one aspect, the notification unit 232 notifies the communication device of the other party of the channel occupancy information and other various information, upon LBT success. Each of the respective blocks (the sensing unit 231 to the notification unit 232) constituting the control unit 23 represents a functional block indicating a function of the control unit 23. These functional blocks may be software blocks or hardware blocks. For example, each of the functional blocks described above may be one software module implemented by software (including a microprogram) or one circuit block on one semiconductor chip (die). As a matter of course, each functional block may be one processor or one integrated circuit. Any method is employed for a method of configuring the functional blocks. Note that the control unit 23 may be constituted in units of functions different from the above functional blocks. The operation of the sensing unit 231, various information notified of by the notification unit 232, a notification method thereof, and the like will be described later in detail.

<2-4. Configuration of Relay Device>

Figure 4:
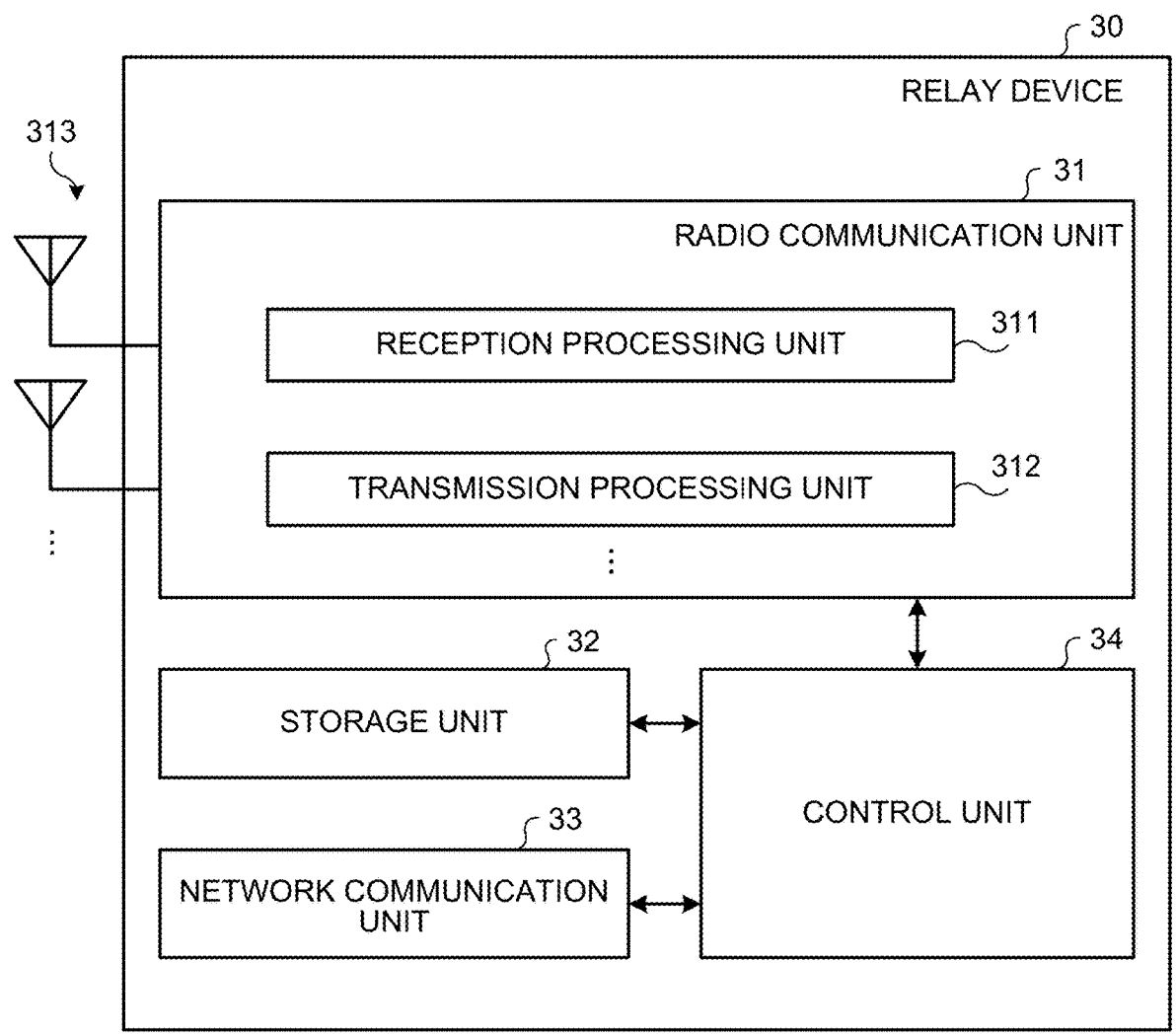
FIG. 4 is a diagram illustrating a configuration example of a relay device according to an embodiment of the present disclosure.

FIG. 4 is a diagram illustrating a configuration example of the relay device 30 according to an embodiment of the present disclosure. The relay device 30 is configured to perform NOMA communication with each terminal device 40. The relay device 30 includes a radio communication unit 31, a storage unit 32, a network communication unit 33, and a control unit 34. Note that the configuration illustrated in FIG. 4 represents a functional configuration, and the relay device 30 may have a hardware configuration different from this functional configuration. Furthermore, the functions of the relay device 30 may be implemented so as to be distributed in a plurality of physically separated configurations.

The radio communication unit 31 is a radio communication interface that establishes radio communication with other radio communication devices (e.g., the base station device 20 and each terminal device 40). The radio communication unit 31 operates according to the control of the control unit 34. The radio communication unit 31 includes a reception processing unit 311, a transmission processing unit 312, and an antenna 313. The configurations of the radio communication unit 31, the reception processing unit 311, the transmission processing unit 312, and the antenna 313 are similar to those of the radio communication unit 21, the reception processing unit 211, the transmission processing unit 212, and the antenna 213 of the base station device 20.

The storage unit 32 is a data readable/writable storage device such as a DRAM, SRAM, flash memory, or hard disk. The storage unit 32 functions as storage means for the relay device 30. The configuration of the storage unit 32 is similar to that of the storage unit 22 of the base station device 20.

The network communication unit 33 is a communication interface for communicating with another device. For example, the network communication unit 33 includes a LAN interface such as NIC. The network communication unit 33 may be a wired interface or a wireless interface. The network communication unit 33 functions as network communication means for the relay device 30. The network communication unit 33 communicates with the base station device 20 according to the control of the control unit 34.

The control unit 34 is a controller that controls each unit of the relay device 30. The configuration of the control unit 34 is similar to that of the control unit 23 of the base station device 20.

<2-5. Configuration of Terminal Device>

Figure 5:
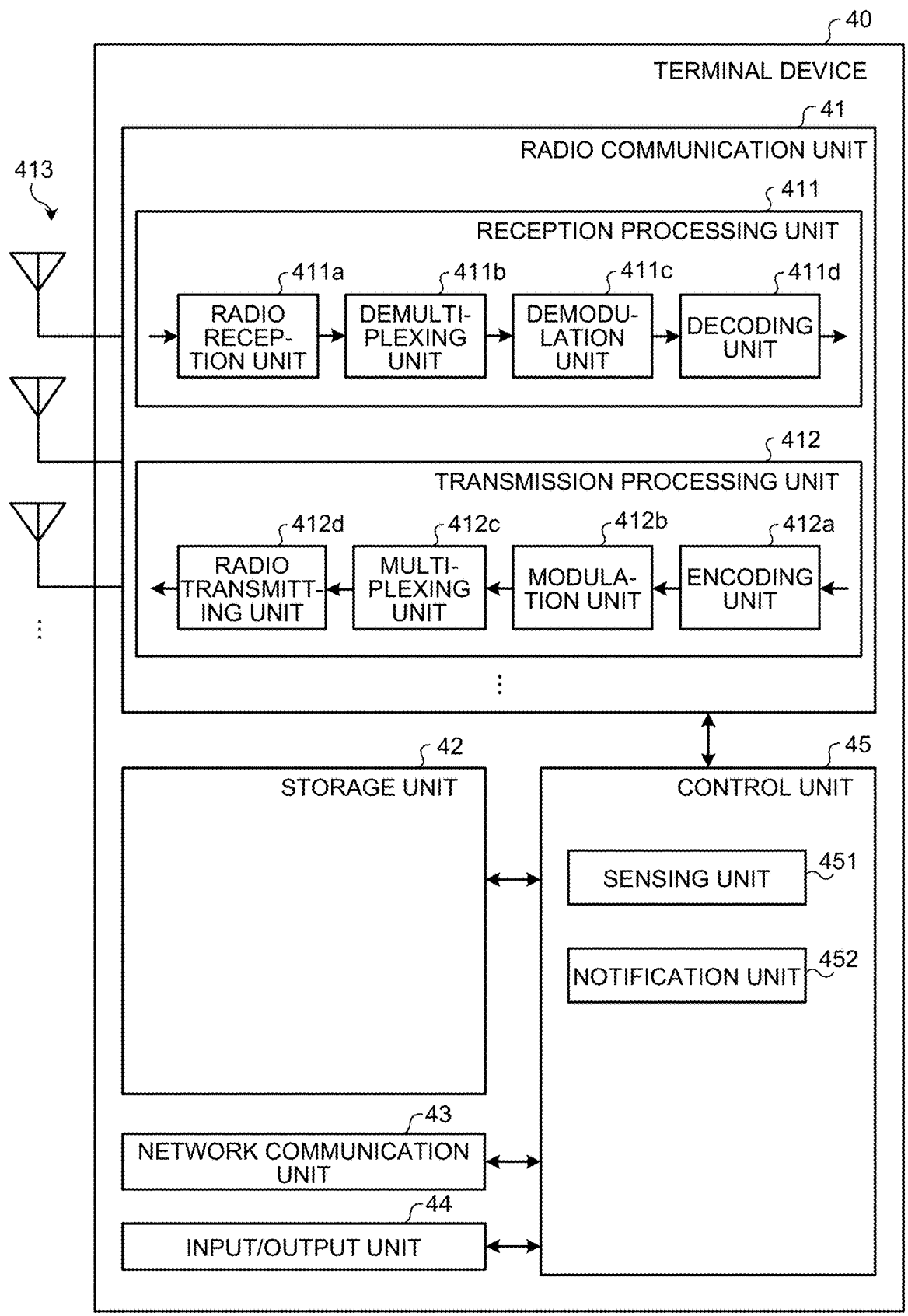
FIG. 5 is a diagram illustrating a configuration example of a terminal device according to an embodiment of the present disclosure.

FIG. 5 is a diagram illustrating a configuration example of the terminal device 40 according to an embodiment of the present disclosure. The terminal device 40 is configured to perform NOMA communication with each base station device 20 and relay device 30. The terminal device 40 includes a radio communication unit 41, a storage unit 42, a network communication unit 43, an input/output unit 44, and a control unit 45. Note that the configuration illustrated in FIG. 5 represents a functional configuration, and the terminal device 40 may have a hardware configuration different from this functional configuration. Furthermore, the functions of the terminal device 40 may be implemented so as to be distributed in a plurality of physically separated configurations.

The radio communication unit 41 is a radio communication interface that establishes radio communication with other radio communication devices (e.g., the base station device 20 and the relay device 30). The radio communication unit 41 operates according to the control of the control unit 45. The radio communication unit 41 supports one or more radio access methods. For example, the radio communication unit 41 supports both of NR and LTE. The radio communication unit 41 may support W-CDMA or cdma2000 in addition to NR and LTE. Furthermore, the radio communication unit 21 supports communication using NOMA. The NOMA will be described in detail later.

The radio communication unit 41 includes a reception processing unit 411, a transmission processing unit 412, and an antenna 413. The radio communication unit 41 may include a plurality of reception processing units 411, transmission processing units 412, and antennas 413. Note that when the radio communication unit 41 supports a plurality of radio access methods, each unit of the radio communication unit 41 can be individually configured for each of the radio access methods. For example, the reception processing unit 411 and the transmission processing unit 412 may be configured individually for LTE and NR.

The reception processing unit 411 performs processing for a downlink signal received via the antenna 413. The reception processing unit 411 includes a radio reception unit 411a, a demultiplexing unit 411b, a demodulation unit 411c, and a decoding unit 411d.

The radio reception unit 411a performs, on the downlink signal, down-convert, removal of an unnecessary frequency component, control of an amplification level, quadrature demodulation, conversion to a digital signal, removal of the guard interval, and extraction of a frequency domain signal by fast Fourier transform, or the like. The demultiplexing unit 411b demultiplexes a downlink channel, the downlink synchronization signal, and the downlink reference signal from a signal output from the radio reception unit 411a. The downlink channel includes, for example, a channel such as physical broadcast channel (PBCH), physical downlink shared channel (PDSCH), physical downlink control channel (PDCCH). The demodulation unit 211c performs demodulation of a received signal by using a modulation method such as BPSK, QPSK, 16 QAM, 64 QAM, or 256 QAM, for the modulated symbol in the downlink channel.

In this configuration, signal points in a constellation do not necessarily need to be equidistant. The constellation may be a non-uniform constellation. The decoding unit 411d performs decoding processing on the demodulated, encoded bits on the downlink channel. The downlink data decoded and the downlink control information are output to the control unit 45.

The transmission processing unit 412 performs transmission processing for the uplink control information and the uplink data. The transmission processing unit 412 includes an encoding unit 412*a*, a modulation unit 412*b*, a multiplexing unit 412*c*, and a radio transmitting unit 412*d*.

The encoding unit 412*a* performs encoding of the uplink control information and uplink data that are input from the control unit 45, by using an encoding method such as block encoding, convolutional encoding, or turbo encoding. The modulation unit 412*b* modulates encoded bits output from the encoding unit 412*a* by using a predetermined modulation method such as BPSK, QPSK, 16 QAM, 64 QAM, or 256 QAM. In this configuration, signal points in a constellation do not necessarily need to be equidistant. The constellation may be a non-uniform constellation. The multiplexing unit 412*c* multiplexes the modulated symbol and the uplink reference signal in each channel so as to be arranged in the predetermined resource element. The radio transmitting unit 412*d* performs various signal processing on a signal from the multiplexing unit 412*c*. For example, the radio transmitting unit 412*d* performs processing such as conversion to the time domain by using fast Fourier transform, addition of the guard interval, generation of a baseband digital signal, conversion to an analog signal, quadrature modulation, up-conversion, removal of an unnecessary frequency component, or amplification of power. A signal generated by the transmission processing unit 412 is transmitted from the antenna 413.

The storage unit 42 is a data readable/writable storage device such as a DRAM, SRAM, flash memory, or hard disk. The storage unit 42 functions as storage means for the terminal device 40. For example, the storage unit 42 stores data to be referred to or to be registered by each block (a sensing unit 451 to a notification unit 452) constituting the control unit 43.

The network communication unit 43 is a communication interface for communicating with another device. For example, the network communication unit 43 includes a LAN interface such as NIC. The network communication unit 43 may be a wired interface or a wireless interface. The network communication unit 43 functions as network communication means for the terminal device 40. The network communication unit 43 communicates with another device according to the control of the control unit 45.

The input/output unit 44 is a user interface for exchanging information with the user. For example, the input/output unit 44 is an operation device, such as a keyboard, mouse, operation keys, or touch panel, through which various operations are performed by the user. Alternately, the input/output unit 44 is a display device such as a liquid crystal display or organic electroluminescence display. The input/output unit 44 may be a sound device such as a speaker or buzzer. The input/output unit 44 may be a lighting device such as a light emitting diode (LED) lamp. The input/output unit 44 functions as input/output means (input means, output means, operation means, or notification means) of the terminal device 40.

The control unit 45 is a controller that controls each unit of the terminal device 40. The control unit 45 is implemented by a processor such as a CPU or MPU. For example, the control unit 45 is implemented in such a manner that the processor executes various programs stored in the storage device inside the terminal device 40 by using RAM or the like as a work area. Note that the control unit 45 may be implemented by an integrated circuit such as ASIC or FPGA. The CPU, MPU, ASIC, and FPGA can all be regarded as controllers.

As illustrated in FIG. 5, the control unit 45 includes the sensing unit 451 and the notification unit 452. In one aspect, the sensing unit 451 of these units performs channel sensing, for example, LBT, in the unlicensed band. In addition, in one aspect, the notification unit 452 notifies the communication device of the other party of the channel occupancy information and other various information, upon LBT success. Each of the respective blocks (the sensing unit 451 to the notification unit 452) constituting the control unit 45 represents a functional block indicating a function of the control unit 45. These functional blocks may be software blocks or hardware blocks. For example, each of the functional blocks described above may be one software module implemented by software (including a microprogram) or one circuit block on one semiconductor chip (die). As a matter of course, each functional block may be one processor or one integrated circuit. Any method is employed for a method of configuring the functional blocks. Note that the control unit 45 may be constituted in units of functions different from the above functional blocks. The operation of the sensing unit 451, various information notified of by the notification unit 452, a notification method thereof, and the like will be described later in detail.

<2-6. Radio Frame Configuration>

Next, a radio frame configuration in the radio access network RAN will be described.

Figure 6:
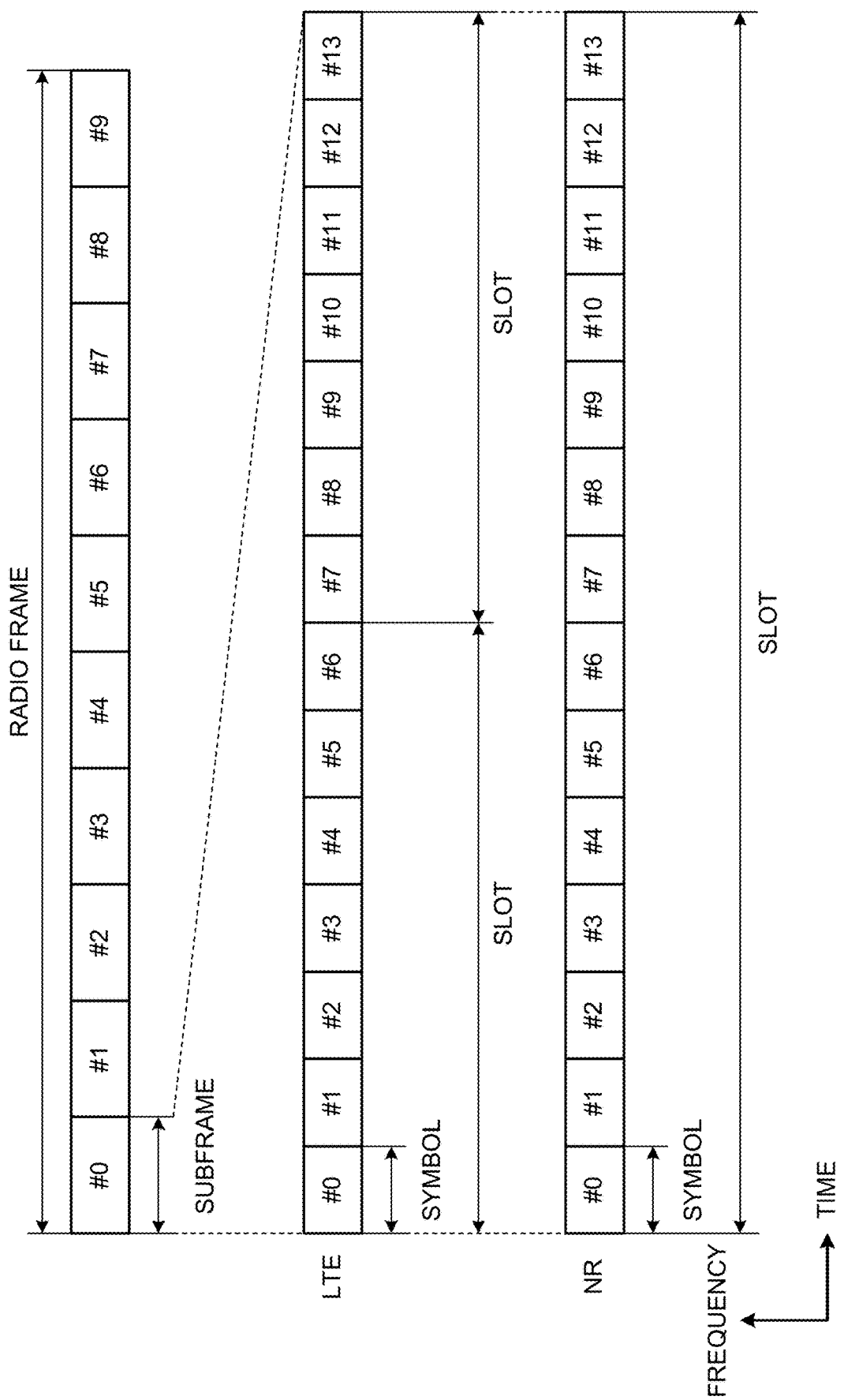
FIG. 6 is a diagram illustrating a radio frame configuration used in a radio access network RAN according to an embodiment of the present disclosure.

FIG. 6 is a diagram illustrating the radio frame configuration used in the radio access network RAN according to an embodiment of the present disclosure. In the radio access network RAN, a radio frame of 10 ms is defined. One radio frame includes 10 subframes. A subframe has a time interval of 1 ms. The subframe includes, for example, 14 symbols. Here, the symbols are, for example, OFDM symbols or SC-FDMA symbols. In LTE, for example, one slot includes seven symbols. In NR, for example, one slot includes 14 symbols. The subframe configurations in LTE and NR will be described below.

[Subframe Configuration in LTE]

Figure 7:
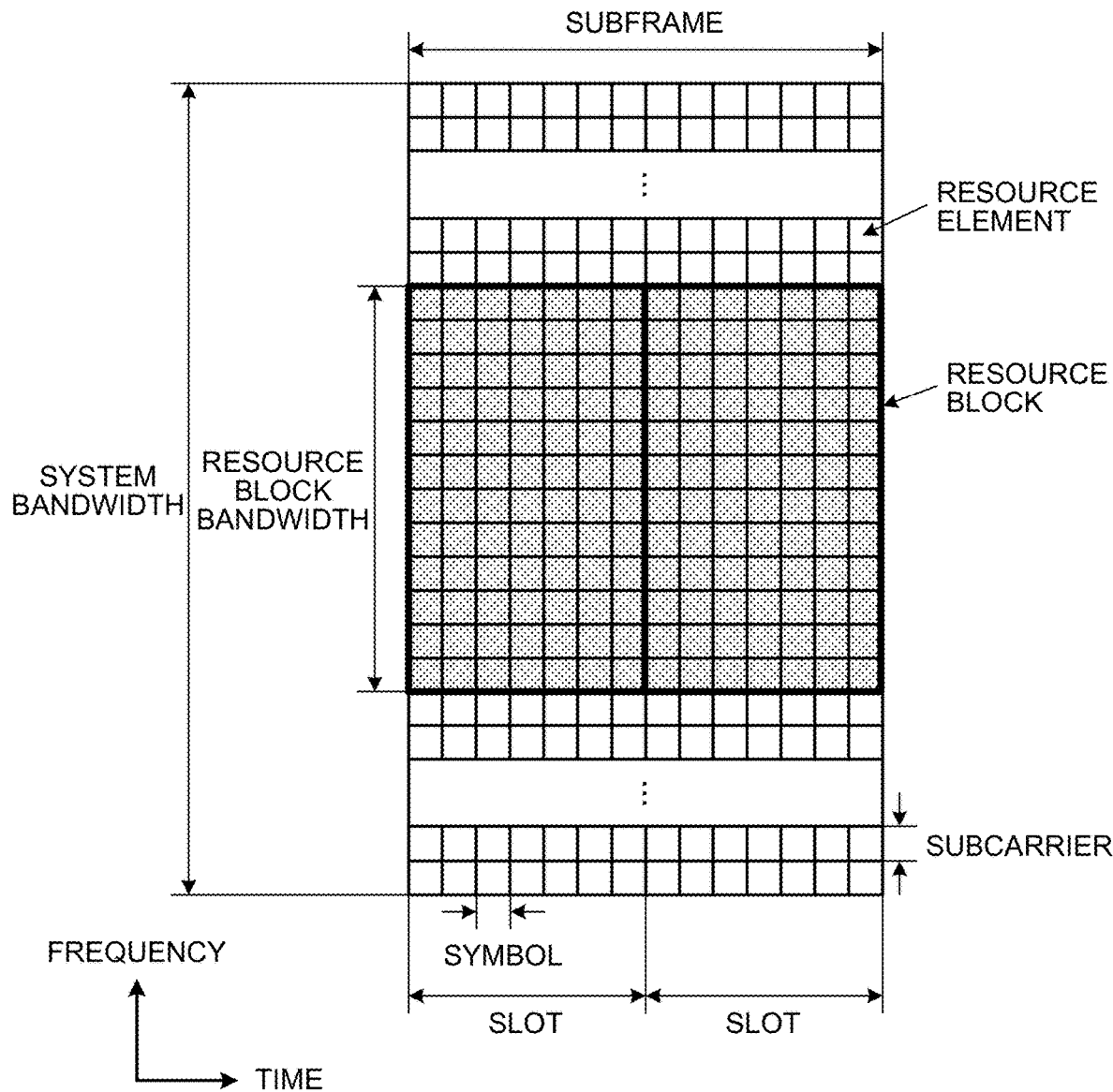
FIG. 7 is a diagram illustrating an example of a subframe configuration in LTE.

FIG. 7 is a diagram illustrating an example of the subframe configuration in LTE. In the example illustrated in FIG. 7, a resource grid is illustrated with the vertical axis representing frequency and the horizontal axis representing time. In the example illustrated in FIG. 7, a system bandwidth represents an LTE cell bandwidth. The resource grid includes a plurality of grids, each of which represents a resource element. One resource element has dimensions of one subcarrier in a frequency direction and one symbol in a time direction. In LTE, one slot is defined by a plurality of symbols. The number of symbols in one slot is determined according to the type of cyclic prefix (CP). The type of CP includes a normal CP or an extended CP. In the normal CP, one slot includes seven symbols. In the extended CP, one slot includes six symbols.

A resource block is used to map a certain physical channel (PDSCH, PUSCH, or the like) to the resource elements. One resource block is defined by a predetermined number of subcarriers continuous in the frequency domain and a predetermined number of symbols continuous in the time domain. The number of symbols and the number of subcarriers (resource block bandwidth) in one resource block are determined on the basis of the type of CP in a cell, a subcarrier spacing and/or a parameter that is set depending on an upper layer, and the like. For example, when the type of CP is the normal CP and the subcarrier spacing is 15 kHz, one resource block includes seven symbols and 12 subcarriers. In this configuration, one resource block includes (7×12) resource elements.

In each LTE cell, one predetermined parameter is used for a certain subframe. The predetermined parameter is, for example, a parameter (physical parameter) related to a transmission signal. The parameter related to the transmission signal includes a CP length, the subcarrier spacing, the number of symbols in one subframe (predetermined time length), the number of subcarriers in one resource block (predetermined frequency band), a multiple access method, signal waveform, or the like. In the LTE cell, link signals (downlink signal and uplink signal) are generated using one predetermined parameter in the predetermined time length (e.g., subframe).

[Frame Configuration in NR]

Figure 8:
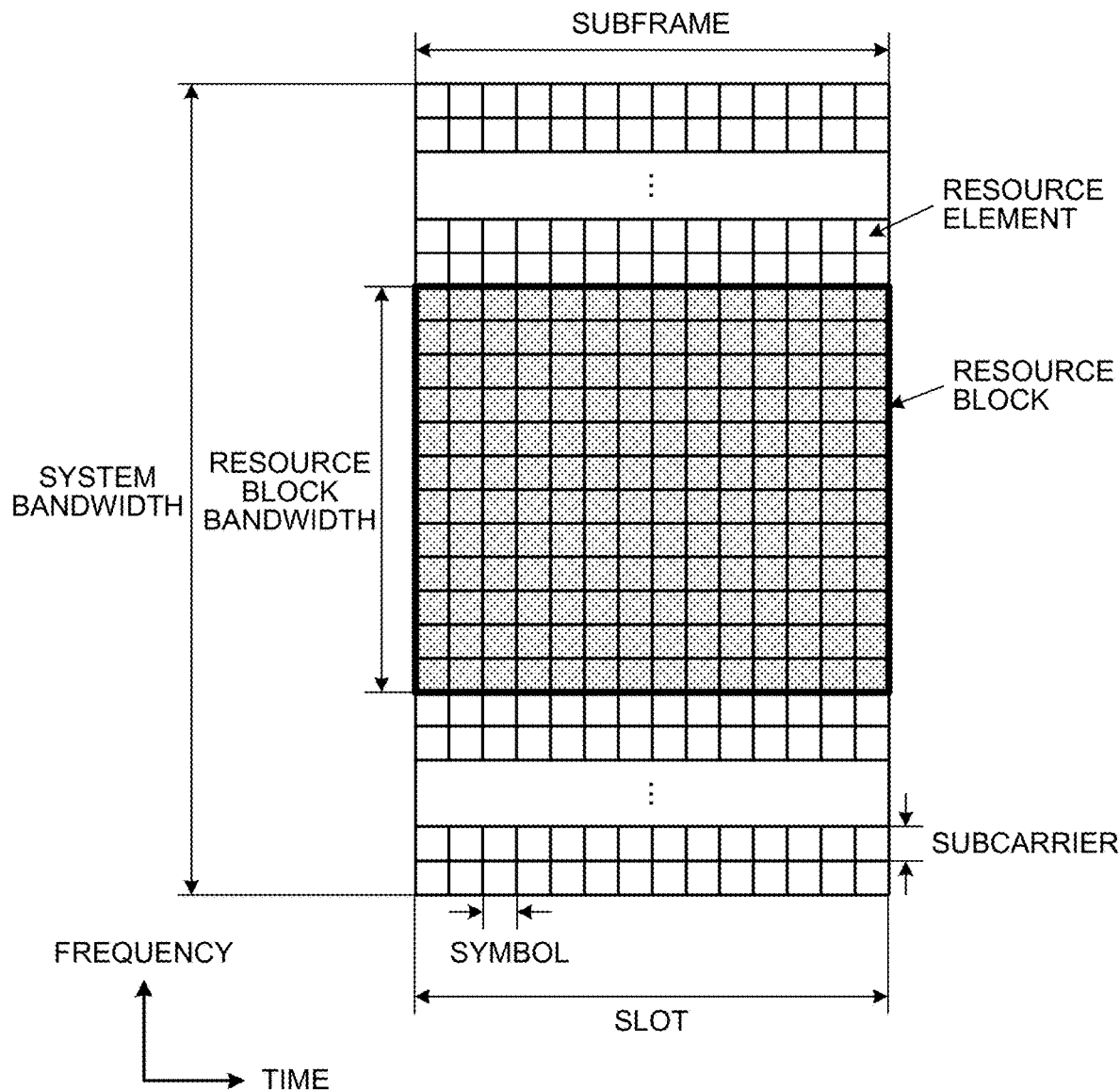
FIG. 8 is a diagram illustrating an example of a subframe configuration in NR.

FIG. 8 is a diagram illustrating an example of a subframe configuration in NR. In the example illustrated in FIG. 8, the system bandwidth represents an NR cell bandwidth. In an NR cell, one or more predetermined parameters are used in a predetermined time length (e.g., subframe). In other words, in the NR cell, link signals are generated using one or more predetermined parameters in the predetermined time length. When a plurality of predetermined parameters is used, signals generated by using the predetermined parameters are multiplexed by a predetermined method. For example, the predetermined method includes frequency division multiplexing (FDM), time division multiplexing (TDM), code division multiplexing (CDM), and/or spatial division multiplexing (SDM).

In combination of the predetermined parameters set in the NR cell, a plurality of kinds of parameter sets can be defined in advance. FIG. 9 is a diagram illustrating an example of the parameter sets related to transmission signals in the NR cell. In the example of FIG. 9, the parameters include "subcarrier spacing", "maximum bandwidth" of the component carrier, "CP length type". "the number of symbols" per subframe, and "the number of subcarriers" per resource block in the NR cell". One of the parameters may include "radio frame length". Note that "CP length type" is the type of the CP length used for the NR cell. For example, CP length type 1 corresponds to the normal CP in LTE, and CP length type 2 corresponds to the extended CP in LTE. The parameter sets related to transmission signals in the NR cell can be defined individually for a downlink and an uplink. Furthermore, the parameter sets related to transmission signals in the NR cell can be set independently for the downlink and the uplink.

In the example of FIG. 9, as a parameter set 0, 15 kHz (subcarrier spacing), 20 MHz (maximum bandwidth), type 1 (CP length type), 14 (the number of symbols), 1 ms (subframe length), 10 ms (radio frame length), and 12 (the number of subcarriers) are defined. Furthermore, as a parameter set 1, 7.5 kHz (subcarrier spacing), 1.4 MHz (maximum bandwidth), type 1 (CP length type), 70 (the number of symbols), 10 ms (subframe length), 10 ms (radio frame length), 24 (the number of subcarriers) are defined. Still furthermore, as a parameter set 2, 30 kHz (subcarrier spacing), 80 MHz (maximum bandwidth), type 1 (CP length type), 7 (the number of symbols), 0.25 ms (subframe length), 10 ms (radio frame length), 6 (the number of subcarriers) are defined. Still another furthermore, as a parameter set 3, 15 kHz (subcarrier spacing), 20 MHz (maximum bandwidth), type 2 (CP length type), 12 (the number of symbols), 1 ms (subframe length), 10 ms (radio frame length), 12 (the number of subcarriers) are defined.

Figure 10:
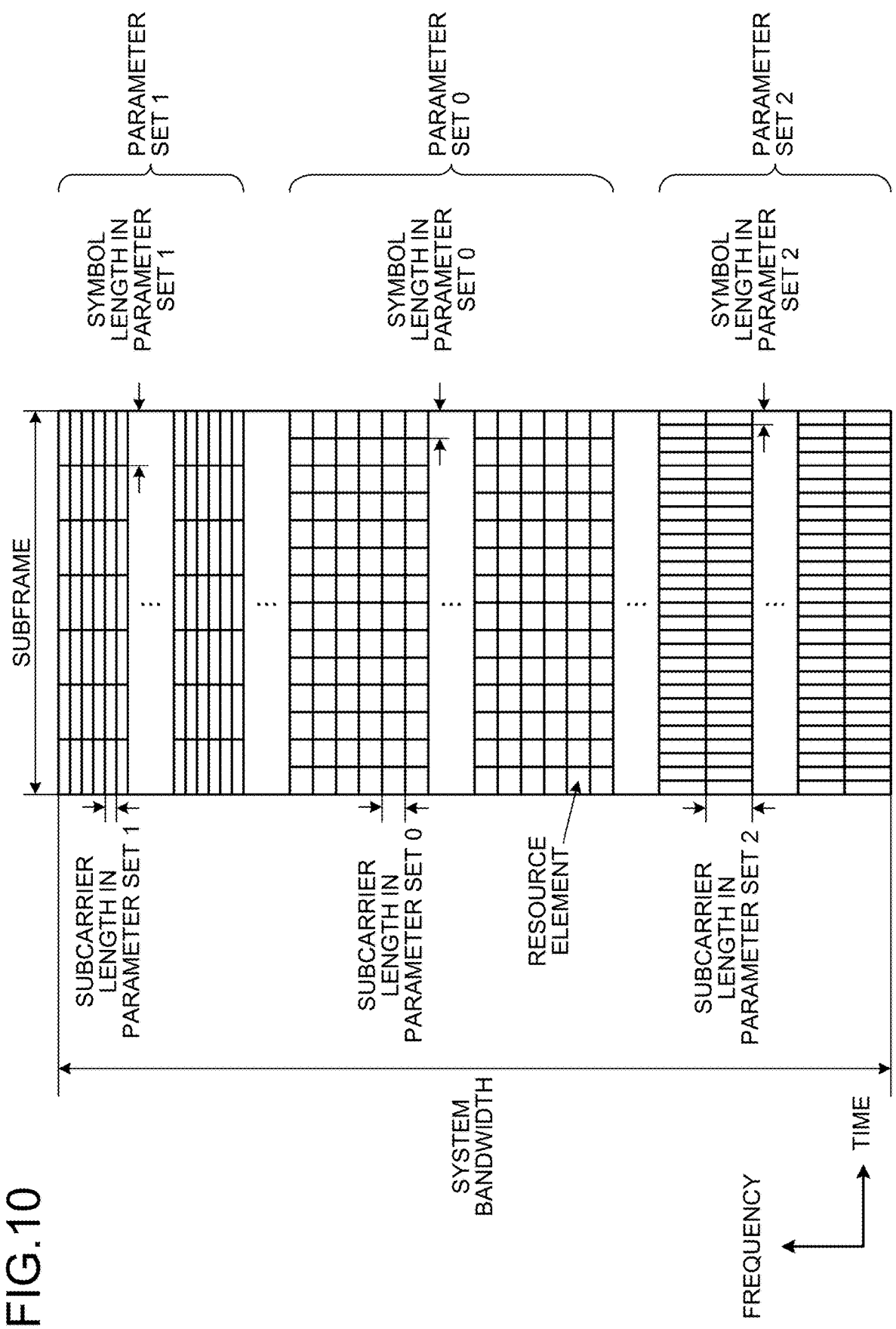
FIG. 10 is a diagram illustrating an example of a downlink subframe in NR.

FIG. 10 is a diagram illustrating an example of a downlink subframe in NR. In the example of FIG. 10, signals generated using the parameter set 1, parameter set 0, and parameter set 2 are frequency-division multiplexed (FDM) over a cell bandwidth (system bandwidth).

3. About NOMA

In orthogonal multiple access (OMA), for example, transmission and reception of data are performed using a frequency axis and a time axis that are orthogonal to each other. At this time, a frame configuration of a frequency-time resource is determined according to the subcarrier spacing, and it is not allowed to use the resource equal to or more than the number of resource elements. Meanwhile, in the orthogonal multiple access (NOMA), a non-orthogonal axis (e.g., interleave pattern axis, spreading pattern axis, scrambling pattern axis, codebook axis, power axis, or the like) is added to the frequency axis and time axis that are orthogonal to each other to determine the frame configuration.

<3-1. Transmitting and Receiving Data by Using NOMA>

Figure 11:
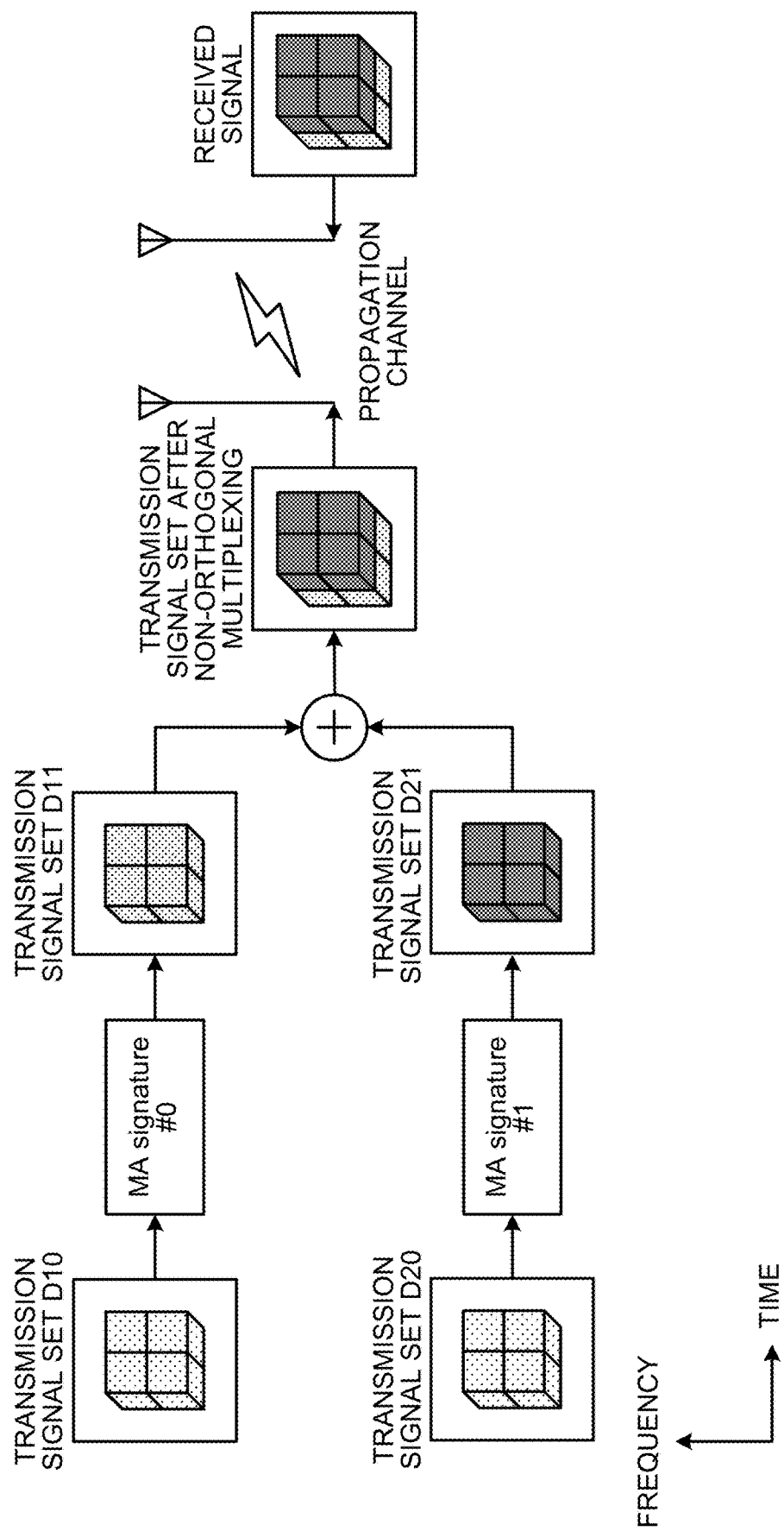
FIG. 11 is an explanatory diagram illustrating an example of a NOMA transmission process according to an embodiment of the present disclosure.

FIG. 11 is an explanatory diagram illustrating an example of a NOMA transmission process according to an embodiment of the present disclosure. The example of FIG. 11 illustrates how the transmission device multiplexes transmission signals on the non-orthogonal axes and transmits a multiplexed signal. In the example of FIG. 11, all resources multiplexed on the non-orthogonal axes have the same parameter set. Here, the transmission device is the communication device such as the base station device 20, the relay device 30, or the terminal device 40. In the example of FIG. 11, one transmission device (e.g., the terminal device 40$_1$) multiplexes two transmission signal sets.

Note that the NOMA transmission process described below is implemented, for example, by controlling the transmission processing unit 412 by the control unit 45 of the terminal device 40. Alternatively, the following transmission processing is implemented, for example, by controlling the transmission processing unit 212 by the control unit 23 of the base station device 20.

The transmission signal set represents, for example, a signal that is generated by subjecting part or whole of transmission data generated in the communication device to signal processing for radio communication. In other words, the transmission signal set is transmission data (part or whole of the transmission data) that has been subjected to signal processing for radio communication. Here, the transmission data is data relating to a process that has generated in the communication device. For example, the transmission data is data related to a transmission job generated in various programs (e.g., application programs and operating system) performed by the communication device.

Note that in the present embodiment, the transmission data is divided into a plurality of pieces of data. In the following description, data serving as a transmission unit (division unit) of the transmission data is referred to as transmission unit data. Here, the transmission unit data may be one IP packet or one transport block. As a matter of course, the transmission unit data may be another transmission unit. The transport block is a unit of error correction such as hybrid automatic repeat request (hybrid ARQ (HARQ)). For example, the transport block is a block of data in a transport channel (transport layer). Note that the transmission signal set may be a signal (transmission unit data) generated by performing signal processing on the transmission unit data such as a transport block. In the following description, the transmission signal set is assumed to be data obtained by performing signal processing for radio communication using OFDM on the transmission unit data such as the transport block.

The transmission signal set (transmission unit data) may include a plurality of blocks or a plurality of elements. For example, it is assumed that the transmission signal set is the transport block. At this time, in the transmission signal set, the transmission unit data may include a plurality of resource blocks or resource elements. In the following example, the transmission signal set is assumed to include a plurality of blocks. In the example of FIG. 11, transmission signal sets D10 and D20 each include four blocks (e.g., resource blocks).

In the example of FIG. 11, the transmission device applies a corresponding multiple access signature (MA signature) to each of the transmission signal sets D10 and D20. The MA signature is one piece of information relating to non-orthogonal multiplexing. For example, the MA signature includes an interleave pattern, spreading pattern, scrambling pattern, codebook, power allocation, or the like. Note that the MA signature may be simply referred to as pattern or index. For example, the MA signature may be an identifier that indicates the pattern or index used in NOMA transmission as described above or may represent the pattern itself. In the following description, applying an MA signature to a predetermined transmission signal set may be referred to as the NOMA transmission process using an MA signature. An example of the NOMA transmission process using an MA signature includes a process of converting the predetermined transmission signal set mapped on the predetermined orthogonal resource into a transmission signal set that is transmittable using the non-orthogonal resource indicated by the MA signature.

In the example of FIG. 11, the transmission device (e.g., the control unit 45 of the terminal device 40$_1$) performs the NOMA transmission process using an MA signature #0 for the transmission signal set D10 and performs the NOMA transmission process using an MA signature #1 for the transmission signal set D20. The MA signature #0 and MA signature #1 are the corresponding non-orthogonal resources. For example, it is assumed that an MA signature represents power allocation (i.e., the non-orthogonal axis is the power axis). At this time, the MA signature #0 may be information indicating that the predetermined transmission signal set is converted into a transmission signal set with small power (e.g., power equal to or lower than a first threshold value). Furthermore, the MA signature #1 may be information indicating conversion of the predetermined transmission signal set into a transmission signal set with large power (e.g., power of equal to or more than a second threshold value larger than the first threshold value). The transmission device multiplexes signals obtained after application of the MA signatures, on the same frequency-time resource. For example, the transmission device non-orthogonally multiplexes transmission signal sets D11 and D21 that are generated as a result of the NOMA transmission process, on the same orthogonal resource. Then, the transmission device (e.g., the control unit 45 of the terminal device 40$_1$) transmits a transmission signal obtained after non-orthogonal multiplexing to an antenna port.

Figure 12:
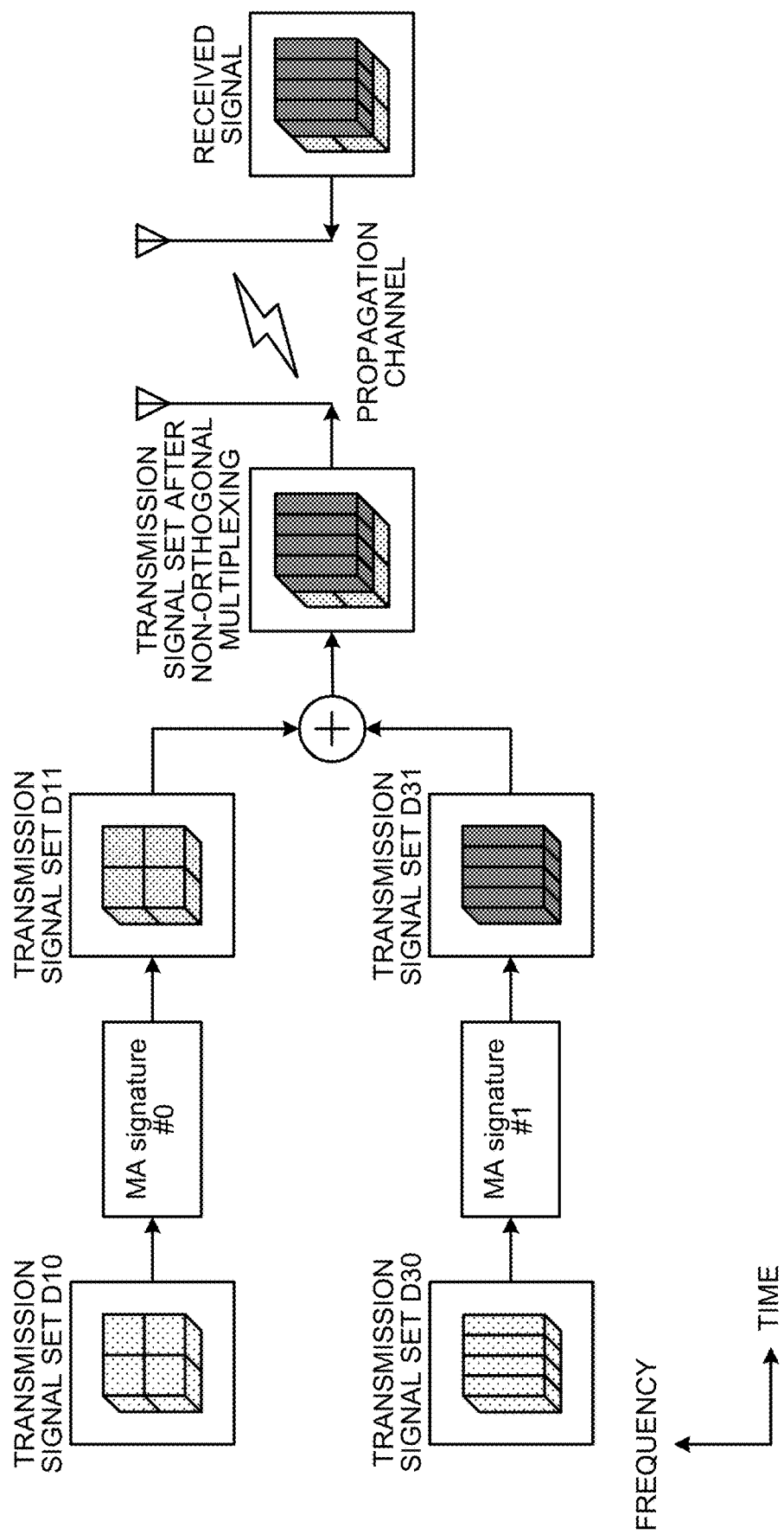
FIG. 12 is an explanatory diagram illustrating an example of a NOMA transmission process according to an embodiment of the present disclosure.

Furthermore, in the example of FIG. 11, the transmission device multiplexes the transmission signal sets having the same parameter set. However, the transmission device may multiplex transmission signal sets having different parameter sets. FIG. 12 is an explanatory diagram illustrating an example of a NOMA transmission process according to an embodiment of the present disclosure. In the example of FIG. 12, two transmission signal sets having different parameter sets are multiplexed. Specifically, in the example of FIG. 12, the transmission device (e.g., the control unit 45 of the terminal device 40$_1$) performs the NOMA transmission process using MA signatures (MA signatures #0 and #1) respectively corresponding to transmission signal sets D10 and D30. The transmission signal sets D30 and D40 are transmission signal sets having different parameter sets. Then, the transmission device non-orthogonally multiplexes transmission signal sets D11 and D31 that are generated as a result of the NOMA transmission process, on the same orthogonal resource. Then, the transmission device (e.g., the control unit 45 of the terminal device 40$_1$) transmits the transmission signal obtained after non-orthogonal multiplexing to the antenna port.

Figure 13:
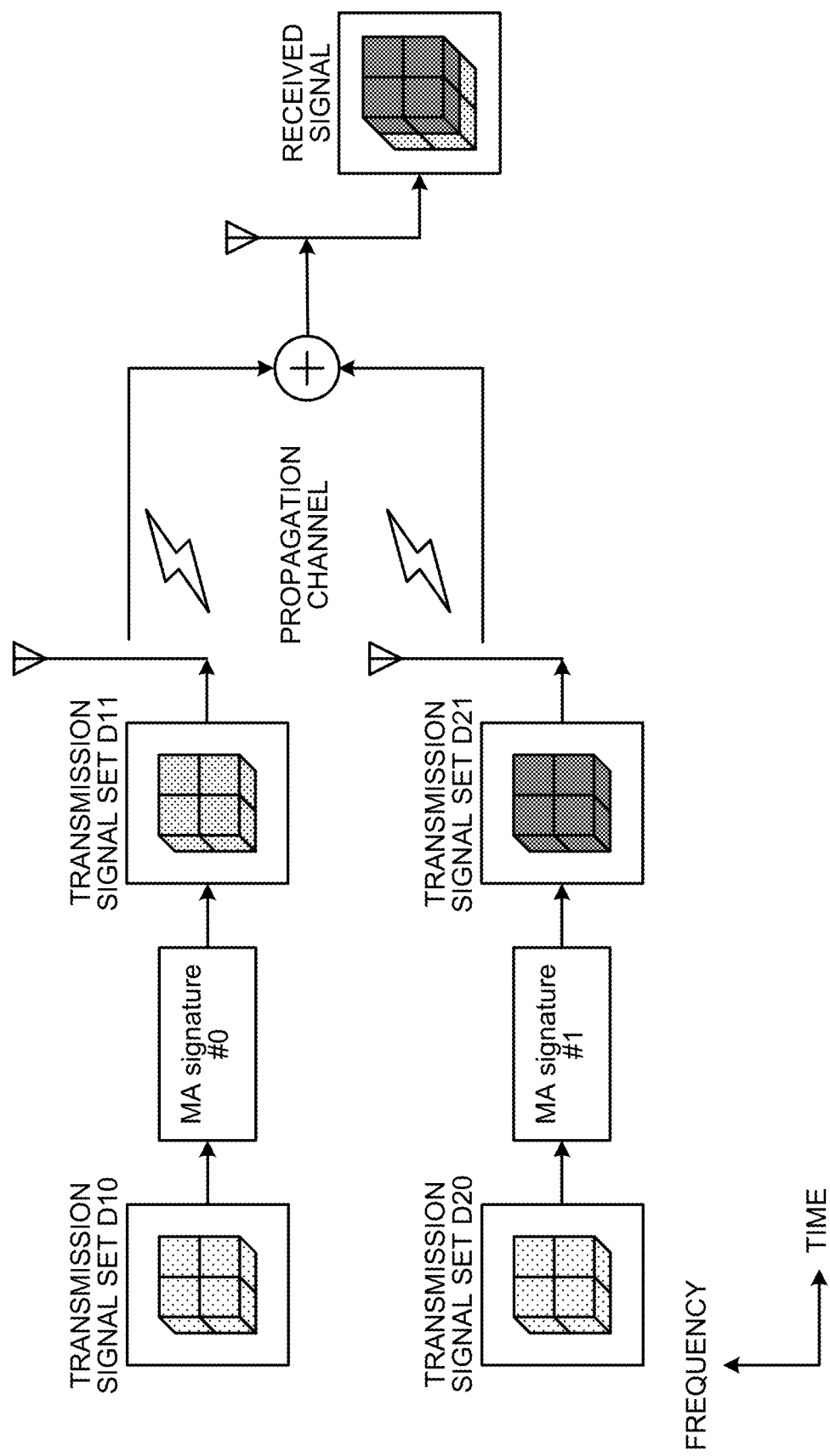
FIG. 13 is an explanatory diagram illustrating an example of a NOMA transmission process according to an embodiment of the present disclosure.

Note that in each of the examples of FIGS. 11 and 12, a plurality of transmission signal sets is non-orthogonally multiplexed in the transmission device. However, a plurality of transmission signal sets may be non-orthogonally multiplexed on a propagation channel. FIG. 13 is an explanatory diagram illustrating an example of a NOMA transmission process according to an embodiment of the present disclosure. In the example of FIG. 13, two transmission signal sets are transmitted from different antennas. The plurality of transmission signal sets may be transmitted from separate transmission devices (e.g., the terminal devices 40$_1$ and 40$_2$) or may be transmitted from different antennas of one transmission device (e.g., the terminal device 40$_1$). In the following description, it is assumed that the two transmission signal sets are transmitted from separate transmission devices, but, as a matter of course, the two transmission signal sets may be transmitted from one transmission device.

In the example of FIG. 13, one transmission device (e.g., the terminal device 40$_1$) performs the NOMA transmission process using the MA signature #0 for the transmission signal set D10. Furthermore, the other transmission device (e.g., the terminal device 40$_2$) performs the NOMA transmission process using the MA signature #1 for the transmission signal set D20. The MA signature #0 and MA signature #1 are the corresponding non-orthogonal resources. For example, the MA signature includes an interleave pattern, spreading pattern, scrambling pattern, codebook, power allocation, repetition, or the like. Transmission signal sets D11 and D21 obtained after application of the MA signatures are transmitted on the same frequency-time resource, and are multiplexed through the propagation channel.

Figure 14:
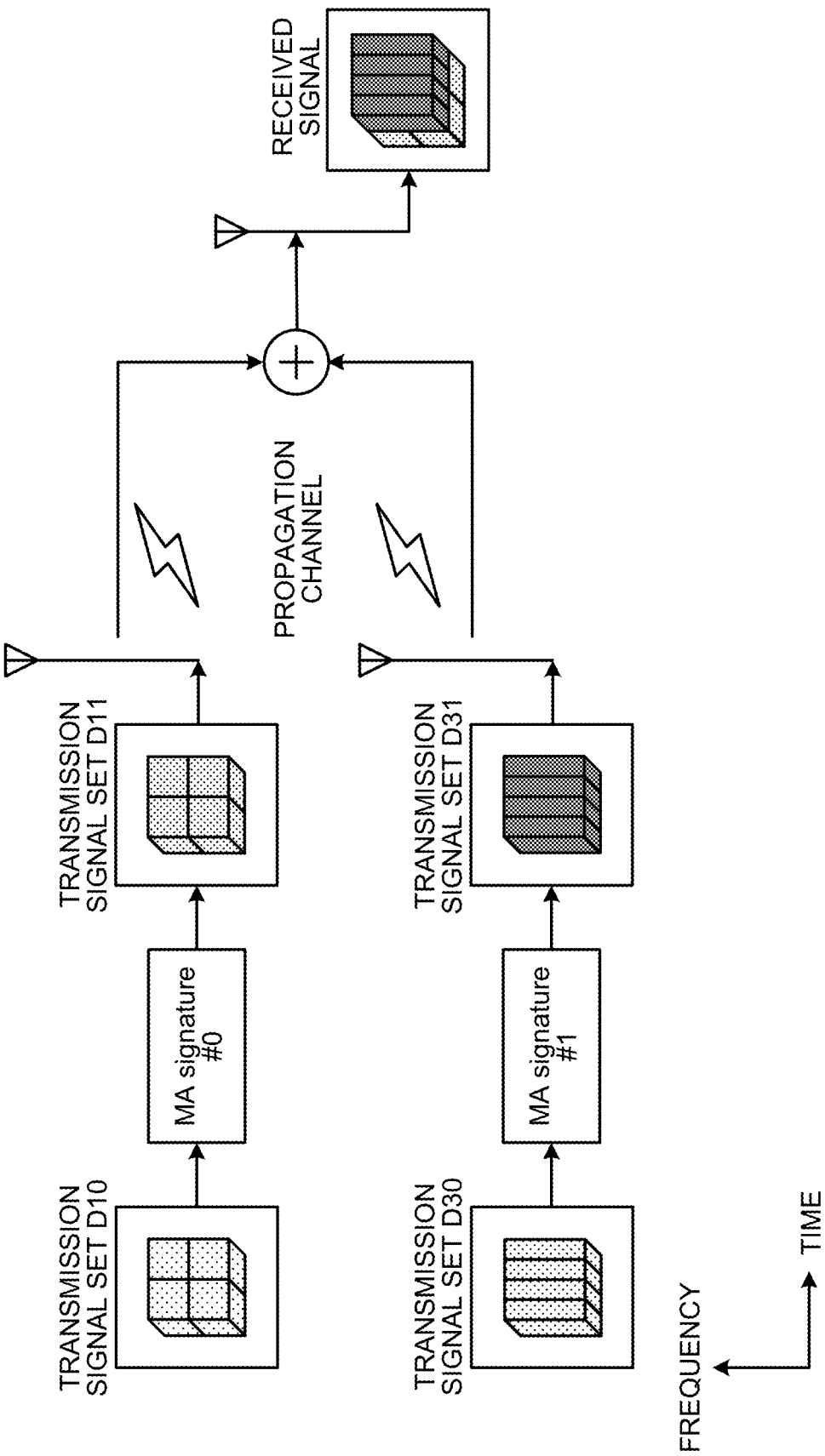
FIG. 14 is an explanatory diagram illustrating an example of a NOMA transmission process according to an embodiment of the present disclosure.

Furthermore, in the example of FIG. 13, the transmission signal sets having the same parameter set are multiplexed. However, transmission signal sets to be multiplexed may be transmission signal sets having different parameter sets. FIG. 14 is an explanatory diagram illustrating an example of a NOMA transmission process according to an embodiment of the present disclosure. In the example of FIG. 14, two transmission signal sets having different parameter sets are multiplexed. Specifically, in the example of FIG. 14, one transmission device (e.g., the terminal device 40$_1$) performs the NOMA transmission process using the MA signature #0 for the transmission signal set D10. The other transmission device (e.g., the terminal device 40$_2$) performs the NOMA transmission process using the MA signature #1 for a transmission signal set D30. The transmission signal sets D10 and D30 are transmission signal sets having different parameter sets. Furthermore, the MA signature #0 and the MA signature #1 are the corresponding non-orthogonal resources. Transmission signal sets D11 and D31 obtained after application of the MA signatures are transmitted on the same frequency-time resource, and are multiplexed through the propagation channel.

Figure 15:
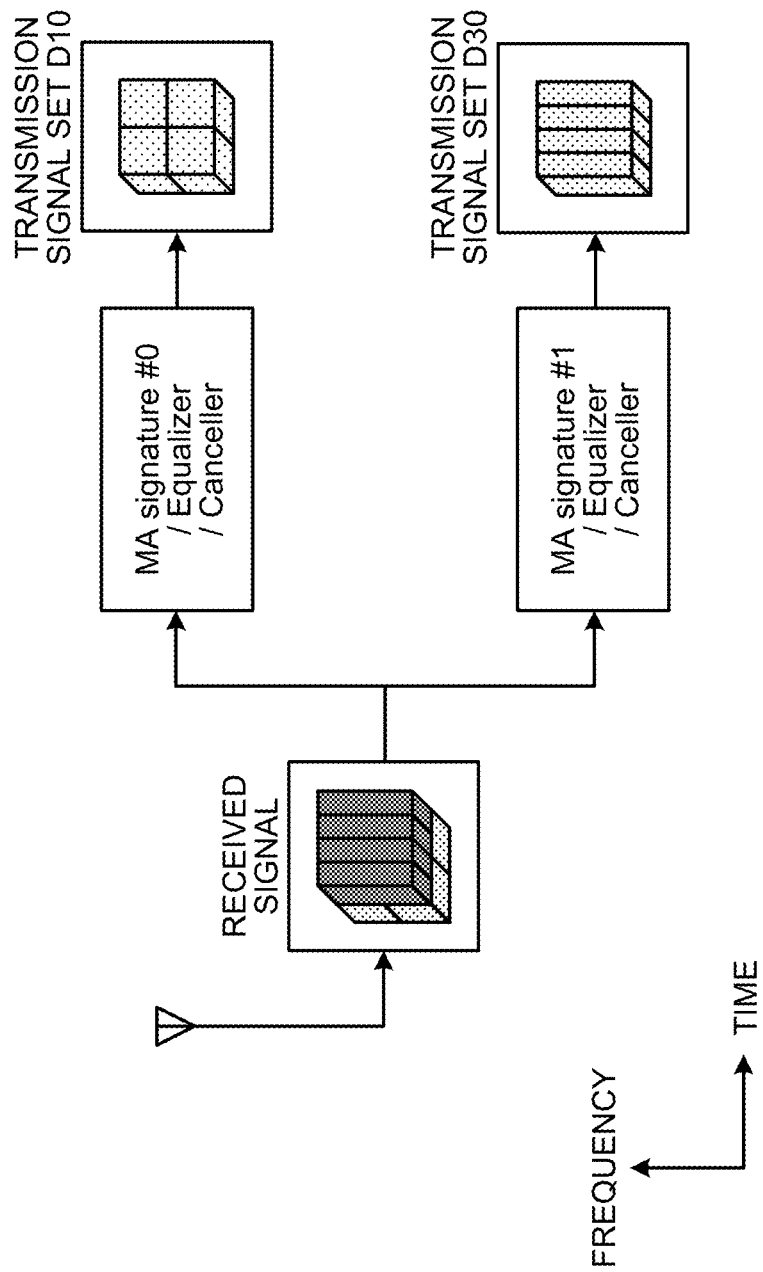
FIG. 15 is an explanatory diagram illustrating an example of a NOMA reception process according to an embodiment of the present disclosure.

FIG. 15 is an explanatory diagram illustrating an example of a NOMA reception process according to an embodiment of the present disclosure. Note that the NOMA reception process described below is implemented by controlling the reception processing unit 211 by the control unit 23 of the base station device 20. Alternatively, the NOMA reception process described below is implemented, for example, by controlling the reception processing unit 411 by the control unit 45 of the terminal device 40.

As illustrated in FIG. 15, a received signal is received in a state where a plurality of transmission signals is multiplexed on the same frequency-time resource. In order to decode multiplexed transmission signal sets, a reception device (e.g., the control unit 23 of the base station device $20_1$) performs the NOMA reception process (e.g., channel equalization and processing of an interference signal canceller or the like), on the basis of MA signatures used in the transmission device. Therefore, the reception device extracts a desired signal from the received signal. In the example of FIG. 15, the reception device performs the NOMA reception process using the MA signature #0 and the MA signature #1 for the received signal and extracts the transmission signal sets D10 and D30. Note that when the same MA signature is used for multiplexing, influence of interference between the multiplexed signals will be large, and it is difficult to perform decoding. Therefore, the base station device 20 schedules the MA signatures used by the terminal device 40 or the like to avoid overlapping of the MA signatures.

As described above, in the NOMA transmission, it is necessary to share, between the transmission device and the reception device, MA signatures having been applied to the transmission device and the reception device and to apply the MA signatures without overlapping. Note that in the following description, MA signatures are also included in the concept of resource (radio resource). Here, the resource including all of the frequency, time, and MA signatures may be referred to as a multiple access resource (MA resource). Furthermore, a resource including only frequency and time may be referred to as a multiple access physical resource (MA physical resource).

<3-2. Efficient Use of MA Resource>

In the examples of FIGS. 11 to 15, the same MA signature is applied to one transmission signal set (e.g., one piece of transmission unit data). However, in this case, the communication system 1 may not be able to use the MA resource efficiently.

Figure 16:
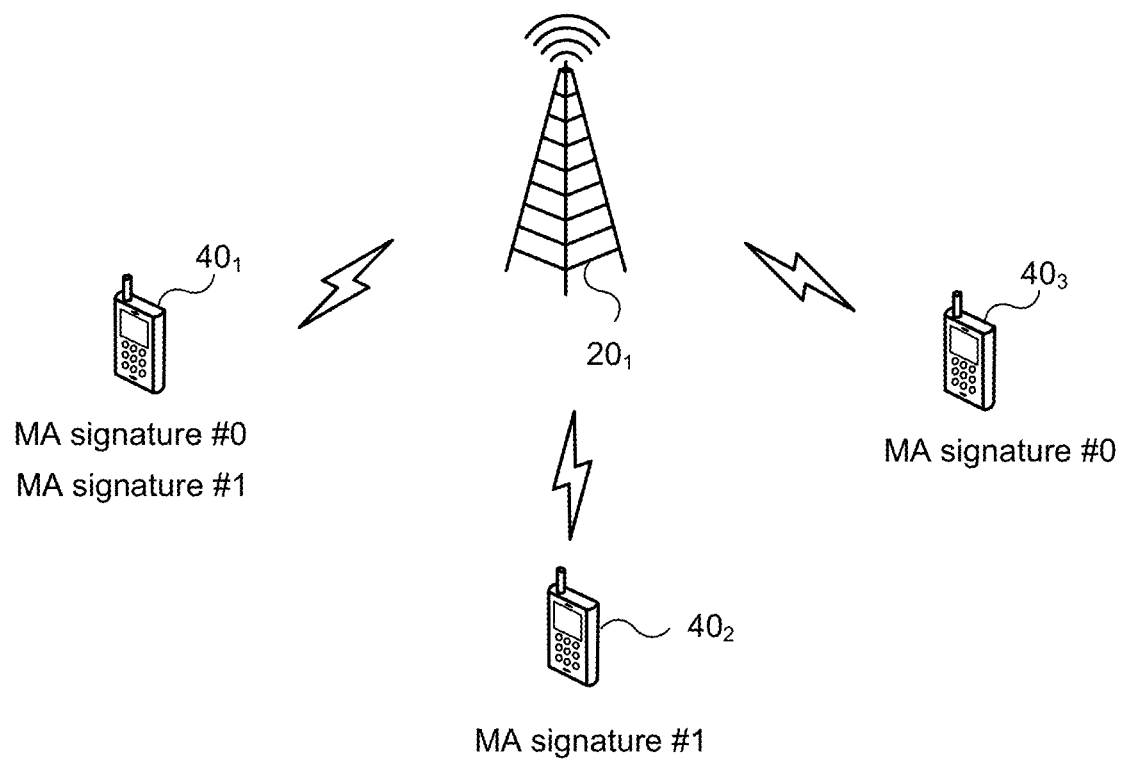
FIG. 16 is a diagram illustrating radio connection between a base station device and three terminal devices.

FIG. 16 is a diagram illustrating radio connection between the base station device $20_1$ and the three terminal devices $40_1$, $40_2$, and $40_3$. In the example of FIG. 16, the terminal devices $40_1$, $40_2$, and $40_3$ function as transmission devices, and the base station device $20_1$ functions as the reception device. In the example of FIG. 16, the terminal devices $40_1$, $40_2$, and $40_3$ have restricted available MA signatures. In the example of FIG. 16, the terminal device $40_1$ is configured to transmit data by using both of the MA signature #0 and the MA signature #1. Furthermore, the terminal device $40_2$ is configured not to use the MA signature #0 but to use only the MA signature #1 to transmit data. Still furthermore, the terminal device $40_3$ is configured not to use the MA signature #1 but to use only the MA signature #0 to transmit data. Note that the terminal devices $40_2$ and $40_3$ illustrated in FIG. 16 may not necessarily be terminals configured to perform the NOMA transmission process. For example, the terminal devices $40_2$ and $40_3$ may be terminals (OMA terminals) configured to perform only orthogonal multiple access (OMA), which can be considered as terminals equivalent to terminals configured to perform only data transmission using the MA signature #0 or MA signature #1.

Figure 17:
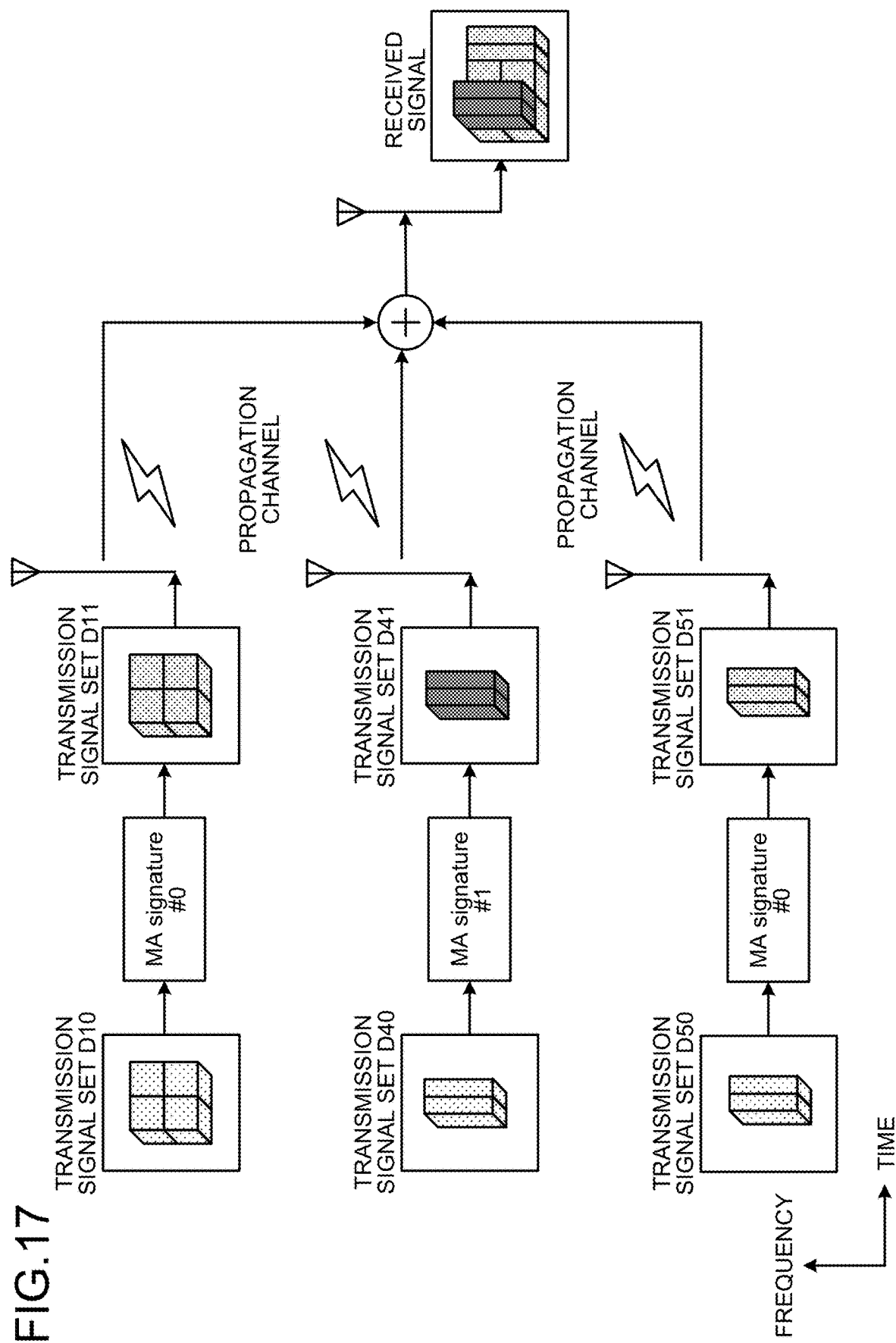
FIG. 17 is an explanatory diagram illustrating an example of a NOMA transmission process according to an embodiment of the present disclosure.

Here, it is assumed that the terminal device $40_1$ acquires transmission unit data of four blocks and the terminal devices $40_2$ and $40_3$ each acquire transmission unit data of two blocks. FIG. 17 is an explanatory diagram illustrating an example of a NOMA transmission process according to an embodiment of the present disclosure. In the example of FIG. 17, the transmission signal set D10 is obtained by performing signal processing on transmission unit data acquired by the terminal device $40_1$ into a signal transmittable by using the MA physical resource. Furthermore, a transmission signal set D40 is obtained by performing signal processing on transmission unit data acquired by the terminal device $40_2$ into a signal transmittable by using the MA physical resource. Furthermore, a transmission signal set D50 is obtained by performing signal processing on transmission unit data acquired by the terminal device $40_2$ into a signal transmittable by using the MA physical resource.

In the example of FIG. 17, the terminal device $40_1$ (e.g., the control unit 45 of the terminal device $40_1$) applies the MA signature #0 to the transmission signal set D10 to generate the transmission signal set D11. Furthermore, the terminal device $40_2$ applies the MA signature #1 to the transmission signal set D40 to generate a transmission signal set D41. Furthermore, the terminal device $40_3$ applies the MA signature #0 to the transmission signal set D50 to generate a transmission signal set D51. Here, the MA signature #0 and the MA signature #1 represent the corresponding non-orthogonal resources.

At this time, the NOMA transmission process using corresponding MA signatures has been performed on the transmission signal sets D11 and D41, and the transmission signal sets D11 and D41 can be non-orthogonally multiplexed on the same MA physical resource. However, the NOMA transmission process using the corresponding MA signatures is not performed on the transmission signal sets D11 and D51, and the transmission signal sets D11 and D51 cannot be non-orthogonally multiplexed on the same MA physical resource. Therefore, the base station device $20_1$ has no choice but to allocate the transmission signal set D11 and the transmission signal set D51 onto different MA physical resources (on the frequency axis and time axis). Thus, the base station device $20_1$ has no choice but to secure many MA physical resources so that the three terminal devices $40_1$, $40_2$, and $40_3$ transmit data. In the example of FIG. 17, the base station device $20_1$ has no choice but to secure the MA physical resource of six blocks. Thus, the communication system 1 cannot efficiently use the resource as a whole.

Therefore, the present embodiment enables the NOMA transmission process for a partial range of transmission data (or transmission unit data). At this time, the NOMA transmission process may or may not be performed for the other range of the transmission data (or transmission unit data). For example, the transmission device divides one piece of transmission unit data into a plurality of NOMA application ranges (NOMA application units) and performs the NOMA transmission process using a predetermined MA signature on each of the plurality of NOMA application ranges. The NOMA application range is a range (unit) to which one MA signature is applied. The NOMA application ranges can be also referred to as NOMA application units.

Figure 18:
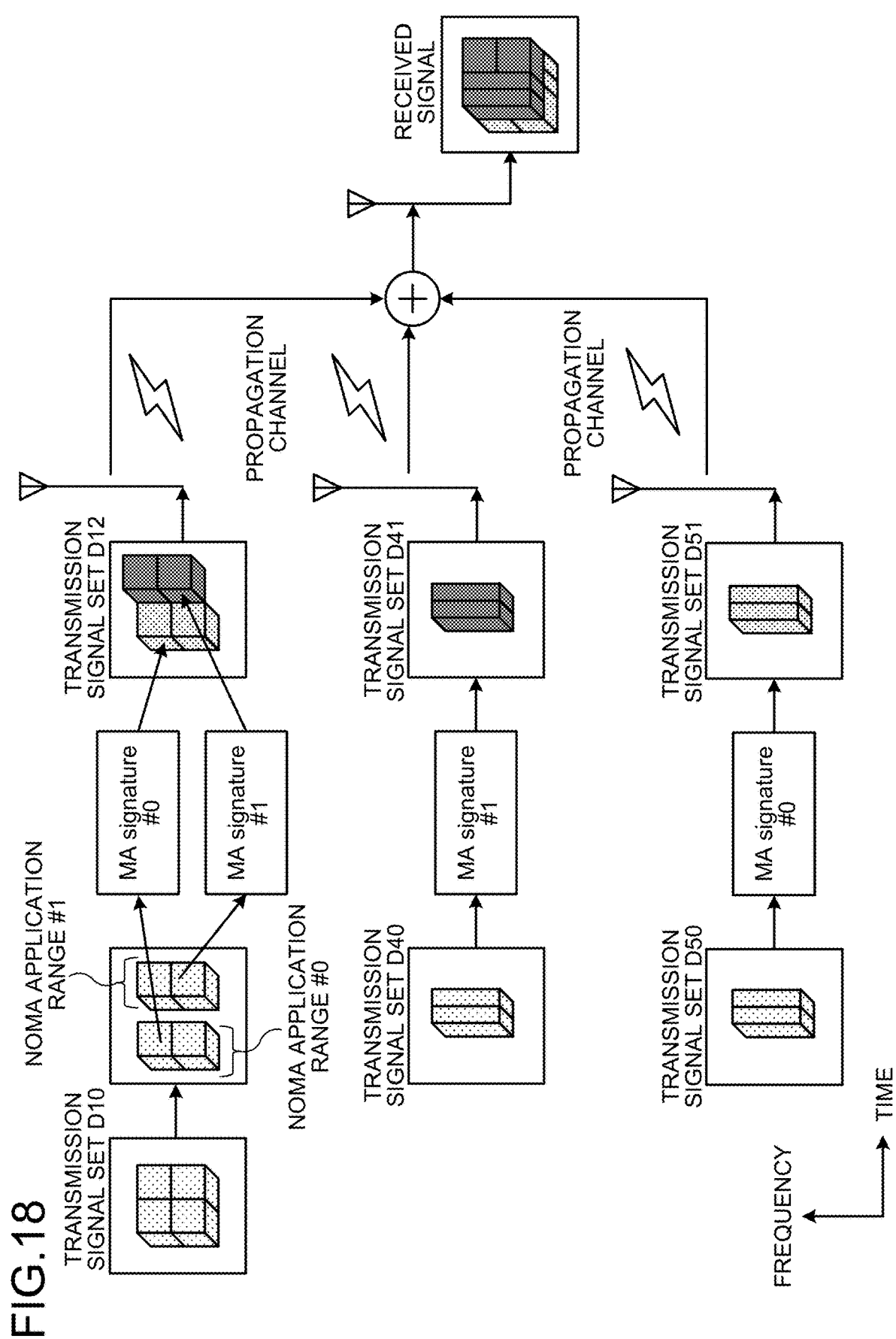
FIG. 18 is an explanatory diagram illustrating an example of a NOMA transmission process according to an embodiment of the present disclosure.

FIG. 18 is an explanatory diagram illustrating an example of a NOMA transmission process according to an embodiment of the present disclosure. The NOMA transmission process described below is implemented, for example, by controlling the transmission processing unit 412 by the control unit 45 of the terminal device 40, as in the NOMA transmission processes of FIGS. 11 to 14. Note that when the transmission device is the base station device 20, the following transmission processing may be implemented, for example, by controlling the transmission processing unit 212 by the control unit 23 of the base station device 20.

In the example of FIG. 18, the terminal device 40$_1$ divides the transmission signal set D10 of four blocks into sets of two blocks in the time direction. In the example of FIG. 18, the first two blocks are a NOMA application range #0 and the latter two blocks are a NOMA application range #1. Then, the terminal device 40$_1$ performs the NOMA transmission process using the MA signature #0 on the NOMA application range #0 and the NOMA transmission process using the MA signature #1 on the NOMA application range #1. Thus, a transmission signal set D12 is generated.

The MA signature #0 is applied to the portion of the NOMA application range #0 of the transmission signal set D12, and the portion can be non-orthogonally multiplexed with the transmission signal set D41 generated by applying the MA signature #1. Furthermore, the MA signature #1 is applied to the portion of the NOMA application range #1 of the transmission signal set D12, and thus, the portion can be non-orthogonally multiplexed with the transmission signal set D51 generated by applying the MA signature #0. Therefore, the base station device 20$_1$ only needs to secure the MA physical resource of four blocks, for transmission of data by each of the three terminal devices 40$_1$, 40$_2$, and 40$_3$.

Figure 19:
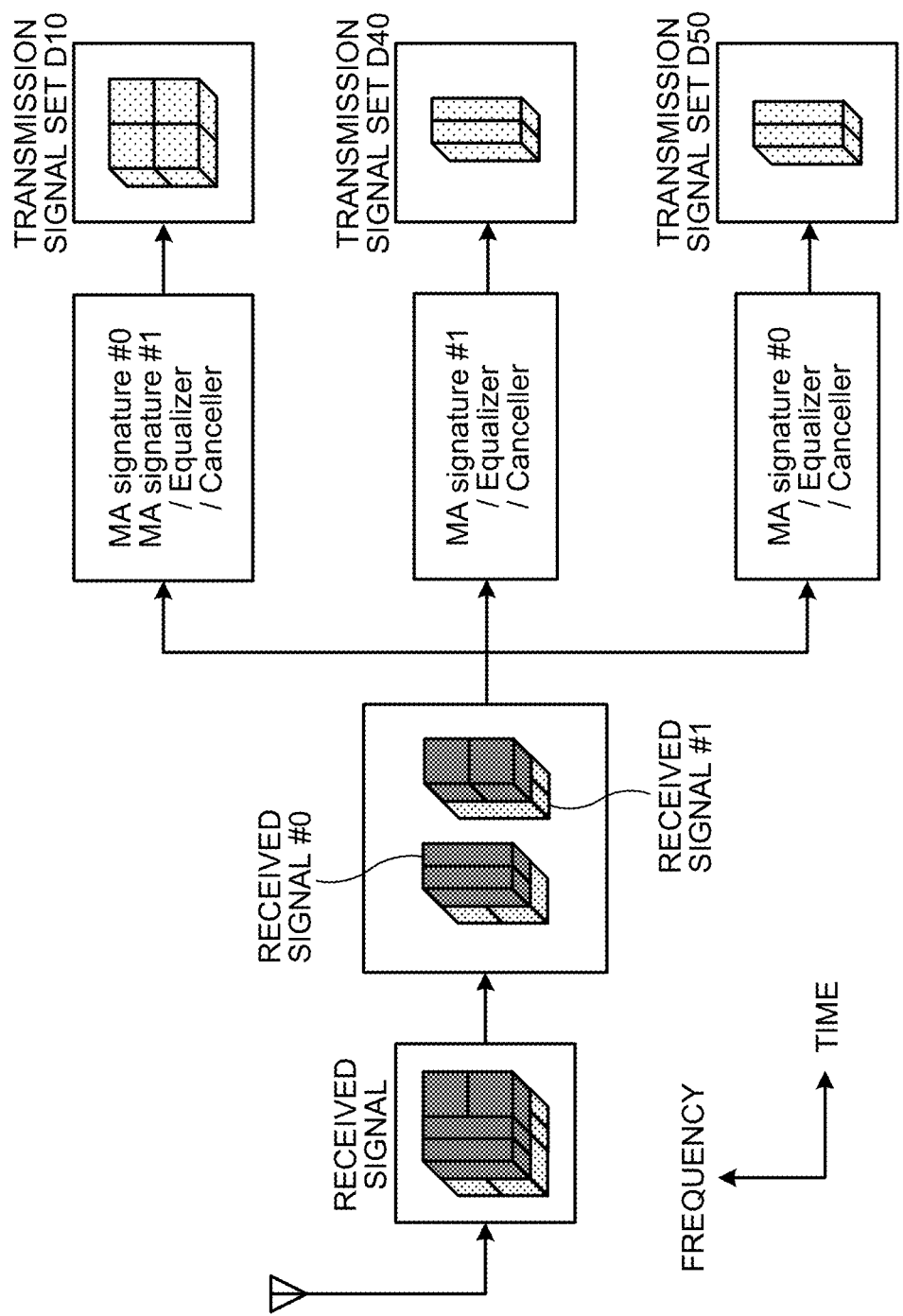
FIG. 19 is an explanatory diagram illustrating an example of a NOMA reception process according to an embodiment of the present disclosure.

FIG. 19 is an explanatory diagram illustrating an example of a NOMA reception process according to an embodiment of the present disclosure. Note that the NOMA reception process described below is implemented by controlling the reception processing unit 211 by the control unit 23 of the base station device 20, as in the NOMA reception process illustrated in FIG. 15. Alternatively, the NOMA reception process described below is implemented, for example, by controlling the reception processing unit 411 by the control unit 45 of the terminal device 40.

As illustrated in FIG. 19, the base station device 20$_1$ (e.g., the control unit 23 of the base station device 20$_1$) receives a received signal in which a plurality of transmission signals is multiplexed on the same frequency-time resource. In order to decode multiplexed transmission signal sets, the base station device 20$_1$ (e.g., the control unit 23 of the base station device 20$_1$) performs the NOMA reception process, on the basis of MA signatures used in the transmission device.

For example, the base station device 20$_1$ divides the received signal according to the division used for the NOMA transmission process by the terminal device 40$_1$. For example, the base station device 20$_1$ divides the received signal into sets of two blocks in the time direction. Hereinafter, the first two blocks will be referred to as a received signal #0, and the latter two blocks will be referred to as a received signal #1. Then, the base station device 20$_1$ performs the NOMA reception process using the MA signature #0 for the received signal #0 and the NOMA reception process using the MA signature #1 for the received signal #1. Thereby the base station device 20$_1$ extracts the transmission signal set D10 from the received signal. Furthermore, the base station device 20$_1$ performs the NOMA reception process using the MA signature #1 for the received signal #0. Thereby, the base station device 20$_1$ extracts the transmission signal set D40 from the received signal. Furthermore, the base station device 20$_1$ performs the NOMA reception process using the MA signature #0 for the received signal #1. Thereby, the base station device 20$_1$ extracts the transmission signal set D50 from the received signal.

For example, in the examples of FIGS. 18 and 19, the transmission unit data includes four blocks, but the transmission unit data may include more than four blocks, or may include less than four blocks.

As described above, the transmission device divides one piece of transmission unit data into the plurality of NOMA application ranges and performs the NOMA transmission process using the predetermined MA signature on each of the plurality of NOMA application ranges. This configuration enables the communication system 1 to flexibly allocate the MA resource to each transmission device according to the state of each transmission device. Therefore, the communication system 1 is configured to efficiently use the resource as a whole.

<3-3. Specific Examples of NOMA Application Range>

Note that the division of transmission unit data is not limited to the example illustrated in FIG. 19. The communication system 1 is configured to adopt various division patterns to divide transmission unit data (e.g., transport block). The division patterns are each a division pattern used to divide the transmission unit data (or transmission data) into a plurality of NOMA application ranges.

In the following description, it is assumed that the transmission device is the terminal device 40 and the reception device is the base station device 20, but the transmission device and the reception device are not limited to this example. For example, the transmission device may be the base station device 20 or the relay device 30. Furthermore, the reception device may be the relay device 30 or the terminal device 40. The following processing is executed, for example, by the control unit 45 of the terminal device 40. If the transmission device is the base station device 20, the following processing may be performed by the control unit 23 of the base station device 20.

[Example of Division of Transmission Unit Data]

In the description of FIG. 19, the terminal device 40 divides the transmission unit data into two NOMA application ranges (NOMA application units), but the number of the NOMA application range included in one piece of transmission unit data is not limited to two. The terminal device 40 may divide the transmission unit data into more than two NOMA application ranges. Furthermore, the transmission unit data may be divided in the frequency direction or the time direction.

Figure 20:
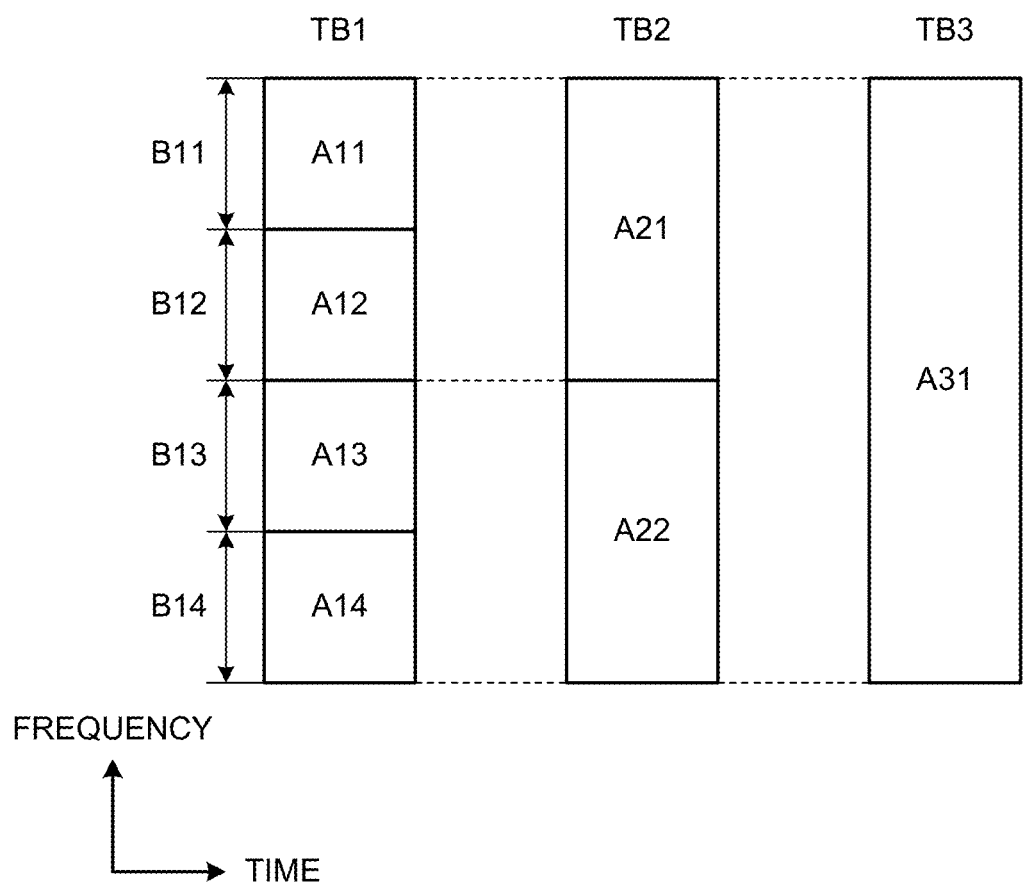
FIG. 20 is a diagram illustrating a specific example of division patterns.

FIG. 20 is a diagram illustrating a specific example of division patterns. In the example of FIG. 20, transmission unit data is the transport block. In FIG. 20, three transport blocks of transport blocks TB1, TB2, and TB3 are illustrated that are arranged on the MA physical resource. The terminal device 40 divides the transport block TB1 into four NOMA application ranges A11, A12, A13, and A14 in the frequency direction. Furthermore, the terminal device 40 divides the transport block TB2 into two NOMA application ranges A21 and A22 in the frequency direction. Note that the terminal device 40 does not necessarily need to divide the transmission unit data into the plurality of NOMA application ranges. One piece of transmission unit data may be set as one NOMA application range without any change. In the example of FIG. 20, the terminal device 40 sets the transport block TB3 as one NOMA application range A31.

Figure 21:
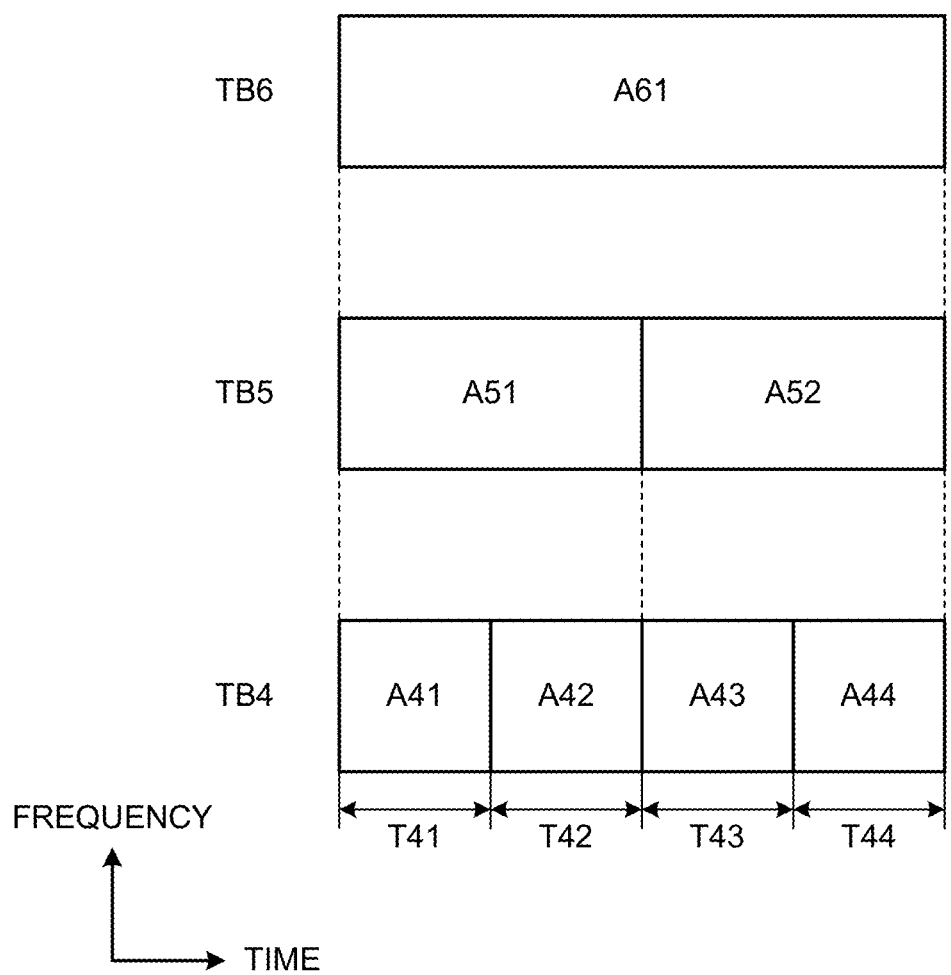
FIG. 21 is a diagram illustrating a specific example of division patterns.

Furthermore, a division direction of the transmission unit data is not limited to the frequency direction. FIG. 21 is a diagram illustrating a specific example of division patterns. In FIG. 21, three transport blocks TB4, TB5, and TB6 are illustrated that are arranged on the MA physical resource.

The terminal device 40 divides the transport block TB4 into four NOMA application ranges A41, A42, A43, and A44 in the time direction. Furthermore, the terminal device 40 divides the transport block TB5 into two NOMA application ranges A51 and A52 in the time direction. Note that the terminal device 40 may set the transport block TB6 as one NOMA application range A61 without any change.

Note that the terminal device 40 does not necessarily need to set the same division pattern to all transmission unit data. The terminal device 40 may switch the division patterns according to a predetermined criterion. For example, the terminal device 40 divides a certain transport block into four NOMA application ranges as illustrated in the transport TB4 of FIG. 21. Furthermore, the terminal device 40 divides another transport block into two NOMA application ranges as illustrated in the transport TB5 of FIG. 21. At this time, the terminal device 40 may switch the division patterns for the respective transmission unit data or may switch the division patterns at fixed time intervals. As a matter of course, the terminal device 40 may switch the division patterns according to another criterion.

Furthermore, one NOMA application range can vary in size. For example, the NOMA application range may have a size as indicated in the following (A1) to (A3). As a matter of course, the size of the NOMA application range is not limited to the following (A1) to (A3).

(A1) 1 resource block
(A2) 1 subcarrier×1 slot
(A3) 12 subcarriers×1 symbol

A plurality of NOMA application ranges included in one piece of transmission unit data may or may not all have the same size. For example, in the example of FIG. 20, bandwidths B11, B12, B13, and B14 may have the same size. For example, the bandwidths B11, B12, B13, and B14 may each have a bandwidth of one resource block. Furthermore, some or all of the bandwidths B11, B12, B13, and B14 may have different bandwidths. Furthermore, in the example of FIG. 21, times T41, T42, T43, and T44 may have the same size. For example, the times T41, T42, T43, and T44 may each have a time of one resource block (e.g., 14 symbols). Furthermore, some or all of the times T41, T42, T43, and T44 may have different bandwidths. For example, the NOMA application ranges A41 and A43 may have three symbols, and the NOMA application ranges A42 and A44 may have four symbols.

[MA Signature Applied to NOMA Application Range]

The NOMA transmission processes performed on a plurality of NOMA application ranges included in one piece of transmission unit data may have the same process content or different process contents. In other words, MA signatures applied to the plurality of NOMA application ranges may be the same or different.

For example, in the transport block TB4 of FIG. 21, MA signatures, for example, as indicated in the following (B1) to (B4) may be applied to the respective NOMA application ranges. As a matter of course, the MA signatures are not limited to the following (B1) to (B4).

(B1) Interleaving is applied to the NOMA application range A41, a spreading code is applied to the NOMA application range A42, and scrambling is applied to the NOMA application range A42.

(B2) A first interleave pattern is applied to the NOMA application range A41, and a second interleave pattern different from the first interleave pattern is applied to the NOMA application range A42.

(B3) A first spreading code is applied to the NOMA application range A41, and a second spreading code different from the first spreading code is applied to the NOMA application range A42.

(B4) A first transmission power setting is applied to the NOMA application range A41, and a second transmission power setting different from the first transmission power setting is applied to the NOMA application range A42

Furthermore, depending on a difference in NOMA application range, the terminal device 40 may change the MA signature to be applied to the NOMA application range. For example, the terminal device 40 may change the MA signature to be applied, depending on the size of the NOMA application range. As an example, the terminal device 40 uses different MA signatures for the NOMA application range having a size of four resource blocks and the NOMA application range having a size of one resource block. For example, it is assumed that the MA signature to be applied is the interleave pattern. At this time, the terminal device 40 makes an interleave pattern length used for the NOMA application range having a size of four resource blocks four times longer than an interleave pattern length used for the NOMA application range having a size of one resource block. This configuration can be similarly applied to the MA signature that is the spreading code or a scramble code.

Note that in the above example, the terminal device 40 applies, to at least one of the plurality of NOMA application ranges included in the transmission unit data, the MA signature different from the MA signatures applied to other NOMA application ranges. In other words, the terminal device 40 performs, on at least one of the plurality of NOMA application ranges included in the transmission unit data, the NOMA transmission process having a process content different from the NOMA transmission processes performed on the other NOMA application ranges included in the transmission unit data. However, the terminal device 40 may apply the same MA signature to all NOMA application ranges included in the transmission unit data. In other words, the terminal device 40 may apply the same NOMA transmission process on all NOMA application ranges included in the transmission unit data.

[Setting Examples of Division Patterns]

Various methods can be adopted to set the division patterns used by the terminal device 40 to the terminal device 40.

Setting Example 1

For example, the base station device 20 may notify the terminal device 40 of division pattern candidates that is available by the terminal device 40, in advance, before transmission data is generated in the terminal device 40. For example, before the transmission data is generated in the terminal device 40 (e.g., before receiving a resource allocation request from the terminal device 40), the base station device 20 notifies the terminal device 40 of several kinds of division pattern candidates in advance by using a control signal (e.g., RRC signaling). In the following description, information including the division pattern candidates is referred to as division pattern candidate information.

The division pattern candidate information may include, for example, division pattern information about four division patterns indicated in the following (C1) to (C4). It is assumed that in the four division patterns shown in (C1) to (C4), all of a plurality of NOMA application ranges included in transmission unit data have the same size. In addition, the size of one NOMA application range is shown as a division pattern. It should be noted that the division pattern information may include more information than the information indicated in the following (C1) to (C4). As a matter of course, the division pattern information is not limited to the following (C1) to (C4).

(C1) Division pattern 1: bandwidth of all resource blocks×1 slot
(C2) Division pattern 2: bandwidth of two resource blocks×1 slot
(C3) Division pattern 3: bandwidth of 1 resource block×1 slot
(C4) Division pattern 4: bandwidth of 12 subcarriers×7 symbols Note that the base station device 20 may separately notify the terminal device 40 of whether the terminal device 40 finally uses which of division pattern candidates that have been previously notified of. For example, after transmission data is generated in the terminal device 40, the base station device 20 may designate one of the division pattern candidates by using downlink control information (DCI).

Setting Example 2

In setting example 1, the base station device 20 transmits the division pattern candidate information to the terminal device 40, but the division pattern candidate information may be set in the terminal device 40 in advance. For example, a predetermined default division pattern and one switching division pattern may be set in the storage unit 42 of the terminal device 40. The default division pattern and the one switching division pattern may have sizes as indicated in the following (D1) to (D2). The base station device 20 (e.g., the base station device 20) may separately notify the terminal device 40 of whether which one of the default division pattern and one switching division pattern is to be used, by using the DCI or the like.

(D1) Default: bandwidth for all resource blocks×1 slot
(D2) Switching: bandwidth of two resource block×1 slot Setting Example 3

Furthermore, only the default division pattern may be set in the terminal device 40 in advance. For example, only the default division pattern may be set in the storage unit 42 of the terminal device 40 in advance. Then, the base station device 20 may notify the terminal device 40 of one division pattern by using the control signal (e.g., RRC signaling) before transmission data is generated in the terminal device 40. When the division pattern is notified of from the base station device 20, the terminal device 40 divides transmission unit data by using the division pattern notified of. Note that when the division pattern is not notified of from the base station device 20, the terminal device 40 may divide the transmission unit data by using the default division pattern.

At this time, in the default division pattern, all resource blocks included in the transmission unit data may be set as one NOMA application range. Furthermore, in the division pattern notified of from the base station device 20, one resource block may be set as one NOMA application range.

Setting Example 4

The terminal device 40 may change the division pattern to be used, according to the size (e.g., the size of all resource blocks allocated from the base station device 20) of the resource allocated, for data transmission, to the base station device 20.

For example, it is assumed that all of the plurality of NOMA application ranges included in one piece of transmission unit data have the same size. At this time, if the number of all resource blocks allocated from the base station device 20 is four, the terminal device 40 sets the size of one NOMA application range to two resource blocks. On the other hand, if the number of all resource blocks allocated from the base station device 20 is eight, the terminal device 40 sets the size of one NOMA application range to four resource blocks.

Note that there may be a plurality of division pattern candidates. For example, it is assumed that the number of all resource blocks allocated by the base station device 20 is four. At this time, the division pattern candidates may be "one resource block/NOMA application range", "two resource blocks/NOMA application range", and "four resource blocks/NOMA application range". On the other hand, it is assumed that the number of all resource blocks allocated by the base station device 20 is eight. At this time, the division pattern candidates may be "two resource blocks/NOMA application range", "four resource blocks/NOMA application range", or "eight resource blocks/NOMA application range". Here, two resource blocks/NOMA application range indicates that the size of each of the plurality of NOMA application ranges included in one piece of transmission unit data is two resource blocks.

The terminal device 40 may determine the division pattern used by the terminal device 40 itself, on the basis of the size of the resource allocated to the terminal device 40, in the setting example 4 as well. Furthermore, the division pattern used by the terminal device 40 may be determined by the base station device 20 on the basis of the size of the resource allocated to the terminal device 40. In this configuration, the base station device 20 may designate the division pattern to be used for the terminal device 40.

Setting Example 5

The terminal device 40 may change the division pattern to be used according to a difference in data transmission mode (transmission sequence).

For example, in radio connection, the transmission mode for transmitting data to another communication device (e.g., the base station device 20) by the communication device (e.g., the terminal device 40) includes grant-based transmission (first transmission mode) and grant-free transmission (second transmission mode). The grant-based transmission represents, for example, transmission in which the radio resource is allocated from another communication device after transmission data is generated in the communication device. Furthermore, the grant-free transmission represents, for example, transmission in which no radio resource is allocated from another communication device after transmission data is generated in the communication device. The grant-based transmission and grant-free transmission will be described in detail later.

The terminal device 40 may change the division patterns to be used between the grant-based transmission and the grant-free transmission. For example, in a case where the grant-based transmission is employed, the terminal device 40 uses a first division pattern as the division pattern used for dividing the transmission unit data. On the other hand, in a case where the grant-free transmission is employed, the terminal device 40 uses a second division pattern different from the first division pattern, as the division pattern used for dividing the transmission unit data. Here, the first division pattern may be a division pattern designated by the base station device 20. Furthermore, the second division pattern may be a division pattern set (quasi-statically set) in the terminal device 40 in advance by the base station device 20 or the like before the transmission data is generated.

[Designation Example of Division Pattern]

Various methods can be adopted for the base station device 20 to designate the division pattern to be used for the terminal device 40.

Designation Example 1

For example, the base station device 20 may designate the division pattern actually used by the terminal device 40 to the terminal device 40, after the transmission data is generated in the terminal device 40 (e.g., after the resource allocation request is made from the terminal device 40).

For example, it is assumed that a plurality of division pattern candidates is set in the terminal device 40 before the transmission data is generated in the terminal device 40. In this configuration, the base station device 20 may transmit information for designating the division pattern used by the terminal device 40 to the terminal device 40, after the transmission data is generated in the terminal device 40.

For example, as shown in the above setting example 1, it is assumed that the base station device 20 has previously notified of the four division pattern candidates by using the control signal (e.g., RRC signaling). Then, it is assumed that the storage unit 42 of the terminal device 40 has stored the division pattern information about the four division patterns. At this time, the base station device 20 notifies of one of the four division patterns by using two bits in DCI, after the resource allocation request is made from the terminal device 40. Then, the terminal device 40 performs the NOMA transmission process by using the division pattern (one of the four division patterns) designated in the DCI.

Furthermore, as shown in the above setting example 2, it is assumed that only one default division pattern and one switching division pattern have been set in the storage unit 42 of the terminal device 40. At this time, the base station device 20 notifies of whether the default division pattern is used or the switching division pattern is used, by using one bit in DCI. Then, the terminal device 40 performs the NOMA transmission process using the division pattern (default or switching division pattern) designated in the DCI.

Note that in the following description, the information for designating the division pattern to be used by the terminal device 40 is referred to as division pattern designation information. If the base station device 20 designates the division pattern to be used by the terminal device 40 by using two bits in the DCI, the two bits are the division pattern designation information. Furthermore, if the base station device 20 designates the division pattern to be used by the terminal device 40 by using one bit in the DCI, the one bit is the division pattern designation information.

Note that in the terminal device 40, use of the orthogonal resource used by another terminal device 40 (hereinafter, also referred to as the OMA terminal) employing orthogonal multiple access to the base station device 20 also makes it possible to have non-orthogonal multiple access (NOMA) to the base station device 20. For example, if the OMA terminal uses a large amount of power to transmit data to the base station device 20, the terminal device 40 is allowed to transmit data to the base station device 20 with a small amount of power on the time-frequency resource used by the OMA terminal.

In this configuration, the base station device 20 may use one bit in DCI to notify of whether the resource to be used by the terminal device 40 is the resource used by the OMA terminal. This notification may be information for each of the plurality of NOMA application ranges included in the transmission unit data. For example, the notification having zero bit indicates that no transmission data from the OMA terminal is multiplexed in the NOMA application range, and the notification having one bit indicates that transmission data from the OMA terminal is multiplexed in the NOMA application range.

Designation Example 2

The base station device 20 may designate the division pattern actually used by the terminal device 40 to the terminal device 40, before the transmission data is generated in the terminal device 40 (e.g., before the resource allocation request is made from the terminal device 40).

For example, the base station device 20 may designate the division pattern used by the terminal device 40 only by notification using DCI, without notification of the division pattern candidate information using the control signal (e.g., RRC signaling). In this configuration, the base station device 20 may notify of, as the division pattern designation information, division pattern identification information determined in advance in specification or the like. The division pattern identification information is information for identifying the division pattern. As an example, the division pattern identification information may be as follows.

P0: All resource blocks/NOMA Application Range
P1: four resource blocks/NOMA application range
P2: two resource blocks/NOMA application range
P3: one resource block/NOMA application range In the above example, P0 to P3 each represent division pattern identification information. Here, gall resource blocks/NOMA application range represents that all resource blocks constituting one piece of transmission unit data are one NOMA application range. Furthermore, four resource blocks/NOMA application range represents that each of a plurality of NOMA application ranges included in one piece of transmission unit data has a size of four resource blocks. Still furthermore, two resource blocks/NOMA application range represents that each of a plurality of NOMA application ranges included in one piece of transmission unit data has a size of two resource blocks. Still another furthermore, 1 resource block/NOMA application range represents that each of a plurality of NOMA application ranges included in one piece of transmission unit data has a size of one resource block. Note that the division pattern identification information may be simply numerically indicated. The division pattern identification information can be also referred to as an index or the like.

4. Channel Access Procedure on Unlicensed Channel

A function corresponding to a channel access (listen before talk) procedure can be implemented in the sensing unit 231 of the base station device 20 and the sensing unit 251 of the terminal device 40.

The channel access procedure is performed to access an unlicensed channel in which transmission is performed by the base station device 20 or the terminal device 40. In the channel access procedure defined on the basis of load-based equipment (LBE), channel sensing is performed once or a plurality of times. On the basis of a result of the sensing, it is determined whether the channel is idle (unoccupied, available, enable) or whether the channel is busy (occupied, unavailable, disable) (vacancy determination). In the channel sensing, the power of channel in a predetermined waiting time is sensed.

Examples of the waiting time in the channel access procedure include a first waiting time (slot), a second waiting time, a third waiting time (defer period), and a fourth waiting time.

The slot is a unit of waiting time of each of the base station device 20 and the terminal device 40 in the channel access procedure. For example, the slot is defined as 9 microseconds.

In the second waiting time, one slot is inserted at the head. The second waiting time is defined as, for example, 16 microseconds.

The defer period includes the second waiting time and a plurality of sequential slots following the second waiting time. The number of sequential slots following the second waiting time is determined on the basis of a priority class (channel access priority class) used to satisfy QoS.

The fourth waiting time includes the second waiting time followed by one slot.

The base station device 20 or the terminal device 40 senses a predetermined channel during a predetermined slot period. When power detected by the base station device 20 or the terminal device 40 for at least 4 microseconds within the predetermined slot period is smaller than a predetermined power detection threshold value, it is regarded that the predetermined slot is idle. On the other hand, when the power is larger than the predetermined power detection threshold value, it is regarded that the predetermined slot is busy.

The channel access procedure includes a first channel access procedure and a second channel access procedure. The first channel access procedure is performed by using a plurality of slots and the defer period. The second channel access procedure is performed by using a period of fourth waiting time.

Parameters related to the channel access is determined on the basis of the priority class. Examples of the parameters related to the channel access include a minimum contention window, a maximum contention window, a maximum channel occupancy time, and a possible value of the contention window. The priority class is determined by a value of a QoS class identifier (QCI) that processes the quality of service (QoS). A correspondence table between the priority classes and the parameters related to the channel access is illustrated in FIG. 22, and an example of mapping between the priority classes and the QCI is illustrated in FIG. 23.

FIG. 22 is a diagram illustrating an example of the correspondence table between the priority classes and the parameters. As illustrated in FIG. 22, the priority class "1" corresponds to 3, 7, 2 ms, and {3,7} in the order of the minimum contention window, the maximum contention window, the maximum channel occupancy time, and the possible value of the contention window. Furthermore, the priority class "2" corresponds to 7, 15, 3 ms, and {7,15} in the order of the minimum contention window, the maximum contention window, the maximum channel occupancy time, and the possible value of the contention window. Furthermore, the priority class "3" corresponds to 15, 63, 8 or 10 ms, and {15,31,63} in the order of the minimum contention window, the maximum contention window, the maximum channel occupancy time, and the possible value of the contention window. Furthermore, the priority class "4" corresponds to 15, 1023, 8 or 10 ms, and {15,31,63,127, 255,511,1023} in the order of the minimum contention window, the maximum contention window, the maximum channel occupancy time, and the possible value of the contention window.

FIG. 23 is a table illustrating an example of mapping between the priority classes and the QCIs. As illustrated in FIG. 23, the priority class "1" corresponds to the QCIs "1, 3, 5, 65, 66, 69, and 70". The priority class "2" corresponds to the QCIs "2 and 7". The priority class "3" corresponds to the QCIs "4, 6, 8, and 9". Furthermore, the QCIs other than the above correspond to the priority class "4".

<4-1. Details of First Channel Access Procedure>

In the first channel access procedure, the following steps are performed.

(0) Channel sensing is performed during the defer period. When the channel is idle in a slot within the defer period, the procedure proceeds to Step (1), and otherwise, the procedure proceeds to Step (6).

(1) An initial counter value is acquired. A possible value of the initial counter value is an integer of 0 to a value of the contention window CW. The initial counter value is determined at random according to a uniform distribution. The initial counter value is set to a counter N, and the process proceeds to Step (2).

(2) When the counter N is larger than 0 and subtraction of the counter N is selected, 1 is subtracted from the counter N. Then, the procedure proceeds to Step (3).

(3) A slot period is added before standby. Channel sensing is further performed in the added slot. When the additional slot is idle, the procedure proceeds to Step (4), and otherwise, the procedure proceeds to Step (5).

(4) When the counter N is 0, this procedure is stopped. Otherwise, the procedure proceeds to Step (2).

(5) The defer period is added before standby. Furthermore, channel sensing is performed until detected that any of the slots included in the added defer period is detected busy, or until all of the slots included in the added defer period is detected as idle. Then, the procedure proceeds to Step (6).

(6) When the channel is sensed to be idle in all of the slots included in the added defer period, the procedure proceeds to Step (4), and otherwise the procedure proceeds to Step (5).

After Step (4) in the above procedure is stopped, transmission is performed including data such as PDSCH and PUSCH, in the channel.

Note that after Step (4) in the above procedure is stopped, transmission does not need to be performed in the channel. In this case, when the channel is idle in all of the slots and the defer period immediately before the transmission, subsequent transmission may be performed without performing the procedure described above. On the other hand, when the channel is not idle in either of the slots and the defer period thereof, the procedure proceeds to Step (1) described above, after the channel is sensed as idle in all of the slots during the additional defer period.

<4-2. Details of Second Channel Access Procedure>

In the second channel access procedure, transmission may be performed immediately after the channel is determined as idle, as a result of the sensing at least during the fourth waiting time. On the other hand, when it is determined that the channel is not idle, as a result of the sensing at least during the fourth waiting time, no transmission is performed.

<4-3. Contention Window Adaptation Procedure>

The contention window CW used in the first channel access procedure is determined on the basis of a contention window adaptation procedure.

The value of the contention window CW is held for each priority class. In addition, the contention window CW has a value between those of the minimum contention window and the maximum contention window. The minimum contention window and the maximum contention window are determined based on the priority class.

The value of the contention window CW is adjusted before Step (1) of the first channel access procedure. When the ratio of NACKs is higher than a threshold value in HARQ response that supports a reference subframe in at least the contention window adaptation procedure or a shared channel in a reference HARQ process, the value of the contention window CW is increased, and otherwise, the value of the contention window CW is set to that of the minimum contention window.

The value of the contention window CW is increased on the basis of, for example, the following formula:

$$CW=2\cdot(CW+1)-1.$$

<4-4. Details of Channel Access Procedure in Downlink>

When downlink transmission including PDSCH, PDCCH, and/or EPDCCH is performed in the unlicensed channel, the base station device 20 accesses the channel on the basis of the first channel access procedure and performs the downlink transmission.

On the other hand, when the downlink transmission including the DRS but not including the PDSCH is performed in the unlicensed channel, the base station device 20 accesses the channel on the basis of the second channel access procedure, and performs the downlink transmission. Note that the period of the downlink transmission is preferably smaller than 1 millisecond.

<4-5. Details of Channel Access Procedure in Uplink>

In the unlicensed channel, when an instruction is given to perform the first channel access procedure in an uplink grant for scheduling PUSCH, the terminal device 40 performs the first channel access procedure before uplink transmission including the PUSCH.

In addition, when an instruction is given to perform the second channel access procedure in the uplink grant for scheduling the PUSCH, the terminal device 40 performs the second channel access procedure before uplink transmission including the PUSCH.

Furthermore, for uplink transmission including no PUSCH but including SRS, the terminal device 40 performs the second channel access procedure before the uplink transmission.

Furthermore, when the tail end of the uplink transmission indicated by the uplink grant is within an uplink duration (UL duration), the terminal device 40 performs the second channel access procedure before the uplink transmission, regardless of a procedure type indicated by the uplink grant.

In addition, when the uplink transmission continues through the fourth waiting time after the end of the downlink transmission from the base station device 20, the terminal device 40 performs the second channel access procedure before the uplink transmission.

<4-6. Channel Access Procedure for NR in Present Embodiment>

In the channel access procedure in the unlicensed channel by using NR, channel sensing without beamforming and channel sensing with beamforming are performed.

The channel sensing without beamforming is channel sensing based on reception whose directivity is not controlled or channel sensing having no direction information. The channel sensing having no direction information is, for example, channel sensing having averaged measurements in all directions. A transmitting station may not recognize the directivity (angle, direction) used in the channel sensing.

The channel sensing with beamforming is channel sensing based on reception whose directivity is controlled or channel sensing having direction information. In other words, the channel sensing with beamforming is channel sensing having a reception beam directed in a predetermined direction. A transmitting station having a function of performing channel sensing with beamforming is configured to perform channel sensing using different directivities once or more.

Performing the channel sensing with beamforming narrows an area to be detected by the sensing. Therefore, the transmitting station is allowed to reduce the frequency of detecting a communication link not interfering, reducing the exposure node problem.

<4-7. Channel Access for Frame Based Equipment (FBE)>

Figure 24:
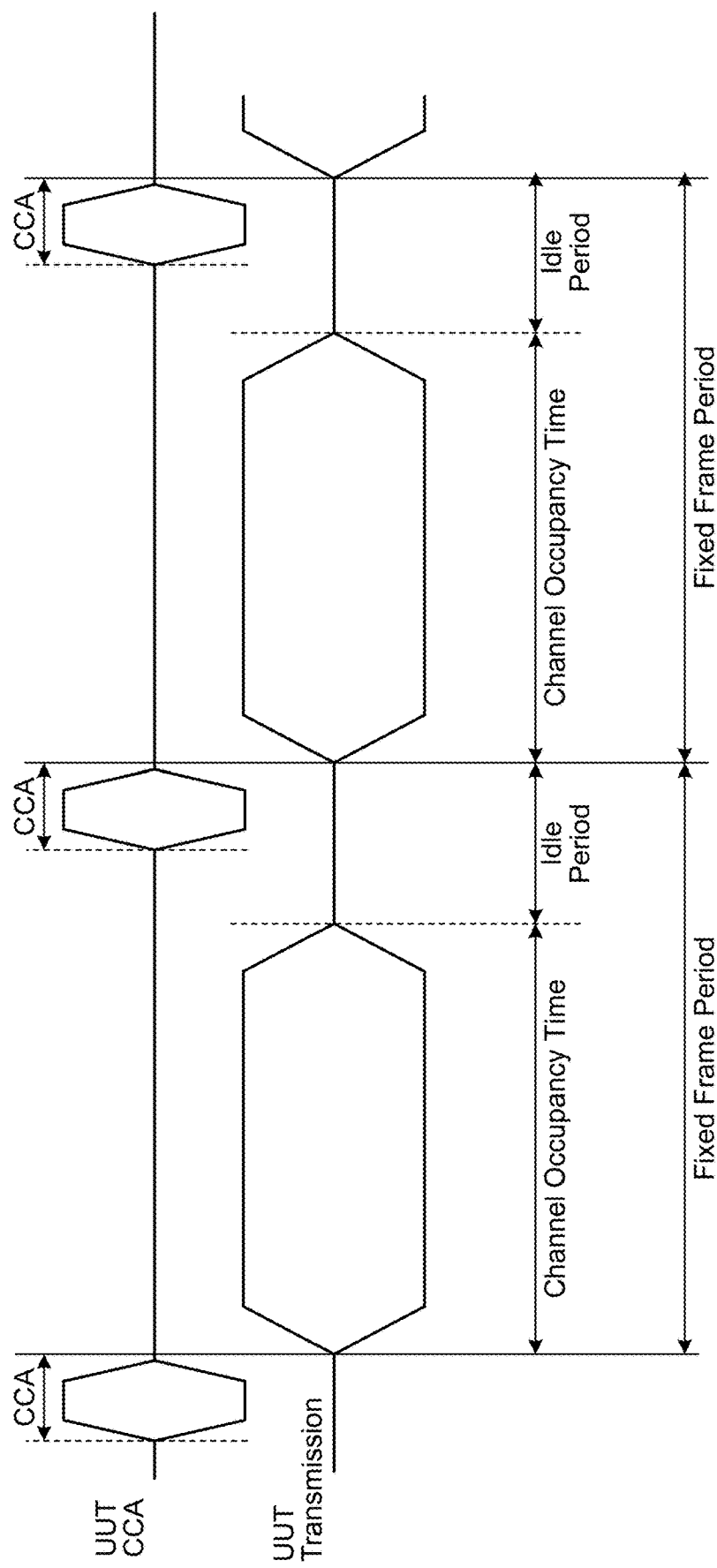
FIG. 24 is a diagram illustrating an overview of FBE.

FIG. 24 is a diagram illustrating an overview of frame based equipment (FBE). The upper part of FIG. 24 illustrates the timing of channel clear assessment (CCA) with the horizontal axis as the time axis. The lower part of FIG. 24 illustrates the timing of transmission with the horizontal axis as the time axis.

As illustrated in FIG. 24, in the channel access (listen before talk) procedure defined on the basis of the frame based equipment (FBE), channel sensing is performed once before transmission. On the basis of a result of the sensing, it is determined whether the channel is idle (unoccupied, available, enable) or whether the channel is busy (occupied, unavailable, disable) (vacancy determination). In the channel sensing, the power of channel in a predetermined waiting time is sensed.

A transmit and/or receive configuration used for the frame based equipment has a periodic timing called a fixed frame period.

The fixed frame period is set, in the channel access for the frame based equipment. The fixed frame period is set between 1 millisecond and 10 milliseconds. The fixed frame period can be changed only once in 200 milliseconds.

In the channel access for the frame based equipment, the equipment performs channel sensing, immediately before starting transmission from the head of the fixed frame period. The equipment performs sensing once by using one slot of 9 microseconds or less. As a result of sensing the channel, when a value of power is larger than the predetermined power detection threshold value, the channel is considered busy. Meanwhile, when the value of power is less than the predetermined power detection threshold value, the channel is clear and the equipment can perform transmission. The equipment is allowed to perform transmission during a channel occupancy time. When a gap between multiple transmission is 16 microseconds or less and within the channel occupancy time, the equipment can perform the multiple transmission without performing sensing. Meanwhile, when the gap between the multiple transmission exceeds 16 microseconds, the equipment needs to perform additional channel sensing. Likewise, the additional channel sensing is also performed once by using one slot.

The channel occupancy time in the channel access for the frame based equipment does not exceed 95% of the fixed frame period. An idle period in channel access for the frame based equipment is 5% or more of the fixed frame period. Note that the idle period is 100 microseconds or more.

Transmission of a response (ACK/NACK or HARQ-ACK) to the transmission from the equipment may be performed within the channel occupancy time.

<4-8. Directional LBT>

A method having directivity in channel sensing with respect to an omni-directional LBT includes the directional LBT. In the directional LBT, received power in a predetermined direction is measured. In other words, orientations other than the predetermined direction is not measured.

This configuration limits a direction in which measurement is to be performed, and thus, the frequency of being busy due to transmission from an unaffected device can be suppressed.

In the directional LBT, the physical signal and/or the physical channel can be transmitted only in a direction in which the LBT succeeds.

<4-9. Receiver Assisted LBT>

While LBT is originally performed only by the transmission device, receiver assisted LBT in the present embodiment is LBT that also uses information from the reception device.

An example of the receiver assisted LBT includes LBT using feedback of a channel state from the reception device. The transmission device adjusts the success/failure of the LBT and an LBT parameter, on the basis of channel state information from the reception device. The channel state includes inter-cell interference of an identical operator, inter-cell interference between different operators, interference between different RATs, and the like. Examples of the LBT parameters to be adjusted include an LBT threshold value, a contention window, and the like.

An example of the receiver assisted LBT includes LBT using response information from the reception device.

The transmission device transmits the physical channel and/or the physical signal to the reception device after LBT success. The reception device that has received the physical channel and/or the physical signal performs predetermined LBT. When the predetermined LBT succeeds, the reception device transmits a response to the transmission device, and when the predetermined LBT fails, the reception device transmits a negative response or transmits no response to the transmission device. The transmission device determines whether channel occupancy succeeds, on the basis of the response information from the reception device.

<4-10. Channel Occupancy in Present Embodiment>

In the unlicensed band operation in LTE, the base station device 20 notifies the terminal device 40 of the channel occupancy information by using the information of PDCCH to which CRC scrambled with CC-RNTI is added.

The PDCCH to which CRC scrambled with CC-RNTI is added includes the channel occupancy information for a transmitted subframe and the next subframe. The channel occupancy information is information indicating whether a channel is occupied up to which symbol in the transmitted subframe and the next subframe.

Furthermore, the PDCCH to which CRC scrambled with CC-RNTI is added can notify of uplink resource information. Uplink information is notified of by using a combination of an uplink length and an offset indicating a start position from the transmitted PDCCH. The resource (subframe) that is notified of as the uplink by the PDCCH does not request the terminal device 40 to receive downlink transmission. Therefore, the terminal device 40 is allowed to skip part of downlink reception processing in the uplink resource.

5. Channel Occupancy Information

As the channel occupancy information, the frequency domain information, the space domain information, and/or code domain information are notified of in addition to the time domain information. Merely as an example, notification of the channel occupancy information from the notification unit 232 of the base station device 20 to the terminal device 40 will be described here. Note that an example of notification of the channel occupancy information from the notification unit 452 of the terminal device 40 to the base station device 20 will be described later in <Modifications>.

<5-1. Time Domain Information>

In one example, the channel occupancy information corresponding to the time domain includes the following information.

(1) Period and Time

The channel occupancy information about the "period" and the "time" described above may include information indicating whether the channel can be occupied in a predetermined period, information indicating that at least part of a period in which the channel can be occupied is scheduled for channel occupancy, information about a remaining time available for the channel occupancy, or the like.

(2) Number of Slots and Number of Symbols

The channel occupancy information about "the number of slots" and "number of symbols" can include information about the number of slots and/or the number of symbols that is available for the channel occupancy.

(3) Maximum Channel Occupancy Time

The channel occupancy information about the "maximum channel occupancy time" can include information about the maximum time that is available for the channel occupancy after channel acquisition timing, and the like.

(4) Channel Access Priority

The channel occupancy information about the "channel access priority" can include information about the channel access priority of the LBT used for the channel occupancy, and the like.

<5-2. Frequency Domain Information>

In one example, the channel occupancy information corresponding to the frequency domain includes the following information.

(1) Carrier

The channel occupancy information about the "carrier" can include information indicating whether the channel has been occupied by a predetermined carrier, a center frequency, and the like.

(2) Cell

The channel occupancy information about the "cell" can include information indicating whether the channel can be occupied by a predetermined cell, an index of the secondary cell, and the like.

(3) Sub-Band

The channel occupancy information about the "sub-band" can include information indicating whether the channel has been occupied by a predetermined sub-band, and the like. Note that, in one example, the sub-band has a 20 MHz bandwidth in a 5 GHz band. In addition, the sub-band is used as a minimum unit bandwidth of LBT. The sub-band is defined as a new sub-band index and is notified of.

(4) Bandwidth Part (BWP)

The channel occupancy information about the "BWP" can include information indicating whether the channel has been occupied by a predetermined BWP, and the like. For example, the BWP is notified of by a BWP index. The BWP is set by RRC.

(5) Frequency Portion

The channel occupancy information about the "frequency portion" can include information indicating whether the channel has been occupied by a predetermined frequency portion, and the like. For example, the frequency portion can be represented by a combination of a lowest frequency point and a highest frequency point, a combination of the lowest frequency point and a bandwidth, or the like. Furthermore, the frequency portion can also be represented by a combination of a lowest resource block index and a highest resource block index, a combination of the lowest resource block index and the number of resource blocks, or the like. In addition, the frequency portion can also be represented by a combination of a lowest subcarrier index and a highest subcarrier index, a combination of the lowest subcarrier index and the number of subcarriers, or the like.

(6) Channel Number

The channel occupancy information about the "channel number" can include information indicating whether a band channel indicating a predetermined channel number has been occupied, or the like. The channel numbers are associated with bands, as illustrated in FIG. 25.

Figure 25:
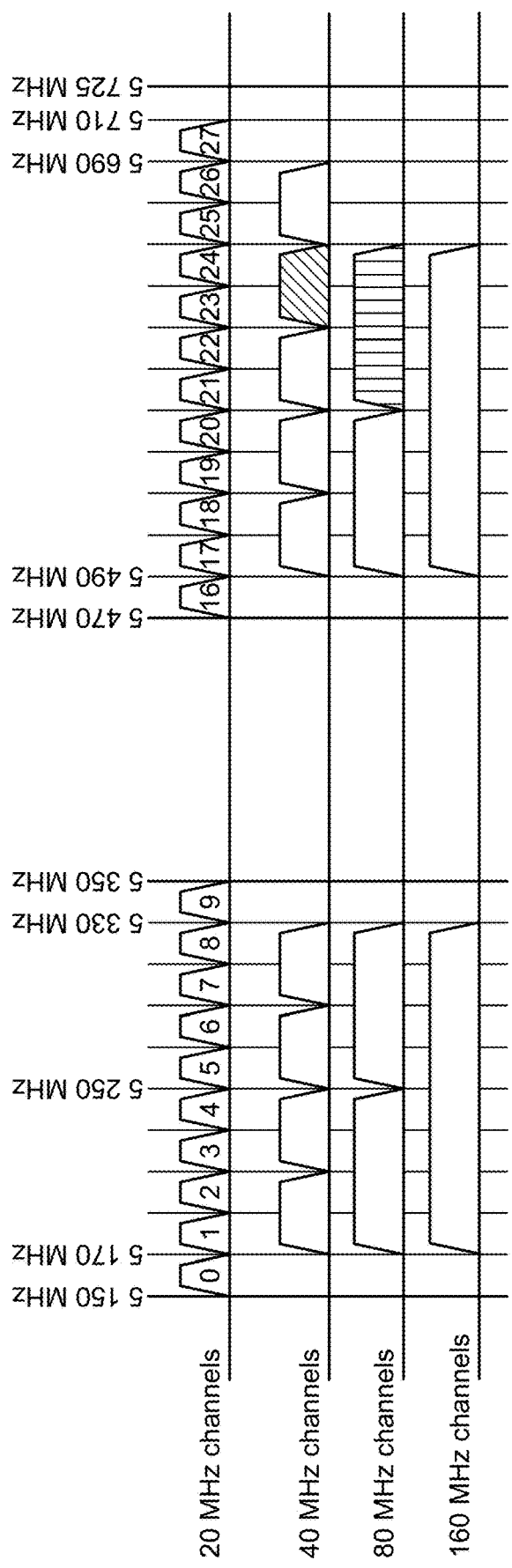
FIG. 25 is a diagram illustrating an example of correspondence relationships between channel numbers and bands.

FIG. 25 is a diagram illustrating an example of correspondence relationships between the channel numbers and the bands. In FIG. 25, as an example of channel occupancy in a frequency domain, channel occupancy in a 40 MHz band and channel occupancy in an 80 MHz band are indicated by shading. In other words, in NR, maximum channel occupancy of 100 MHz is possible, and thus, channel occupancy of 40 MHz or channel occupancy of 80 MHz is possible as compared with LTE in which only channel occupancy of 20 MHz is possible. For example, in channel occupancy of 40 MHz as indicated by diagonal hatching in FIG. 25, the channel numbers "23" and "24" can be notified of as the channel occupancy information. In addition, in channel occupancy of 80 MHz as indicated by vertical hatching in FIG. 25, the channel numbers "21" to "24" can be notified as the channel occupancy information.

<5-3. Space Domain Information>

In one example, the channel occupancy information corresponding to the space domain includes the following information.

(1) Beam Information

The channel occupancy information about the "beam information" can include information indicating whether the channel has been occupied by a predetermined transmission beam, and the like For example, examples of the transmission beam information include information indicating a beam index, an SS/PBCH index, an index corresponding to a CSI-RS port, a TCI state, and QCL assumption, and the like.

(2) Information about Position, Altitude, and Space of Transmission Point

Hereinafter, a "transmission point" refers to the base station device 20 when the channel occupancy information is transmitted from the base station device 20 to the terminal device 40, and refers to the terminal device 40 when the channel occupancy information is transmitted from the terminal device 40 to the base station device 20.

The channel occupancy information about the "position", "altitude", and "space" of the transmission point can include information indicating whether the channel has been occupied at a predetermined position, information indicating whether the channel has been occupied at a predetermined altitude, information indicating whether the channel has been occupied in a predetermined space, and the like. In addition, the channel occupancy information about the "position". "altitude", and "space" of the transmission point may include information indicating whether the channel has been occupied with a predetermined zone ID. Here, the wording "zone ID" represents identification information of a zone in which a two-dimensional plane is divided along the latitude and longitude or a zone in which a three-dimensional space is divided along the latitude, longitude, and altitude.

(3) Information about Angle of Departure (AoD)

The channel occupancy information about the "information about AoD" can include information indicating whether the channel has been occupied at a predetermined horizontal angle, information indicating whether the channel has been occupied at a predetermined elevation angle, and the like.

(4) Information about Adjacent Base Station, Adjacent Cell, and Transmission and Reception Point (TRP)

The channel occupancy information about the "adjacent base station", "adjacent cell", and "TRP" includes information about not only the transmission point of a transmission source of the channel occupancy information but also about another transmission point adjacent to the transmission point. For example, the channel occupancy information about the "adjacent base station", "adjacent cell", and "TRP" can include information indicating whether the channel has been occupied by a predetermined base station, information indicating whether the channel has been occupied in a predetermined cell, information indicating whether the channel has been occupied at a predetermined TRP, information indicating whether the channel has been occupied in a predetermined TCI state, and the like. The identification information of the adjacent base station, the adjacent cell, and the transmission and reception point (TRP) is indicated by a cell ID, carrier ID, SS/PBCH (SSB) index, TRP ID, PDSCH scrambling ID, PUSCH scrambling ID, DMRS scrambling ID, and the like.

(5) Polarization Information

The channel occupancy information about the "polarization" can include information indicating whether the channel been occupied using a predetermined polarization. The identification information of the polarization is indicated by, for example, a transmission antenna port or the like.

<5-4. Code Domain Information>

In one example, the channel occupancy information corresponding to the code domain includes the following information.

(1) MA Signature

The channel occupancy information about the "MA signature" can include information indicating whether the channel has been occupied using a predetermined MA signature.

(2) Orthogonal Code Information

The channel occupancy information about the "orthogonal code" can include information indicating whether the channel can be occupied using a predetermined orthogonal code, and the like.

(3) Scrambling Information

The channel occupancy information about the "scrambling" can include information indicating whether the channel has been occupied by using a predetermined scrambling sequence.

(4) Spreading Code Information

The channel occupancy information about the "spreading code" can include information indicating whether the channel has been occupied using a predetermined spreading code, and the like.

(5) Superposition Information

The channel occupancy information about the "superposition" can include information indicating whether the channel has been occupied using a predetermined power or power ratio, and the like.

(6) Demodulation Reference Signal (DMRS) Information

Multidimensional NOMA can be represented in association with an orthogonal dimension of a demodulation reference signal. From such an aspect, the channel occupancy information about the "demodulation reference signal" can include information indicating whether the channel has been occupied using a predetermined DMRS port, information indicating whether the channel has been occupied using a predetermined DMRS sequence, and the like.

6. Information Indicating Link in Channel Occupancy

In addition to the channel occupancy information, the following information indicating a link in the channel occupancy is notified of.

Notification of the following information indicating a link makes it possible to effectively reducing a load in the reception processing and transmission processing of the terminal device 40. Examples of the reception processing that can reduce the load include the PDCCH monitoring, downlink channel buffering, downlink signal blind detection, filtering for downlink band, downlink synchronization, and the like. In addition, examples of the transmission processing that can reduce the load include LBT processing, generation of the transmission signal, setting of transmission filtering, and the like. Here, the wording "reduction of the load" represents skipping of the processing exemplified as the reception processing or the transmission processing, or reduced frequency thereof.

<6-1. Downlink Information>

Downlink information represents information indicating a downlink resource. The downlink information may be further subdivided into the following classifications <6-1-1> to <6-1-8>.

<6-1-1. Information about Resource for Transmission of Downlink>

The information about resource for transmission of the downlink can be further subdivided into (1) information about the start position and period of sequential downlink resources, and (2) position of a symbol usable for the downlink.

(1) Information about the Start Position and Period of Sequential Downlink Resources The information about the start position and period of the downlink resources is preferably notified of by a start and length indicator (SLIV).

(2) Position of a Symbol Usable for the Downlink

The position of a symbol usable for the downlink is preferably notified of by SFI.

<6-1-2. PDCCH Monitoring Information>

The PDCCH monitoring information can be further subdivided into (1) information indicating whether to perform the PDCCH monitoring and (2) information about a PDCCH monitoring pattern.

(1) Information Indicating Whether to Perform the PDCCH Monitoring

When receiving the information indicating whether to perform the PDCCH monitoring, the terminal device 40 uses a set PDCCH monitoring occasion to perform the PDCCH monitoring. Meanwhile, when receiving no information indicating whether to perform the PDCCH monitoring, the terminal device 40 does not perform the PDCCH monitoring in the set PDCCH monitoring occasion.

(2) Information about a PDCCH Monitoring Pattern

The terminal device 40 uses the PDCCH monitoring occasion corresponding to the information about a PDCCH monitoring pattern from among the settings of a plurality of the PDCCH monitoring occasions, and performs the PDCCH monitoring.

<6-1-3. Information about CSI-RS Transmission>

CSI-RS is transmitted, in the aspect of CSI measurement, time/frequency tracking, RRM measurement, RLM measurement, and/or maintaining channel occupancy. For example, when the information about the time domain and the information about the frequency domain are transmitted in addition to information about CSI-RS transmission, the terminal device 40 recognizes that the CSI-RS is transmitted in the period and bandwidth notified of.

(1) Information about Predetermined Terminal Operation

For example, when the terminal device 40 receives information about a predetermined terminal operation, the predetermined terminal operation using the CSI-RS is performed, but other terminal operations using the CSI-RS need not be performed. Specifically, when the terminal device 40 receives the information about a predetermined terminal operation, the RRM measurement and the RLM measurement are performed, but the CSI measurement does not need to be performed. Therefore, an operation load on the terminal device 40 is reduced, and thus, an effect of reducing terminal power consumption can be obtained.

<6-1-4. Information about CSI-IM Transmission>

CSI-IM is transmitted, in the aspect of interference measurement for the RRM measurement, interference measurement for the RLM measurement, interference measurement for the CSI measurement, and the like. For example, when the information about the time domain and the information about the frequency domain are transmitted in addition to information about CSI-IM transmission, the terminal device 40 recognizes that the CSI-IM is transmitted in the period and bandwidth notified of.

(1) Information about Predetermined Terminal Operation

For example, when the terminal device 40 receives information about predetermined terminal operations, the predetermined terminal operations using CSI-IM are performed, but other terminal operations using CSI-IM need not be performed. Specifically, when the terminal device 40 receives the information about a predetermined terminal operation, the RRM measurement and the RLM measurement are performed, but the CSI measurement does not need to be performed. Therefore, an operation load on the terminal device 40 is reduced, and thus, an effect of reducing terminal power consumption can be obtained.

<6-1-5. Information about SS/PBCH Block>

An SS/PBCH block (SSB, SS block) is transmitted, in the aspect of cell search, time/frequency synchronization, RRM measurement, and/or maintaining channel occupancy. Here, information about the SS/PBCH block can be further subdivided into (1) information about transmission of the SS/PBCH block and (2) information about QCL of the SS/PBCH block.

(1) Information about Transmission of the SS/PBCH Block

For example, the information about transmission of the SS/PBCH block may be information about an SS/PBCH block arrangement pattern. For example, the information about transmission of the SS/PBCH block is information indicating that any arrangement pattern of CaseA, CaseB, CaseC, CaseD, and CaseE is applied. Note that the arrangement pattern is not limited to the CaseA, CaseB, CaseC, CaseD, and CaseE, and a new arrangement pattern may also be applied.

Furthermore, the information about transmission of the SS/PBCH block may be information indicating whether the SS/PBCH block performs transmission at a predetermined position of the SS/PBCH block in the arrangement pattern of the SS/PBCH block (actual SS/PBCH block transmission).
(2) Information about QCL of the SS/PBCH Block For example, the information about QCL of the SS/PBCH block may be information about quasi-co-location (QCL) of a predetermined SS/PBCH block. For example, the information about QCL of the SS/PBCH block can include information about the number of QCLs applied to the SS/PBCH block. In one example, when the information about the number of QCLs shows 1, the terminal device 40 recognizes that the same beam is applied to all the SS/PBCH blocks to be transmitted. In this case, the used beam may be assumed to be an omni beam.

<6-1-6. Information about CORESET Transmission>

Information about CORESET transmission can be further subdivided into (1) information about CORESET setting and (2) information about a parameter for CORESET setting.

(1) Information about CORESET Setting

For example, the information about CORESET setting can include information indicating setting of a valid CORESET of a plurality of CORESETs during the channel occupancy. Notifying of the valid CORESET in this way, CCE-REG mapping can be performed using only CORESET arranged in the sub-band occupying the channel.

(2) Information about a Parameter for CORESET Setting

For example, the information about a parameter for CORESET setting may be information indicating some of the parameters for the CORESET setting, for each channel occupancy.

<6-1-7. Information about Transmission of AGC Symbol>

A reservation signal is transmitted, at least in the aspect of AGC (autonomous gain control) for the terminal device 40. For example, information about transmission of AGC symbol may be information about a transmission position of an AGC symbol.

<6-1-8. Information about Reservation Signal Transmission>

The reservation signal is transmitted, at least in the aspect of maintaining channel occupancy. For example, information about reservation signal transmission may be information about a transmission position of the reservation signal.

<6-2. Uplink Information>

The uplink information represents information indicating an uplink resource. The uplink information may be further subdivided into the following classifications <6-2-1> to <6-2-6>.

<6-2-1. Information about Resource Enabling Transmission of PUSCH>

Information about resource enabling transmission of PUSCH can be further subdivided into (1) information about resource enabling transmission of only a scheduled (granted) PUSCH, (2) information about resource enabling transmission of only a grant-free (configured grant) PUSCH, and (3) information about resource enabling transmission of both the scheduled PUSCH and the grant-free PUSCH.

(1) Information about Resource Enabling Transmission Only by a Scheduled (Granted) PUSCH In the resource of (1), only PUSCH receiving an uplink grant is transmitted. In addition, in the resource of (1), transmission of the grant-free PUSCH is prohibited.

(2) Information about Resource Enabling Transmission Only by a Grant-Free PUSCH

When the resource of (2) overlaps with the resource set in the configured grant, transmission of the configured grant PUSCH is prohibited.

(3) Information about Resource Enabling Transmission by Both the Scheduled PUSCH and the Grant-Free PUSCH In the resource of (3), both the scheduled PUSCH and the grant-free PUSCH are transmitted.

<6-2-2. Information about Resource Enabling Transmission of PUCCH>

Information about resource enabling transmission of PUCCH may be information about resource enabling transmission in a predetermined PUCCH format, and the like. For example, the information about resource enabling transmission in a predetermined PUCCH format may be information about PUCCH resource enabling transmission in PUCCH formats 0 and 2. Furthermore, the information about resource enabling transmission in a predetermined PUCCH format may be information about PUCCH resource enabling transmission in PUCCH formats 1, 3, and 4.

<6-2-3. Information about Resource Enabling Transmission of PRACH>

The information about resource enabling transmission of PRACH can be further subdivided into (1) information indicating whether a predetermined RACH occasion is valid, and (2) information indicating whether a predetermined RACH setting is valid.

(1) Information Indicating Whether a Predetermined RACH Occasion is Valid

When it is indicated by the information of (1) that the RACH occasion is valid, the terminal device 40 transmits the PRACH by using the RACH occasion when the terminal device 40 has PRACH transmission.

(2) Information Indicating Whether a Predetermined RACH Setting is Valid

When a plurality of RACH settings is set in the terminal device 40, the information of (2) indicates whether each RACH setting is valid.

<6-2-4. Information about Resource Enabling Transmission of Sounding Reference Signal (SRS)>

The information about resource enabling transmission of SRS can be further subdivided into (1) information about resource enabling transmission of a periodic SRS or a semi-persistent SRS, and (2) information about a transmission trigger for an aperiodic SRS.

(1) Information about Resource Enabling Transmission of a Periodic SRS or a Semi-Persistent SRS When the transmission of the periodic SRS is not permitted, the SRS is not transmitted.

(2) Information about a Transmission Trigger of an Aperiodic SRS

The transmission trigger of the aperiodic SRS can be transmitted, as part of the channel occupancy information, to the terminal device 40. When the transmission trigger of the aperiodic SRS is transmitted, the terminal device 40 can recognize that the resource is the uplink resource.

<6-2-5. Information about LBT>

Information about LBT can be further subdivided into (1) information about an LBT type, (2) information about an LBT category, and (3) information about an LBT parameter.

(1) Information about an LBT Type

The information about an LBT type can include information indicating whether LBT performed before uplink transmission performs either type 1 or type 2.

(2) Information about an LBT Category

The information about an LBT category can include information indicating whether LBT performed before uplink transmission is LBT category 1, LBT category 2, or LBT category 4.

(3) Information about an LBT Parameter

The information about an LBT parameter can include information about a power detection threshold value of the LBT performed before uplink transmission. Furthermore, the information about an LBT parameter can include information about the contention window for LBT performed before uplink transmission. Furthermore, the information about an LBT parameter can include information about preamble detection for LBT performed before uplink transmission. Furthermore, the information about an LBT parameter can include information about a bandwidth in which LBT performed before uplink transmission is performed. In addition, the information about an LBT parameter includes information of a random backoff counter for LBT performed before uplink transmission.

In this way, the information about LBT is applied to the uplink transmission occurring in an occupied channel. Note that information about LBT for uplink transmission occurring outside the occupied channel may be separately notified of.

<6-2-6. Information about Uplink Transmission Timing>

Information about uplink transmission timing can include information about uplink transmission start timing. The transmission start timing is represented by a slot index, a symbol index, an index indicating a sensing slot, or the like. The terminal device 40 starts to transmit a signal and/or channel (e.g., the reservation signal) at specified transmission start timing.

<6-3. Other Information>

The other information represents information indicating a resource that is neither an uplink resource nor a downlink resource. This information can also be notified of as information about channel occupancy. The other information may be further subdivided into the following classifications <6-3-1> to <6-3-9>.

<6-3-1. Information about Switching Gap Between Downlink and Uplink>

Information about a switching gap between downlink and uplink can include information about a switching gap from the downlink to the uplink. In addition, the information about a switching gap between downlink and uplink can include information about a switching gap from the uplink to downlink. The information about a switching gap from the uplink to downlink includes information about a gap period. For example, information indicating 16 us, 25 us, 1 symbol, or the like is notified of.

<6-3-2. Pause Information>

Pause information may include information about a period in which no signal is transmitted. In the period specified as a pause, both of the transmission device and the reception device that have acquired the channel do not transmit a signal, but can continue to occupy the channel even after the duration of the period designated as the pose.

<6-3-3. Sidelink Information>

Sidelink information can include information about resource available for the sidelink.

<6-3-4. Channel Occupancy Information about Same RAT and Same Operator>

Channel occupancy information about the same RAT and the same operator can include information indicating that any of the serving cell, the adjacent cell, and another terminal device 40 occupies the channel. Such information can be used for measurement of the channel state of a base station device of the same operator, or the like.

<6-3-5. Channel Occupancy Information about Same RAT/Another Operator>

Channel occupancy information about the same RAT/another operator can include information indicating occupation by a communication device of another operator. Such information can be used for measurement of the channel state based on the communication device of the another operator, or the like. Furthermore, the channel occupancy information about the same RAT/another operator can also be used for coordination between operators.

<6-3-6. Channel Occupancy Information about Another RAT>

In one example, the wording "another RAT" can support 802.11 or the like. For example, the channel occupancy information about another RAT is information indicating that the channel is busy. Such information can be used for measurement of the channel state based on the communication device according to the another RAT.

<6-3-7. Information about Release of Occupied Channel>

Information about release of occupied channel can include information indicating that the subsequent channels are released, information indicating whether when the channels are scheduled to be released, and the like. Notifying that the channels are released in this manner, other communication devices can easily acquire the channels. Here, in one example, other communication devices (base station, UE not camped, and other RATs) are set as destinations of the information about release of occupied channel.

<6-3-8. Information about Schedule for Channel Occupancy (Attempt at LBT)>

Information about schedule for channel occupancy can include information indicating whether to attempt LBT in which future period, information indicating whether which channel is scheduled to be transmitted, information indicating whether LBT is performed in which LBT category, information indicating whether LBT is performed in which channel access priority, and the like. Notifying the timing of LBT in this manner, it is possible to prevent other communication devices can be prevented from performing the LBT on the resource, and the channel can be readily acquired.

<6-3-9. Information about Activation and Sleep of Terminal Device>

Information about activation and sleep of the terminal device is further subdivided into (1) information about timing at which the terminal device is activated and (2) information about timing at which the terminal device sleeps.

(1) Information about Timing at which the Terminal Device is Activated

For example, the information about timing at which the terminal device is activated can correspond to the timing and period of activation, the resetting or stopping a sleep timer, or the like. Here, the wording "activation of the terminal device" represents starting a predetermined operation.

(2) Information about Timing at which the Terminal Device Sleeps

For example, the information about timing at which the terminal device sleeps can correspond to the remaining time of the activation, activation of the sleep timer, and the like. Here, the wording "sleep of the terminal device" represents stopping the predetermined operation.

Examples of the wording "predetermined operation" of (1) and (2) include the PDCCH monitoring, downlink synchronization, downlink tracking, channel state measurement, band filtering, and PDSCH buffering.

7. Notification Means for Channel Occupancy Information

Examples of means for notifying of channel occupancy information from the base station device 20 to the terminal device 40 will be described.

For example, examples of the carrier notified of the channel occupancy information include a channel having channel occupancy, the unlicensed channel different from the channel having channel occupancy, and a licensed channel.

In addition, examples of the timing at which the channel occupancy information is notified of include (1) at the time of channel acquisition and (2) at the start of the slot.

(1) At the Time of Channel Acquisition

For example, the channel occupancy information can be notified of immediately after the channel has been acquired.

(2) At the Head of the Slot

In addition, the channel occupancy information can notify of the remaining length of the channel available for channel occupancy, and the like.

<7-1. Shared PDCCH or Group Common PDCCH>

For example, the channel occupancy information is notified of according to <7-1-1> to <7-1-2> which are described below.

<7-1-1. Notification by Using Slot Format Indicator (SFI) Information>

When transmitting PDCCH including SFI (DCI format 2_0), the base station device 20 notifies of the channel occupancy information by using information of the PDCCH. When receiving the PDCCH including the SFI (DCI format 2_0), the terminal device 40 acquires the channel occupancy information by using the information of the PDCCH. The terminal device 40 recognizes channel and link information of a predetermined resource, on the basis of the channel occupancy information acquired in this way. Hereinafter, an example of a format configuration will be described in the order of notification based on the time axis, notification based on the frequency axis, notification based on the space axis, and notification based on the code axis.

[Format Configuration of Notification Based on Time Axis]

For example, for a format of the notification based on the time axis, (A) information indicated by SFI, (B) a combination of the SFI and channel occupancy length information, and (C) the number of SFIs can be used.

(A) Information Indicated by SFI

The channel occupancy information is notified of by using a symbol and a configuration in a link direction, in which the symbol and the configuration in a link direction correspond to an index indicated by the SFI. For example, SFI format indexes 0 to 55 each indicate the configuration in a link direction for one slot. In addition, format indexes defined after the format index 55 can indicate the configuration in a link direction for two or more sequential slots.

(B) Combination of the SFI and Channel Occupancy Length Information

The channel occupancy information is notified of by using the symbol and the configuration in a link direction, and the channel occupancy length information, in which the symbol and the configuration in a link direction correspond to the index indicated by the SFI. The terminal device 40 recognizes that the indication of the link direction by the SFI that exceeds the channel occupancy length is invalid.

(C) The Number of SFIs

The channel occupancy length information is notified of according to the number of SFIs. The number of SFIs to be notified of is determined according to the remaining channel occupancy length.

[Format Configuration of Notification Based on Frequency Axis]

For example, for a format of the notification based on the frequency axis, (A) bitmap information corresponding to a frequency band, (B) the number of SFIs, (C) information about a start position and a width of the frequency band, (D) the BWP index, (E) the sub-band index, (F) information indicated by the SFI, (G) CORESET information, and (H) information about a search space can be used.

(A) Bitmap Information Corresponding to a Frequency Band

Information about a frequency band in which the channel has been occupied is notified of, as the channel occupancy information along the frequency axis, by using a set of bits (bitmap) corresponding to each frequency band.

(B) The Number of SFIs

The information about a frequency band in which the channel has been occupied is notified of according to the number of SFIs. For example, notifying of two SFIs allows recognition that two frequency bands are occupied.

(C) Information about a Start Position and a Width of the Frequency Band

The channel occupancy information along the frequency axis can be notified of by using the information about a start position and a width of the frequency band that occupies the channel.

(D) BWP Index

The BWP index of a BWP indicating that the channel has been occupied, of a plurality of set BWPs is notified of.

(E) The Sub-Band Index

A plurality of sub-band combinations is set as indexes in advance by using system information, RRC signaling, or the like, and an index corresponding to a sub-band combination in which the channel has been occupied is notified.

(F) Information Indicated by the SFI

For example, SFI format indexes 0 to 55 each indicate the configuration in a link direction for one sub-band, band, or cell. In addition, format indexes defined after the format index 55 can indicate the configuration in a link direction for two or more sequential sub-bands, bands, or cells.

(G) CORESET Information

The CORESET information (e.g., CORESET index) is notified of. The terminal device can recognize that the frequency band in which the notified CORESET is placed has channel occupancy.

(H) Information about the Search Space

The information about the search space (e.g., a search space index, a frequency position of the search space, etc.) is notified of. The terminal device can recognize that the frequency band in which the notified search space is placed has channel occupancy.

Note that during the initial access (idle state or inactive state), the notification based on the frequency axis may not be performed. The terminal device during the initial access performs communication by using one initial sub-band.

[Format Configuration of Notification Based on Space Axis]

For example, for a format of the notification based on the space axis, (A) bitmap information corresponding to space information (e.g., a beam or the transmission point), (B) the number of SFIs, (C) a beam index or a TCI state, (D) information indicated by the SFI, (E) CORESET information, (F) search space information, and (G) DCI information can be used.

(A) Bitmap Information Corresponding to Space Information

Information about the beam that has occupied the channel and the transmission point thereof is notified of, as the channel occupancy information along the space axis, by using the set of bits (bitmap) corresponding to each beam or transmission point.

(B) The Number of SFIs

The information about the beam that has occupied the channel and the transmission point thereof is notified of according to the number of SFIs.

(C) A Beam Index or a TCI State

Of a plurality of set beams or TCI states, the beam index or TCI state index indicating that the channel has occupied is notified of.

(D) Information Indicated by the SFI

For example, SFI format indexes 0 to 55 each indicate the configuration in a link direction for one space domain. In addition, format indexes defined after the format index 55 can indicate the configuration in a link direction for two or more space domains.

(E) CORESET Information

The CORESET information (e.g., CORESET index) is notified of. Each CORESET corresponds to each space domain. For example, CORESET #0 corresponds to SSB #0 (QCLed with SSB #0), and CORESET #1 corresponds to SSB #1 (QCLed with SSB #1). The terminal device can recognize the space domain in which the channel is occupied, through the CORESET information.

(F) Search Space Information

The information about the search space (e.g., a search space index, period of the search space, etc.) is notified of. Each search space corresponds to each space domain. For example, a search space #0 corresponds to SSB #0 (QCLed with SSB #0) and a search space #1 corresponds to SSB #1 (QCLed with SSB #1). The terminal device can recognize the space domain in which the channel is occupied, through the information about the search space.

(G) DCI Information

The DCI information (e.g., a DCI format, RNTI, etc.) is notified of. Each DCI corresponds to each space domain. For example, DCI transmitted using a predetermined RNTI corresponds to SSB #0, and DCI transmitted using a different predetermined RNTI corresponds to SSB #1. The terminal device can recognize the space domain in which the channel is occupied, through the DCI information.

Note that during the initial access (idle state or inactive state), the notification based on the space axis may not be performed. The terminal device during the initial access performs communication by using one initial beam.

[Format Configuration of Notification Based on Code Axis]

For example, for a format of the notification based on the code axis, the bitmap information corresponding to the code, the number of SFIs, information indicated by the SFI, and the like can be used.

Note that during the initial access (idle state or inactive state), the notification based on the code axis may not be performed. The terminal device during the initial access performs communication by using one initial code.

<7-1-2. Detection of PDCCH with Added CRC Scrambled with SI-RNTI>

When transmitting the PDCCH to which the CRC scrambled with the SI-RNTI is added, the base station device 20 notifies that a downlink is assigned to a predetermined period. When receiving the PDCCH to which the CRC scrambled with the SI-RNTI is added, the terminal device 40 recognizes that the downlink is assigned to the predetermined period.

In one example, the wording "predetermined period" includes a period during which DRS is transmitted. For example, a discovery reference signal (DRS) is a set of physical signals/channels including at least the SS/PBCH block, PDSCH including SIB1, and PDCCH to which CRC scrambled with SI-RNTI is added.

<7-2. DMRS Associated with PDCCH>

When transmitting the DMRS, the base station device 20 notifies that at least one of a predetermined frequency and a predetermined space, or a combination thereof is a downlink, for a predetermined period. When detecting the DMRS, the terminal device 40 recognizes that at least one of the predetermined frequency and the predetermined space, or a combination thereof is the downlink for the predetermined period.

Examples of the "predetermined period" include the following (1) to (6).

(1) From a symbol from which DMRS is detected, to a slot boundary of a slot from which the DMRS is detected (2) From a symbol where DMRS is detected, to a slot boundary located immediately after a designated number of slots and/or symbols from an upper layer.

(3) From a symbol from which DMRS is detected, to end symbol of CORESET (4) From a symbol from which DMRS is detected, to a start symbol of the next CORESET (5) From a symbol from which DMRS is detected, to a start symbol of the next CORESET in which PDCCH including SFI is placed (6) From a symbol from which DMRS is detected, after a time required for decoding the PDCCH Examples of the "predetermined frequency" include the following (1) to (3).

(1) Channel from which DMRS is detected
(2) Channel indicated by a DMRS sequence
(3) Bandwidth in which DMRS is placed Examples of the "predetermined space" include the following (1) to (3).

(1) A beam formed by SS/PBCH or CSI-RS that is QCLed with DMRS
(2) A transmission point that is QCLed with DMRS
(3) A beam or transmission point indicated by a DMRS sequence Examples of DMRS that can be used as means for notifying of channel occupancy information between the "predetermined frequency" and the "predetermined space" in the "predetermined period" include DMRSs of the following types (A) to (D).

(A) DMRS for shared PDCCH or group common PDCCH
(B) DMRS for PDCCH specific to the terminal device
(C) Wideband DMRS for shared PDCCH or group common PDCCH
(D) Wideband DMRS for PDCCH specific to the terminal device The "wideband DMRS" in (C) described above is DMRS for PDCCH that is the entire resource block (allContigousRBs) of CORESET in which the unit (precoderGranularity) of precoder for PDCCH is set.

Note that the base station device 20 may transmit only the DMRS without transmitting the PDCCH.

<7-3. CSI-RS>

When transmitting CSI-RS, the base station device 20 notifies that a downlink is assigned to a predetermined period. When detecting the CSI-RS, the terminal device 40 recognizes that the downlink is assigned to the predetermined period. Examples of the "predetermined period" include the following (1) to (2).

(1) From a symbol from which CSI-RS is detected, to a slot boundary
(2) From a symbol where DMRS is detected, to a slot boundary located immediately after a designated number of slots and/or symbols from an upper layer.

<7-4. SS/PBCH Block>

When transmitting the SS/PBCH block, the base station device 20 notifies a predetermined terminal device 40 that a downlink is assigned to a predetermined period. When receiving the SS/PBCH block, the terminal device 40 recognizes that the downlink is assigned to the predetermined period. Examples of the "predetermined period" include the following (1) to (2).
(1) Symbol in which the SS/PBCH block is arranged
(2) Period in which DRS is transmitted <7-5. PDCCH Specific to Terminal Device>

When transmitting PDCCH specific to the terminal device, the base station device 20 notifies a predetermined terminal device 40 that a downlink is assigned to the predetermined period. When receiving the PDCCH specific to the terminal device, the terminal device 40 recognizes that the downlink is assigned to the predetermined period. Examples of the "predetermined period" include the following (1) to (2).
(1) Period of CORESET in which PDCCH specific to the terminal device is placed
(2) Period in which PDCCH specific to the terminal device is a scheduled PDSCH <7-6. Initial Signal and Initial Channel>

The initial signal or the initial physical channel is also referred to as a wake-up signal or a preamble. The initial signal is transmitted at the start of downlink burst. For the initial signal, for example, a preamble (Wi-Fi preamble) defined in 802.11 or a signal or physical channel that can be received in common by a NR terminal device and an 802.11 device is assumed.

The preamble defined in 802.11 includes at least short training field (STF), long training field (LTF), and signal (SIG). In addition, the preamble may include an extended SIG (e.g., VH-SIG,) or the like.

8. Operations of Communication System

Here, <8-1. Channel occupancy information notification procedure performed by base station device>, <8-2. channel occupancy information notification procedure performed by terminal device>, <8-3. Exceptional processing in acquisition of channel occupancy information>, and <8-4. Notification of channel occupancy information in frame based equipment (FBE)> will be described as operation examples of the communication system.

<8-1. Channel Occupancy Information Notification Procedure Performed by Base Station Device>

Step 1: The base station device 20 attempts LBT for channel occupancy.

Step 2: When the channel access is successfully achieved as a result of the LBT, the base station device 20 transmits the physical signal and/or the physical channel.

Step 3: The base station device 20 notifies the terminal device 40 of channel occupancy information indicating channel occupancy performed by the base station device 20.

Step 4: The terminal device 40 performs uplink transmission processing and/or downlink reception processing on the basis of the channel occupancy information received in Step 3.

<8-2. Channel Occupancy Information Notification Procedure Performed by Terminal Device>

Step 1: The terminal device 40 attempts LBT for channel occupancy.

Step 2: When the channel access is successfully achieved as a result of the LBT, the terminal device 40 transmits the physical signal and/or the physical channel to the base station device 20.

Step 3: The terminal device 40 notifies the base station device 20 of channel occupancy information indicating channel occupancy performed by the terminal device 40.

Step 4: The base station device 20 performs downlink transmission processing on the basis of the channel occupancy information received in Step 3.

<8-3. Exceptional Processing in Acquisition of Channel Occupancy Information>

For example, the operation of the terminal device 40 when receiving channel occupancy information different from the channel occupancy information previously received and set can be performed as described below in (1) and (2).
(1) Update the channel occupancy information.
(2) Ignore the different channel occupancy information.

Furthermore, the operation of the terminal device 40 when the channel occupancy information cannot be received can be performed as described below in (1) and (2).
(1) The terminal device 40 refers to default channel occupancy information.
(2) The terminal device 40 recognizes that neither the downlink nor the uplink is used in a resource domain.

Furthermore, the operation of the terminal device 40 when a plurality of pieces of different channel occupancy information is simultaneously received can be performed as described below in (1) and (2). Here, the simultaneous reception of the plurality of pieces of different channel occupancy information includes simultaneous notification of SFI by a plurality of PDCCHs, and the like.
(1) Recognize only a common portion of the channel occupancy information as the channel occupancy state, and the other portions are recognized as invalid.
(2) Apply SFI information in order of priority.

For example, in (2), the priority of the SFI information transmitted from a different carrier is set lower than that of the SFI information transmitted from a carrier that has channel occupancy. Furthermore, in (2) described above, the priority of the SFI information transmitted from the licensed carrier is set higher than that of the SFI information from the unlicensed carrier.

<8-4. Notification of Channel Occupancy Information in Frame Based Equipment (FBE)>

In FBE as well, the channel occupancy information in the frequency domain, space domain, and/or code domain is notified. For example, the base station device 20 notifies the terminal device 40 of the channel occupancy information. Meanwhile, the terminal device 40 recognizes the time, frequency, space, and/or code domain in which the channel is occupied, on the basis of the channel occupancy information.

Here, examples of a method of notifying the channel occupancy information in FBE include (1) a shared PDCCH or group common PDCCH, and (2) DMRS associated with PDCCH.

In addition, in the communication device that supports both of FBE and LBE, information notifying whether either FBE or LBE is used may be added to the channel occupancy information. For example, a bit indicating FBE or LBE may be added to the channel occupancy information. Merely as an example, the terminal device 40 is caused to recognize FBE when a predetermined bit indicates 0 and recognize LBE when the predetermined bit indicates 1. Furthermore, information specific to FBE/LBE can be added to the channel occupancy information. Merely as an example, the terminal device 40 is caused to recognize FBE when the period is notified of, and recognize LBE otherwise. Furthermore, in another example, FBE or LBE can be indicated according to RNTI on the shared PDCCH. The terminal device determines that FBE is used, when notification is performed using RNTI for FBE, and determines that LBE is used, when notification is performed using RNTI for LBE.

Furthermore, in another example, FBE or LBE can be indicated by using the notification timing. The terminal device determines that FBE is used, when notification is performed at the start of the frame of the FBE, and determines that LBE is used, when the notification is performed at the other timing.

Note that the base station device in FBE may transmit a synchronization signal simultaneously with channel occupancy. The device supporting FBE performs frame synchronization on the basis of a synchronization signal transmitted from the base station device. Note that the synchronization signal may include clock information.

Note that, even if the channel is not occupied by the base station device for FBE, the device supporting both FBE and LBE may acquire the channel by using LBE on the channel that is not occupied by the base station device for FBE.

9. Modifications

The embodiments described above are merely examples, and various modifications and applications are possible.
<9-1. Notification Means for Channel Occupancy Information>

In the above <7. Notification means for channel occupancy information>, examples of means for notifying of the channel occupancy information from the base station device 20 to the terminal device 40 has been described. However, as a matter of course, the channel occupancy information may be notified of from the notification unit 452 of the terminal device 40 to the base station device 20.

In other words, the channel occupancy information notified from the terminal device 40 to the base station device 20 can use information equivalent to the channel occupancy information notified from the base station device 20 to the terminal device 40 as described above.

In addition to such channel occupancy information, the following information (1) to (4) can be notified of.
(1) Position Information of Terminal Device When the terminal device 40 notifies the base station device 20 of the position information of the terminal device 40, the base station device 20 can use the position information for cell control. For example, the "position information" described above may be position information estimated by a global navigation satellite system (GNSS) or positioning RS, or may be position information estimated by using another positioning technology.
(2) Information about Interference Received by Terminal Device The terminal device 40 notifies the base station device 20 of information about interference on the terminal device 40, and thereby, the base station device 20 can use the information about the interference on the terminal device 40 for cell control.

For example, an example of the information about interference on the terminal device 40 includes average RSSI. The "average RSSI" mentioned here may be average RSSI in all periods, or may be an average RSSI in a predetermined period.

In addition, another example of the information about interference on the terminal device 40 includes channel occupancy rate. The "channel occupancy rate" mentioned here may be a channel occupancy rate in all periods, or may be a channel occupancy rate in a predetermined period.

Furthermore, still another example of the information about interference on the terminal device 40 includes RSRP of the adjacent cell. The "RSRP of the adjacent cell" mentioned here may be RSRP of an adjacent cell of the identical operator, or may be RSRP of the adjacent cell of another operator.

Furthermore, another example of the information about interference on the terminal device 40 includes information about measurement of RSSI or RLM by another operator.

Furthermore, still another example of the information about interference on the terminal device 40 includes RSSI of another RAT. The "RSSI of another RAT" mentioned here may be RSSI of RAT other than identical RAT in all periods, RSSI of a predetermined RAT in all periods, RSSI of the RAT other than the identical RAT in a predetermined period, or RSSI of the predetermined RAT in the predetermined period.
(3) Channel State Information Received by Terminal Device The terminal device 40 can also notify the base station device 20 of CSI information or RSRP information as an example of channel state information received by the terminal device 40.
(4) Information about LBT Used for Channel Occupancy The terminal device 40 can also notify the base station device 20 of the information about LBT used for the channel occupancy.

Examples of the information about LBT used for the channel occupancy include (A) the channel access priority class and (B) the number of uplink LBT successes/failures.
(A) Channel Access Priority Class For example, the channel access priority class may be information about a priority class of the LBT used when the channel is acquired.
(B) The Number of Uplink LBT Successes/Failures Here, "the number of uplink LBT successes/failures" may be the number of uplink LBT successes/failures in a predetermined period or the frequency of LBT success/failure. Furthermore, "the number of uplink LBT successes/failures" may be the number of uplink LBT successes/failures for a predetermined channel. Still further, "the number of uplink LBT successes/failures" may be the number of uplink LBT successes/failures for a predetermined LBT category. Still another further, "the number of uplink LBT successes/failures" may be information about a factor of LBT failure. An example of the information about the factor of such LBT failure includes information about whether channel occupancy of which device causes LBT failure. For example, LTE or NR information (cell ID, SS/PBCH index, CSI-RS port, terminal device ID (RNTI)), identification information (BSS color) of the 802.11 device, or the like can be used.

Note that examples of a method of notifying of the channel occupancy information from the terminal device 40 to the base station device 20 include the following (1) to (3).
(1) UCI The UCI is added into PUSCH and transmitted. Note that the UCI may be added into PUCCH and transmitted.
(2) PRACH The channel occupancy information may be notified of in association with a PRACH occasion, a PRACH preamble, or a PRACH sequence.
(3) SRS The channel occupancy information may be notified of in association with an SRS resource or an SRS sequence.
<9-2. Other Modifications>

A control device that controls the management devices 10, the base station devices 20, the relay devices 30, or the terminal devices 40 according to the present embodiment may be implemented by a dedicated computer system or a general-purpose computer system.

For example, programs for executing the above-described operations are stored in a computer-readable recording medium such as an optical disk, a semiconductor memory, a magnetic tape, or a flexible disk, for distribution. Then, for example, the programs are installed on a computer to perform the processing described above, and the control device is configured. At this time, the control device may be a device (e.g., a personal computer) outside the management devices 10, the base station devices 20, relay devices 30, or terminal devices 40. Furthermore, the control device may be a device (e.g., the control unit 23 or the control unit 45) inside each management device 10, base station device 20, relay device 30, or terminal device 40.

Furthermore, the communication program may be stored in a disk device included in a server device on a network such as the Internet so as to be, for example, downloaded to the computer. Furthermore, the functions described above may be implemented in cooperation with an operating system (OS) and application software. In this configuration, a portion other than the OS may be stored in a medium for distribution, or the portion other than the OS may be stored in the server device, for example, for download to the computer.

Furthermore, of processing described in the above embodiments, all or part of the processing described to be performed automatically can be performed manually or all or part of the processing described as to be performed manually can be performed automatically by a known method. In addition, the processing procedures, specific names, and information including various data and parameters, which are shown in the above description or the drawings, can be appropriately changed unless otherwise specified. For example, various information illustrated in the drawings is not limited to the information illustrated.

In addition, the component elements of the devices are illustrated as functional concepts and are not necessarily required to be physically configured as illustrated. In other words, the specific forms of distribution or integration of the devices are not limited to those illustrated, and all or part thereof may be configured by functionally or physically distributed or integrated in any units, according to various loads or usage condition.

Furthermore, the embodiments described above can be appropriately combined within a range consistent with the contents of the processing. Furthermore, the orders of the steps illustrated in the sequence diagrams or the flowcharts of the embodiments described above can be changed appropriately.

As described above, according to an embodiment of the present disclosure, the communication devices such as the base station devices 20 and the terminal devices 40 notify the communication device of the other party, of information about a domain other than the time domain, as the channel occupancy information, upon successful channel sensing.

In an aerial communication device of a primary system selected in this manner, interference from a communication device of the secondary system to the aerial communication device of the primary system is controlled to or below a predetermined level.

Therefore, as a result of use of the information about a domain other than the time domain for the communication device of the other party, a load due to a reception processing, transmission processing, or the like in the communication device of the other party can be fully reduced, as compared with a case where only the time domain information is notified of as the channel occupancy information. Thus, high communication performance will be achieved.

Although the embodiments of the present disclosure have been described above, the technical scope of the present disclosure is not limited to the embodiments described above and various modifications and alterations can be made without departing from the spirit and scope of the present disclosure. Moreover, the component elements of different embodiments and modifications may be suitably combined with each other.

Furthermore, the effects of the embodiments in the present description are merely examples and are not intended to restrict the present disclosure, and other effects may be provided.

Note that the present technology may also employ the following configurations.

(1)

A communication device comprising:
a sensing unit that performs channel sensing in an unlicensed band; and
a notification unit that notifies another communication device of space domain information, as channel occupancy information indicating that channel occupancy is performed when the sensing succeeds.

(2)

The communication device according to (1), wherein
the notification unit notifies of information about a beam transmitted by the communication device, as the channel occupancy information.

(3)

The communication device according to (2), wherein
the beam information include at least one of a beam index, an SS/PBCH index, an index corresponding to a CSI-RS port, and a TCI state, or a combination thereof.

(4)

The communication device according to (1), wherein
the notification unit notifies of information about a horizontal angle or elevation angle of the beam transmitted by the communication device, as the channel occupancy information.

(5)

The communication device according to (1), wherein
the notification unit notifies, as the channel occupancy information, of information about a communication device adjacent to the communication device, a cell adjacent to a cell assigned to the communication device, or TRP.

(6)

The communication device according to (1), wherein
the notification unit notifies of information about polarization of the beam transmitted by the communication device, as the channel occupancy information.

(7)

The communication device according to (1), wherein
the notification unit notifies of bitmap information corresponding to the space domain information, as the channel occupancy information.

(8)

The communication device according to (1), wherein
the notification unit notifies of information in which the space domain information is formatted according to the number of SFIs, as the channel occupancy information.

(9)

The communication device according to (1), wherein
the notification unit further notifies of information about an uplink resource having been occupied by the communication device, as the channel occupancy information.

(10) The communication device according to (1), wherein the notification unit further notifies of information about a downlink resource having been occupied by the communication device, as the channel occupancy information.

(11) The communication device according to (1), wherein the notification unit further notifies, as the channel occupancy information, of a resource that is neither an uplink being occupied by the communication device nor a downlink being occupied by the communication device.

(12) The communication device according to (1), wherein the notification unit further notifies of frequency domain information, as the channel occupancy information.

(13) The communication device according to (1), wherein the notification unit further notifies of code domain information, as the channel occupancy information.

(14) A communication method comprising:
performing channel sensing in an unlicensed band; and
notifying another communication device of space domain information, as channel occupancy information indicating that channel occupancy is performed when the sensing succeeds.

(15) The communication method according to (14), wherein the notifying includes notifying of information about a beam transmitted by the communication device, as the channel occupancy information.

(16) The communication method according to (15), wherein the beam information include at least one of a beam index, an SS/PBCH index, an index corresponding to a CSI-RS port, and a TCI state, or a combination thereof.

(17) The communication method according to (14), wherein the notifying includes notifying of information about a horizontal angle or elevation angle of the beam transmitted by the communication device, as the channel occupancy information.

(18) The communication method according to (14), wherein the notifying includes notifying, as the channel occupancy information, of information about a communication device adjacent to the communication device, a cell adjacent to a cell assigned to the communication device, or TRP.

(19) A communication program causing
a computer included in a communication device to function as:
a sensing unit that performs channel sensing in an unlicensed band; and
a notification unit that notifies another communication device of space domain information, as channel occupancy information indicating that channel occupancy is performed when the sensing succeeds.

(20) The communication program according to (19), wherein the notification unit notifies of information about a beam transmitted by the communication device, as the channel occupancy information.

(21) The communication program according to (20), wherein the beam information may include at least one of a beam index, an SS/PBCH index, an index corresponding to a CSI-RS port, and a TCI state, or a combination thereof.

(22) The communication program according to (19), wherein the notification unit notifies of information about a horizontal angle or elevation angle of the beam transmitted by the communication device, as the channel occupancy information.

(23) The communication program according to (19), wherein the notification unit notifies, as the channel occupancy information, of information about a communication device adjacent to the communication device, a cell adjacent to a cell assigned to the communication device, or TRP.

REFERENCE SIGNS LIST

1 COMMUNICATION SYSTEM
10 MANAGEMENT DEVICE
20 BASE STATION DEVICE
30 RELAY DEVICE
40 TERMINAL DEVICE
12, 22, 32, 42 STORAGE UNIT
211, 311, 411 RECEPTION PROCESSING UNIT
211a, 411a RADIO RECEPTION UNIT
211b, 411b DEMULTIPLEXING UNIT
211c, 411c DEMODULATION UNIT
211d, 411d DECODING UNIT
212, 312, 412 TRANSMISSION PROCESSING UNIT
212a, 412a ENCODING UNIT
212b, 412b MODULATION UNIT
212c, 412c MULTIPLEXING UNIT
212d, 412d RADIO TRANSMITTING UNIT
213, 313, 413 ANTENNA
231, 451 SENSING UNIT
232, 452 NOTIFICATION UNIT

The invention claimed is:

1. A communication device comprising:
a sensor that performs channel sensing in an unlicensed band; and
a transmitter that notifies another communication device of space domain information, as channel occupancy information indicating that channel occupancy is performed when the sensing succeeds,
wherein the transmitter notifies of at least one of:
information about a horizontal angle or elevation angle of the beam transmitted by the communication device, as the channel occupancy information, or
information about polarization of the beam transmitted by the communication device, as the channel occupancy information.

2. The communication device according to claim 1, wherein
the transmitter notifies of information about a beam transmitted by the communication device, as the channel occupancy information.

3. The communication device according to claim 2, wherein
the beam information includes at least one of a beam index, a synchronization signals/physical broadcast channel (SS/PBCH) index, an index corresponding to a Channel State Information Reference Signal (CSR-RS) port, or a Transmission Configuration Indicator (TCI) state, or a combination thereof.

4. The communication device according to claim 1, wherein
the transmitter notifies, as the channel occupancy information, of information about a communication device adjacent to the communication device, information about a cell adjacent to a cell assigned to the communication device, or information about a transmission and reception point (TRP).

5. The communication device according to claim 1, wherein
the transmitter notifies of bitmap information corresponding to the space domain information, as the channel occupancy information.

6. The communication device according to claim 1, wherein
the transmitter notifies of information in which the space domain information is formatted according to a number of slot format indicator (SFI), as the channel occupancy information.

7. The communication device according to claim 1, wherein
the transmitter further notifies of information about an uplink resource having been occupied by the communication device, as the channel occupancy information.

8. The communication device according to claim 1, wherein
the transmitter further notifies of information about a downlink resource having been occupied by the communication device, as the channel occupancy information.

9. The communication device according to claim 1, wherein
the transmitter further notifies, as the channel occupancy information, of a resource that is neither an uplink being occupied by the communication device nor a downlink being occupied by the communication device.

10. The communication device according to claim 1, wherein
the transmitter further notifies of frequency domain information, as the channel occupancy information.

11. The communication device according to claim 1, wherein
the transmitter further notifies of code domain information, as the channel occupancy information.

12. A communication method performed by a communication device, the method comprising:
performing channel sensing in an unlicensed band; and
notifying another communication device of space domain information, as channel occupancy information indicating that channel occupancy is performed when the sensing succeeds,
wherein the notifying includes at least one of:
notifying of information about a horizontal angle or elevation angle of the beam transmitted by the communication device, as the channel occupancy information, or
information about polarization of the beam transmitted by the communication device, as the channel occupancy information.

13. The communication method according to claim 12, wherein
the notifying includes notifying of information about a beam transmitted by the communication device, as the channel occupancy information.

14. The communication method according to claim 12, wherein
the notifying includes notifying, as the channel occupancy information, of information about a communication device adjacent to the communication device, information about a cell adjacent to a cell assigned to the communication device, or information about a transmission and reception point (TRP).

15. A non-transitory computer readable device containing instructions for causing a computer included in a communication device to perform a method, the method comprising:
performing channel sensing in an unlicensed band; and
notifying another communication device of space domain information, as channel occupancy information indicating that channel occupancy is performed when the sensing succeeds,
wherein the notifying includes at least one of:
notifying of information about a horizontal angle or elevation angle of the beam transmitted by the communication device, as the channel occupancy information, or
information about polarization of the beam transmitted by the communication device, as the channel occupancy information.

16. The communication program according to claim 15, wherein the notifying further comprises:
notifying of information about a beam transmitted by the communication device, as the channel occupancy information.

* * * * *